US008230129B2

(12) United States Patent
Sumi et al.

(10) Patent No.: US 8,230,129 B2
(45) Date of Patent: Jul. 24, 2012

(54) APPARATUS AND METHOD FOR IDENTIFYING DEVICE TYPES OF SERIES-CONNECTED DEVICES OF MIXED TYPE

(75) Inventors: Shuji Sumi, Kanata (CA); Hong Beom Pyeon, Kanata (CA)

(73) Assignee: MOSAID Technologies Incorporated, Ottawa (CA)

( * ) Notice: Subject to any disclaimer, the term of this patent is extended or adjusted under 35 U.S.C. 154(b) by 0 days.

(21) Appl. No.: 13/168,157

(22) Filed: Jun. 24, 2011

(65) Prior Publication Data

US 2011/0258399 A1    Oct. 20, 2011

Related U.S. Application Data

(63) Continuation of application No. 12/025,177, filed on Feb. 4, 2008, now Pat. No. 7,991,925.

(60) Provisional application No. 60/889,572, filed on Feb. 13, 2007, provisional application No. 60/892,712, filed on Mar. 2, 2007.

(51) Int. Cl.
*G06F 3/00* (2006.01)
*G06F 13/00* (2006.01)

(52) U.S. Cl. .................... 710/15; 710/3; 710/8

(58) Field of Classification Search .................... 710/15, 710/8, 3
See application file for complete search history.

(56) References Cited

U.S. PATENT DOCUMENTS

| | | | |
|---|---|---|---|
| 4,174,536 A | 11/1979 | Misunas et al. | |
| 4,360,870 A | 11/1982 | McVey | |
| 4,617,566 A | 10/1986 | Diamond | |
| 4,733,376 A | 3/1988 | Ogawa | |

(Continued)

FOREIGN PATENT DOCUMENTS

EP    1717985    11/2006

(Continued)

OTHER PUBLICATIONS

Samsung Electronics Co. Ltd, "256M×8 Bill 128 M×16 Bill 512M×8 Bit NAND Flash Memory", K9K4G08U1M, K9F2G08UOM, K9F2616UOM, May 6, 2005, pp. 1-41.

(Continued)

*Primary Examiner* — Chun-Kuan Lee
*Assistant Examiner* — Zachary K Huson
(74) *Attorney, Agent, or Firm* — Shuji Sumi

(57) ABSTRACT

A memory controller is unaware of device types (DTs) of a plurality (N) of series-connected memory devices in an interconnection configuration. Possible DTs include, e.g., random access memories and Flash memories. First, the memory controller sends a specific DT ("don't care") and an initial number of binary code to the first device of the interconnection configuration and the binary code is propagated through the devices. Each device performs a "+1" calculation regardless of the DT. The last device provides the memory controller with N×"+1" from which the memory controller can obtain the number N of devices in the interconnection configuration. Thereafter, the memory controller sends a search number (SN) of binary code and a search DT for DT matching that propagate through the devices. Each device performs DT match determination of "previous match", "present match" and "don't care match". Based on the match determination, the SN and search DT are or not modified. The modified or non-modified SN and DT are propagated through the devices. Such processes are repeated. From the propagated SN and DT and the previously recognized number of the devices, the memory controller can identify the DT of each device in the interconnection configuration.

12 Claims, 48 Drawing Sheets

U.S. PATENT DOCUMENTS

| | | | |
|---|---|---|---|
| 4,796,231 A | 1/1989 | Pinkham | |
| 5,126,808 A | 6/1992 | Montalvo et al. | |
| 5,136,292 A | 8/1992 | Ishida | |
| 5,175,819 A | 12/1992 | Le Ngoc et al. | |
| 5,204,669 A | 4/1993 | Dorfe et al. | |
| 5,243,703 A | 9/1993 | Farmwald et al. | |
| 5,249,270 A | 9/1993 | Stewart et al. | |
| 5,280,539 A | 1/1994 | Yeom et al. | |
| 5,319,598 A | 6/1994 | Aralis et al. | |
| 5,357,621 A | 10/1994 | Cox | |
| 5,365,484 A | 11/1994 | Cleveland et al. | |
| 5,404,460 A | 4/1995 | Thomsen et al. | |
| 5,430,859 A | 7/1995 | Norman et al. | |
| 5,440,694 A | 8/1995 | Nakajima | |
| 5,452,259 A | 9/1995 | McLaury | |
| 5,473,563 A | 12/1995 | Suh et al. | |
| 5,473,566 A | 12/1995 | Rao | |
| 5,535,336 A | 7/1996 | Smith et al. | |
| 5,596,724 A | 1/1997 | Mullins et al. | |
| 5,602,780 A | 2/1997 | Diem et al. | |
| 5,636,342 A | 6/1997 | Jeffries | |
| 5,671,178 A | 9/1997 | Park et al. | |
| 5,721,840 A | 2/1998 | Soda | |
| 5,740,379 A | 4/1998 | Hartwig | |
| 5,761,146 A | 6/1998 | Yoo et al. | |
| 5,771,199 A | 6/1998 | Lee | |
| 5,802,006 A | 9/1998 | Ohta | |
| 5,806,070 A | 9/1998 | Norman et al. | |
| 5,809,070 A | 9/1998 | Krishnan et al. | |
| 5,818,785 A | 10/1998 | Ohshima | |
| 5,828,899 A | 10/1998 | Richard et al. | |
| 5,835,935 A | 11/1998 | Estakhri et al. | |
| 5,859,809 A | 1/1999 | Kim | |
| 5,872,994 A | 2/1999 | Akiyama et al. | |
| 5,937,425 A | 8/1999 | Ban | |
| 5,941,974 A | 8/1999 | Babin | |
| 5,954,804 A | 9/1999 | Farmwald et al. | |
| 5,959,930 A | 9/1999 | Sakuria | |
| 5,995,417 A | 11/1999 | Chen et al. | |
| 6,002,638 A | 12/1999 | John | |
| 6,009,479 A | 12/1999 | Jeffries | |
| 6,085,290 A | 7/2000 | Smith et al. | |
| 6,091,660 A | 7/2000 | Sasaki et al. | |
| 6,107,658 A | 8/2000 | Itoh et al. | |
| 6,144,576 A | 11/2000 | Leddige et al. | |
| 6,148,364 A | 11/2000 | Srinivasan et al. | |
| 6,178,135 B1 | 1/2001 | Kang | |
| 6,304,921 B1 | 10/2001 | Rooke | |
| 6,317,350 B1 | 11/2001 | Pereira et al. | |
| 6,317,352 B1 | 11/2001 | Halbert et al. | |
| 6,317,812 B1 | 11/2001 | Lofgren et al. | |
| 6,438,064 B2 | 8/2002 | Ooishi | |
| 6,442,098 B1 | 8/2002 | Kengeri | |
| 6,442,644 B1 | 8/2002 | Gustavson et al. | |
| 6,453,365 B1 | 9/2002 | Habot | |
| 6,535,948 B1 | 3/2003 | Wheeler et al. | |
| 6,567,904 B1 | 5/2003 | Khandekar et al. | |
| 6,584,303 B1 | 6/2003 | Kingswood et al. | |
| 6,594,183 B1 | 7/2003 | Lofgren et al. | |
| 6,601,199 B1 | 7/2003 | Fukuda et al. | |
| 6,611,466 B2 | 8/2003 | Lee et al. | |
| 6,658,509 B1 | 12/2003 | Bonella et al. | |
| 6,658,582 B1 | 12/2003 | Han | |
| 6,680,904 B1 | 1/2004 | Kaplan et al. | |
| 6,715,044 B2 | 3/2004 | Lofgren et al. | |
| 6,718,432 B1 | 4/2004 | Srinivasan | |
| 6,732,221 B2 | 5/2004 | Ban | |
| 6,754,807 B2 | 6/2004 | Parthasarathy et al. | |
| 6,763,426 B1 | 7/2004 | James et al. | |
| 6,807,103 B2 | 10/2004 | Cavaleri et al. | |
| 6,816,933 B1 | 11/2004 | Andreas | |
| 6,850,443 B2 | 2/2005 | Lofgren et al. | |
| 6,853,557 B1 | 2/2005 | Haba et al. | |
| 6,853,573 B2 | 2/2005 | Kim et al. | |
| 6,928,501 B2 | 8/2005 | Andreas et al. | |
| 6,944,697 B2 | 9/2005 | Andreas | |
| 6,950,325 B1 | 9/2005 | Chen | |
| 6,967,874 B2 | 11/2005 | Hosono | |
| 6,996,644 B2 | 2/2006 | Schoch et al. | |
| 7,032,039 B2 | 4/2006 | DeCaro | |
| 7,043,630 B1 | 5/2006 | Xia | |
| 7,062,601 B2 | 6/2006 | Becca et al. | |
| 7,073,022 B2 | 7/2006 | El-Batal et al. | |
| 7,111,085 B2 | 9/2006 | Estakhri et al. | |
| 7,151,705 B2 | 12/2006 | Polizzi et al. | |
| 7,161,842 B2 | 1/2007 | Park | |
| 7,308,524 B2 * | 12/2007 | Grundy et al. | 711/103 |
| 2002/0188781 A1 | 12/2002 | Schoch et al. | |
| 2003/0009760 A1 | 1/2003 | Sakamoto et al. | |
| 2003/0074505 A1 | 4/2003 | Andreas et al. | |
| 2003/0128702 A1 | 7/2003 | Saloh et al. | |
| 2003/0221061 A1 | 11/2003 | El-Batal et al. | |
| 2004/0001380 A1 | 1/2004 | Becca et al. | |
| 2004/0019736 A1 | 1/2004 | Kim et al. | |
| 2004/0024960 A1 | 2/2004 | King et al. | |
| 2004/0039854 A1 | 2/2004 | Estakhri et al. | |
| 2004/0148482 A1 | 7/2004 | Grundy et al. | |
| 2004/0230738 A1 | 11/2004 | Lim et al. | |
| 2005/0160218 A1 | 7/2005 | See et al. | |
| 2005/0213421 A1 | 9/2005 | Polizzi et al. | |
| 2005/0273539 A1 | 12/2005 | Yamamoto | |
| 2006/0050594 A1 | 3/2006 | Park | |
| 2006/0200602 A1 | 9/2006 | James | |
| 2007/0165457 A1 | 7/2007 | Kim | |
| 2008/0086590 A1 | 4/2008 | Urabe | |

FOREIGN PATENT DOCUMENTS

| | | |
|---|---|---|
| WO | 0169411 | 9/2001 |

OTHER PUBLICATIONS

Toshiba, "2GBIT (256×8 Bits) CMOS NAND E2PROM", TH58NVG1S3AFT05, May 19, 2003, pp. 1-32.

Atmel Corp., "High Speed Small Sectored SPI Flash Memory", pp. 1-22,2006.

64 Megabit CMOS 3.0 Volt Flash Memory with 50MHz SPI, Spanson, pp. 1-22 (2006).

King, et al., "Communicating with Daisy Chained MCP42XXX Digital Potentiometers", Microchip AN747, pp. 1-8, 2001.

Intel Corporation, "Intel Advanced + Boot Block Flash Memory (C3)", May 2005, pp. 1-72.

M-Systems Flash Disk Pioneers Ltd., "DishOnChip HI 4 Gb (512MByte) and 8 Gb (1 GByte) High Capacity Flash Disk with NAND and x2 Technology", Data Sheet, Rev. 0.5 (Preliminary), pp. 1-66,2005.

Tal, A., "Guidelines for Integrating DiskOnChip in a Host System", AP-DOC-I004, Rev. 1.0, M-Systems Flash Pioneers Lld., pp. 1-15,2004.

Samsung Electronics Co. Ltd, OneNAND4G(KFW4GI6Q2M-DEB6), OneNAND2G(KFH2GI6Q2M-DEB6), OneNAND1G(KFW1GI6Q2M-DEB6) Flash Memory, OneNANDTM Specification Ver. 1.2, pp. 1-125, Dec. 23, 2005.

Kennedy, J., et al., "A 2Gb/s Point-to-Point Heterogeneous Voltage Capable DRAM Interface for Capacity-Scalable Memory Subsystems", ISSCC 2004/Session IIDRAMI11.8, IEEE International Solid-State Circuits Conference, Feb. 15-19, 2004, vol. 1, pp. 214-523.

Kim, Jae-Kwan, et al., "A 3.6Gb/s/pin Simultaneous Bidirectional (SBD) I/0 Interface for High-Speed DRAM", ISSCC2004/Session 22/DSL and Multi-Gb/s I/0 22.7, IEEE International Solid-State Circuits Conference Feb. 15-19, 2004, vol. 1, pp. 414-415.

"HyperTransport TM I/0 Link Specification", Revision 2.00, Document No. HTC20031217-0036-00, Hypertransport Technology Consortium, pp. 1-325, Apr. 27, 2005.

"IEEE Standard for High-Bandwidth Memory Interface Based on Scalable Coherent Interface (SCI) Signaling Technology (RamLink)", IEEE Std. 1596.4-1996, The Institute of Electrical Electronics Engineers, Inc., pp. i-91, (Mar. 1996).

Oshima, et al., "High-Speed Memory Architectures for Multimedia Applications", Circuits & Devices, IEEE 8755-3996/97, pp. 8-13, Jan. 1997.

Gjessing, S., et al., "Ram Link: A High-Bandwidth Point-to-Point Memory Architecture", Proceedings CompCom 1992, IEEE 0-8186-2655-0/92, pp. 328-331, Feb. 24-28, 1992.

Gjessing, S., et al., "Performance of the Ram Link Memory Architecture", Proceedings of the Twenty-Seventh Annual Hawaii International Conference on System Sciences, IEEE 1060-3425/94, pp. 154-162, Jan. 1994.

Gjessing, S., et al., "A RAM Link for High Speed", Special Report/Memory, IEEE Spectrum, pp. 52-53, Oct. 1992.

Diamond, S.L., "SyncLink: High: High-speed DRAM for the Future", Micro Standards, IEEE Micro, pp. 74-75, Dec. 1996.

Samsung Electronics, "DDR2 Fully Buffered DIMM 240pin FBDIMMS based on 512Mb C-die" Rev. 1.3, Sep. 2006, pp. 1-32, Sep. 2006.

HyperTransport TM I/O Link Specification, Revision 3.00, Document No. HTC20051222-0046-0008, Hypertransport Technology Consortium, pp. 1-428, Apr. 2006.

Atmel "8-megabit 2.5-volt Only or 2.7-volt Only DataFlash®," Technical Specification, Atmel, Rev. 2225H-DFLSH (2004).

Samsung Electronics, "K9XXG08UXM Preliminary Flash Memory, 512×8 Bill IG×8 Bit NAND Flash Memory" Technology Specification, Samsung Electronics, May 3, 2005, 43 pages.

Microchip "1024K12CTM CMOS Serial EEPROM," Technical Specification, Microchip Product Description 24AA1025/24LC1025/24FC1025, Microchip Technology Inc., (2006).

Philips Semiconductors, "The 12C-Bus Specification," Version 2.1, Philips Semiconductors, Jan. 2000,46 pages.

Silicon Storage Technology "16 Mbit LPC Serial Flash," Preliminary Specification, Silicon Storage Technology Inc., (2006).

Silicon Storage Technology "16 Mbit SPI Serial Flash," Preliminary Specification, Silicon Storage Technology Inc., (2005), 28 pages.

STMicroelectronics Group "2Mbit, Low Voltage, Serial Flash Memory with 40 Mhz SPI Bus Interface," Technical Specification, STMicroelectronics Group of Companies (2005).

Toshiba America Electronics Components "NAND Flash Applications Design Guide," Revision 1.0, Toshiba America Electronics Components, Inc., (Apr. 2003).

McVey, "Programmable Identification for 1/0 Devices", IBM Technical Disclosure Bulletin, Aug. 1979, 2 pages.

Abad, Farley J., "U.S. Appl. No. 11/692,446, Notice of Allowance", 1-11, Sep. 7, 2010.

* cited by examiner

APPARATUS AND METHOD FOR IDENTIFYING DEVICE TYPES OF SERIES-CONNECTED DEVICES OF MIXED TYPE

CROSS REFERENCE TO RELATED APPLICATIONS

This application is a Continuation application of U.S. patent application Ser. No. 12/025,177, filed Feb. 4, 2008, now U.S. Pat. No. 7,991,925 which claims the benefit of prior U.S. Provisional Patent Application No. 60/889,572, filed Feb. 13, 2007; and U.S. Provisional Patent Application No. 60/892,712, filed Mar. 2, 2007, the disclosures of which are expressly incorporated herein by reference in their entirety.

FIELD OF THE INVENTION

The present invention relates generally to semiconductor device systems. More particularly, the present invention relates to a system including a configuration of the series-connected devices and an apparatus and method for identifying types of the devices.

BACKGROUND OF THE INVENTION

Current electronic equipment uses semiconductor devices such as, for example, memory devices and processing devices. For example, mobile electronic products such as, for example, digital cameras, portable digital assistants, portable audio/video players and mobile terminals continue to require mass storage memories, preferably non-volatile memory with ever increasing capacities and speed capabilities. Non-volatile memory and hard disk drives are preferred since data is retained in the absence of power, thus extending battery life.

While existing memory devices operate at speeds sufficient for much current consumer electronic equipment, such memory devices may not be adequate for use in future electronic products and other products where high data rates are desired. For example, a mobile multimedia device that records high definition moving pictures is likely to require a memory module with a greater programming throughput than one with current memory technology. While such a solution appears to be straightforward, there is a problem with signal quality at such high frequencies, which sets a practical limitation on the operating frequency of the memory. The memory communicates with other components using a set of parallel input/output (I/O) pins, the number of which depends on the desired configuration. The I/O pins receive command instructions and input data, and provide output data. This is commonly known as a parallel interface. High-speed operation may cause deleterious communication effects such as, for example, cross-talk, signal skew and signal attenuation, which degrade signal quality.

In order to incorporate higher density and faster operation on the system boards, there are two design techniques possible: multi-drop and serial interconnection configurations. In the multi-drop configuration, a plurality of memories is connected in-parallel to a controller. In the serial interconnection configuration, a plurality of memories is connected in-series. These design techniques may be used to overcome the density issue that determines the cost and operating efficiency of memory swapping between a hard disk and a memory system. However, multi-drop configurations have shortcomings relative to serial interconnection configurations of memory systems. For example, if the number of multi-drop memory systems increases, as a result of the loading effect of each pin, the delay time also increases so that the total performance of multi-drop is degraded by the parallel connections caused by the wire resistor-capacitor loading and the pin capacitance of the memory device. In serial interconnection configurations, control command bits, address bits, and data bits may be effectively provided through the series-connections. In the interconnection configuration, each device may have to be identified by a device identifier or a device address to operate or to respond to the controller.

SUMMARY OF THE INVENTION

In a system including a controller and a plurality of devices, the controller may be unaware of how many devices are connected thereto and/or of the device types of the connected devices. It may be required for the controller to recognize the device types of the connected devices to control the devices and address a specific one of the devices.

In accordance with one aspect of the present invention, there is provided a method for identifying a device type (DT) of a plurality of devices connected in-series in an interconnection configuration, a signal propagating through the devices, each of the devices being associated with a device type (DT) that is undefined. The method comprises: a first step for obtaining the number of the series-connected devices; and a second step for recognizing the device types.

The first step may include: incrementing a binary number included in a first propagated signal by each of the devices, an incremented binary number replacing the input binary number included in the first propagated signal; and recognizing the number of the devices in the interconnection configuration based on the binary number included in the first propagated signal from the interconnection configuration.

The second step may include: determining by each of the devices whether a search DT included in a second propagated signal through the devices of the interconnection configuration matches the DT associated with the device; modifying a binary search number (SN) included in the second propagated signal in response to a DT match determination result; and recognizing an address of a device associated with the search DT in the interconnection configuration in response to the SN included in the second propagated signal from the interconnection configuration and to the recognized number of the devices of the interconnection configuration.

In the first step, for example, the binary number and a specific DT that matches any one of the device types are propagated. In each of the devices of the interconnection configuration, the propagated specific DT matches the DT associated with the device and the device increments the binary number by, for example, one. Therefore, the binary number of the propagated signal indicates the number of the devices when it is output from the last device of the series-connected devices.

In the second step, for example, a search DT and a search number (SN) are sent to a first device of the interconnection configuration and propagated through the series-connected devices. In a case where a DT associated with a device matches the propagated search DT, the SN will be modified (e.g., incremented) by the device and the search DT is modified to the specific DT. The modified SN and DT are transmitted to a next device. Thereafter, the propagated specific DT matches any one of the remaining devices in the interconnection configuration and the propagated SN is incremented by each device. From the propagated SN from a last device of the interconnection configuration and the already recognized number of the devices, an address of the device associated with the search DT is calculated and the DT of the device is identified.

In accordance with another aspect of the present invention, there is provided a method for identifying device types (DTs) of a plurality of devices connected in-series in an interconnection configuration, each of the devices being associated with a device type (DT) that is undefined. The method comprises: issuing an interconnection input signal including a search DT and a binary search number (SN) to one of the series-connected devices, the interconnection input signal being propagated through the devices in the interconnection configuration, the SN and search DT being modifiable during propagation; determining whether the search DT included in a propagated signal matches the DT associated with the device; modifying the SN included in the propagated signal in response to a DT match determination result; and recognizing an address of a device associated with the search DT in response to the SN included in the propagated signal from another device of the series-connected devices.

For example, the step of modifying comprises: modifying the received search DT to another DT in response to the DT match determination result, thereby providing an output search DT with or without being modified. The modification may be performed by a replacer for replacing the received search DT with a specific DT that matches any one of the DTs, as the output search DT.

The method may further comprise: holding a DT match determination, thereby indicating a previous match between the DT associated with the device and the search DT. In response to the held DT match determination, it is determined whether the step of modifying the received search number (SN) is performed and whether the step of modifying the received search DT is performed.

In an embodiment, the DT of a device is determined based on the search DT. In response to the DT determination result, the received SN may be modified and the received search DT may be replaced with a specific DT that matches any one of the DTs. The modified or non-modified DT and the modified or non-modified SN are combined and combined DT+SN is transmitted to a next device of the interconnection configuration. Such combined DT+SN is propagated through the interconnection configuration.

Advantageously, the step of recognizing includes receiving the output signal from another device in the interconnection configuration, the received output signal containing the combined SN+DT. An address of the device in the interconnection configuration may be recognized in response to the SN of the received output signal.

In accordance with a further aspect of the present invention, there is provided a system comprising: a provider for providing an information input signal including a search DT and a search number (SN) of binary code; an interconnection configuration of first to N-th devices connected in-series, N being an integer greater than one, each of the devices being associated with a device type (DT) that is undefined, one of the interconnection configuration receiving the information input signal which is propagated through the devices of the interconnection configuration, the SN and search DT being modifiable during propagation in response to DT match determination by the devices; and a receiver for receiving an information output signal from another device of the interconnection configuration, the received information output signal being derived from the propagated signal and including the SN being derived from the propagated signal.

The undefined DTs associated with the devices of the interconnection configuration may include either identical DT or mixed DTs.

In the system, each of the devices may comprise: an input connection coupled to the output connection of a previous device or to the provider to receive the propagated signal as an incoming signal; and an output connection coupled to the input connection of a next device or to the receiver to transmit an outgoing signal as the propagated signal.

The provider may be configured to send the input signal to the first device of the interconnection configuration. Each of the devices may comprise a determiner for determining whether the search DT included in the propagated signal matches the DT associated with that device. The SN included in the propagated signal may be modified in response to a DT match determination result.

For example, the receiver comprises: a signal receiver for receiving an output signal from the N-th device of the interconnection configuration, the received output signal being derived from the propagated signal from the interconnection configuration, the received output signal including the SN; and a recognizer for recognizing an address of a device in the interconnection configuration in response to the SN included in the received output signal and bit information on the SN.

Advantageously, the device includes a DT replacer. When the received DT matches a reference DT associated with the device, the received DT is replaced with a specific DT that matches any one of the device types. Also, the device may include an adder of SN to modify the received SN. Furthermore, the device may include a DT match indication holder that holds the DT match determination. In a next search, the held DT match determination will cause the device to skip the DT match determination operation and the DT and SN modification.

Advantageously, the recognizer comprises a number determiner for determining the SN as zero or a maximum value in response to the SN of the received output signal and the bit information on the SN, the maximum value being defined by the bit information of the binary code. The maximum value may be $2^q$, q being the number of bits of the SN. The interconnection configuration can include the maximum number of devices therein, the maximum number being defined by q.

The system may further comprise a controller for operations of the provider and the receiver.

The system may further include a host system for communicating with the provider. The provider may provide an input signal to the series-connected devices. The input signal may include control information responding to the host system.

In accordance with yet a further aspect of the present invention there is provided an apparatus for identifying a device type (DT) of a device in an interconnection configuration of a plurality of devices connected in-series, each of the devices being associated with a device type (DT) that is undefined. The apparatus comprises: a provider for providing an interconnection input signal including a search DT and a binary search number (SN) of binary code to one of the devices in the interconnection configuration, the input signal being propagated from the series-connected devices of the interconnection configuration, the SN and search DT included in a propagated signal being modifiable during propagation in response to DT match determination by the devices; and a receiver for receiving an interconnection output signal from another device of the interconnection configuration, the received output signal including the SN being derived from the propagated signal.

The apparatus may further comprise a recognizer for recognizing an address of a device in the interconnection configuration in response to the SN included in the received output signal and the search DT.

Each of the devices may comprise: a determiner for determining whether the search DT included in the propagated signal matches the DT associated with that device; and a modifier for modifying the SN included in the propagated signal in response to a DT match determination result.

In accordance with yet a further aspect of the present invention there is provided a machine-readable medium storing commands and instructions which, when executed, cause a processor to perform a method for identifying a device type (DT) of a plurality of devices connected in-series in an interconnection configuration, each of the devices being associated with a device type (DT) that is undefined. The method comprises: issuing an interconnection input signal including a search DT and a binary search number (SN) to one of the series-connected devices, the interconnection input signal being propagated through the devices in the interconnection configuration, the SN and search DT being modifiable during propagation; determining whether the search DT included in a propagated signal matches the DT associated with the device; modifying the SN included in the propagated signal in response to a DT match determination result; and recognizing an address of a device associated with the search DT in response to the SN included in the propagated signal from another device of the series-connected devices.

In accordance with an embodiment of the present invention, there is provided a semiconductor device configured as one of a plurality of devices connected in-series in an interconnection configuration. The series-connected devices are coupled to a controller for providing device type (DT) and search number (SN) information data. The device includes a determiner for determining a device type to output a DT match determination result in response to the DT information data provided by the controller or a previous device. The device further includes a modifier for modifying DT and/or SN information data received from the controller or the previous device in response to the DT match determination result. The device further includes a transmitter for transmitting the DT and SN in a combination to the next device.

In accordance with embodiments of the present invention, there are provided a semiconductor device and a system including semiconductor devices. The semiconductor devices are such as, for example, memory devices and processing devices, which are used for electronic equipment.

In accordance with an embodiment of the present invention, there is provided a system comprising a memory controller and an interconnection configuration including N memory devices connected in-series. The memory controller is unaware of the number of the devices in the interconnection configuration, and is also unaware of the type of each of the series-connected devices. A possible device type is, e.g., various random access memories (e.g., DRAM, SRAM, MRAM) and various Flash memories (e.g., NAND-, NOR-, AND-type Flash memories).

Device type (DT) information associated with each of the devices is provided by a storage in each of the devices. Upon receipt of a search DT, a device performs a DT determination between the received DT and the associated DT. Each device is configured to able of performing a "+1" to an input search number (SN) in response to a DT match determination result.

First, the memory controller sends a specific device type (DT) ("don't care") and an initial SN. The don't care DT matches any DT and each device performs the "+1" calculation of a received search number SN. The calculated or incremented SN is sent to a next device. As such, the search number SN is incremented or calculated by each of the series-connected devices during propagation. The N-th (or last) device of the interconnection configuration provides the memory controller with an N×"+1" search number from which the memory controller can recognize the number of devices in the interconnection configuration.

In a case of the search number SN being a binary code of q-bits, the propagated SN may be zero ("0-0"), after modified by the series-connected devices, the interconnection configuration may have the maximum number of devices, i.e., $2^q$. In such a case, the memory controller (recognizing circuitry) may incorrectly identify the number of devices in the interconnection configuration is zero. When the received SN is a binary number of zero, additional operations are performed to distinguish the SN being zero or not. If it is identified as "not zero", then, the number of the devices will be identified as the maximum number (i.e., $2^q$).

Thereafter, the memory controller sends and an input search number of binary and a pre-determined device type for DT matching. Each device performs DT match determination of a "previous match", a "present match" and a "don't care match". Based on the match determination, the input search number is either modified or not modified, and propagated through the devices of the interconnection configuration. From the propagated SN, the memory controller can identify the DT of each device that is associated with the DT sent by the memory controller. Similar processes are repeated with other DTs.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached figures, wherein.

DETAILED DESCRIPTION

Figure 1:
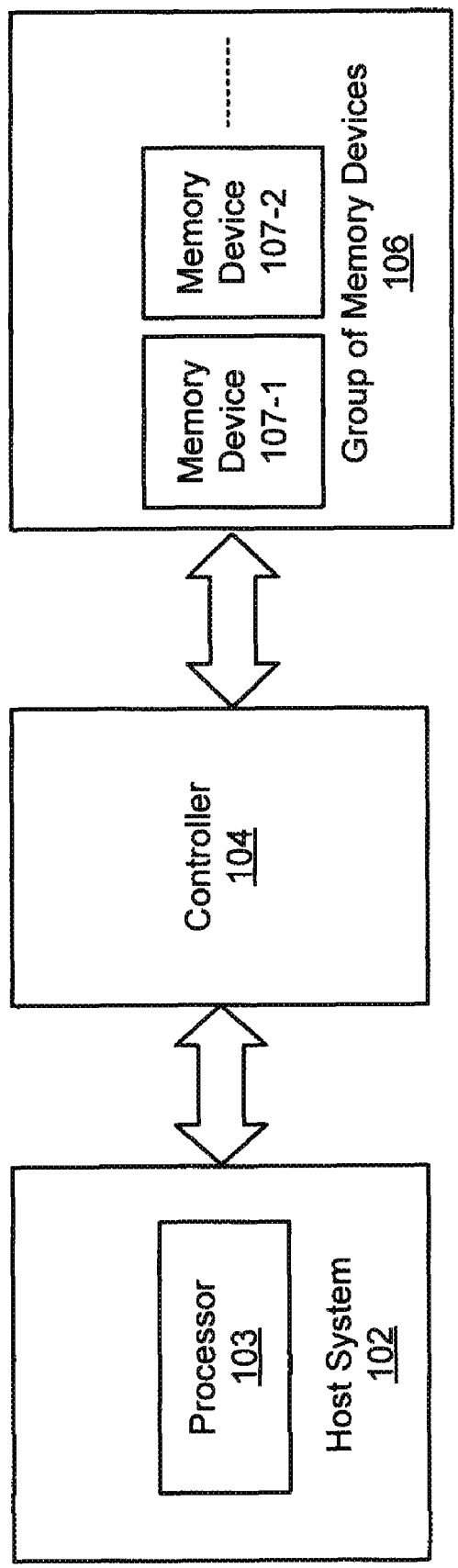
FIG. 1 is a block diagram illustrating an example of a global system to which embodiments of the present invention are applicable.

In the following detailed description of embodiments of the present invention, reference is made to the accompanying drawings, which form a part hereof, and in which is shown, by way of illustration, embodiments in which the present invention may be practiced. These embodiments are described in sufficient detail to enable those of ordinary skill in the art to practice the present invention. It is to be understood that other embodiments may be utilized and that logical, electrical, and other changes may be made without departing from the scope of the present invention. The following detailed description is, therefore, not to be taken in a limiting sense, and the scope of the present invention is defined by the appended claims.

Generally, the present invention provides an apparatus and method for processing data in semiconductor device systems.

Some memory subsystems employ multiple memory devices, such as, for example, Flash memory devices, with interfaces. Here, the command string may be fed to all of the devices even though the command may only be performed on one of the devices. To select the device on which the command is to be performed, the command string may contain a device identifier (ID) or a device address (DA) that identifies the memory device to which the command is directed. Each device receives the command string and compares the ID contained in the command string to an ID or device address (DA) associated with the device. If the two IDs match, the device in question will assume that the command is directed to it to execute the command.

Such an arrangement requires the assignment of an ID for each device, the ID being used for addressing the device. One technique to assign an ID for a device is to hardwire an internal, unique, ID into the device. One drawback with this approach, however, is that if large volumes of devices are used, the size of the ID may have to be quite large in order to ensure that each device contains a unique ID. Managing a large-sized ID may add significant complexity to the device, which in turn may increase the cost of producing the devices.

Another approach to assigning IDs to devices involves externally hardwiring an ID for each device. Here, the ID may be specified by wiring various pins on the device to certain states to assign an ID for the device. The device reads the wired state of the pins and assigns its ID from the read state. One drawback with this approach, however, is that external wiring is needed to assign the ID for each device. This may add to the complexity of, e.g., printed circuit boards (PCBs) that hold the memory devices. Another drawback with this approach is that it may require pins to be dedicated for the assignment of the ID. This may consume precious resources that could be otherwise better used. In addition, dedicating pins for the assignment of the ID may require a greater footprint for the device than if pins were not used to assign the ID.

One example to address at least some of these shortcomings is to automatically assign an ID for a device in an interconnection configuration including a plurality of devices, in a manner that does not require special internal or external hardwiring of the ID. In the automatic ID assignment, an input signal is transferred to a first device in an interconnection configuration. Then, a generator of the device generates an ID in response to the input signal and a transmitter transfers an output signal associated with the ID to a second device. The second device generates another ID and transmits to a next device. As such, the devices generate successive IDs. Details of ID generation for an interconnection configuration of memory devices are disclosed in U.S. Provisional Patent Application No. 60/787,710 filed Mar. 28, 2006 and U.S. Provisional Patent Application No. 60/802,645 filed May 23, 2006, the contents of which are incorporated herein by reference in their entirety. Also, a packet based ID generation is disclosed in U.S. patent application Ser. No. 11/529,293 filed Sep. 29, 2006, the content of which is incorporated herein by reference in its entirety. These techniques are related to the generation of IDs by the devices themselves in the interconnection configuration.

It may be required to identify a device type of each device in an interconnection configuration, wherein the device types are unknown to the memory controller. Examples of an interconnection configuration of memory devices of mixed type are disclosed in U.S. Provisional Patent Application No. 60/868,773 filed Dec. 6, 2006, the disclosure of which is incorporated herein by reference in its entirety.

Once the device type of each device is identified, with reference to the "absolute" device address, the memory controller can access an intended (or designated) device associated with that address and perform operations in accordance with the identified type of the device.

Examples of the present invention will now be described with reference to an interconnection configuration of devices, the device types of which are unidentified, or unknown, to their related memory controller.

FIG. 1 shows an example of a global system to which embodiments of the present invention are applicable. Referring to FIG. 1, a host system 102 having a processor 103 therein is connected to a system that includes a group 106 of semiconductor devices and a controller 104 for communicating with the devices. For example, the group 106 includes a plurality of semiconductor devices 107-1, 107-2, - - - . The controller 104 receives requests from the host system 102 and translates the requests into commands that are interpretable by the semiconductor devices of the group 106. The controller 104 also translates logical addresses for the devices that are used by the host system 102 into physical addresses of the device. In a case where the devices 107-1, 107-2, - - - are memory devices, e.g., Flash memory devices, the controller 104 ensures that data to be stored in the memory device is properly distributed among the memory devices 107-1, 107-2, - - - . The devices may be other semiconductor devices.

Figure 2:
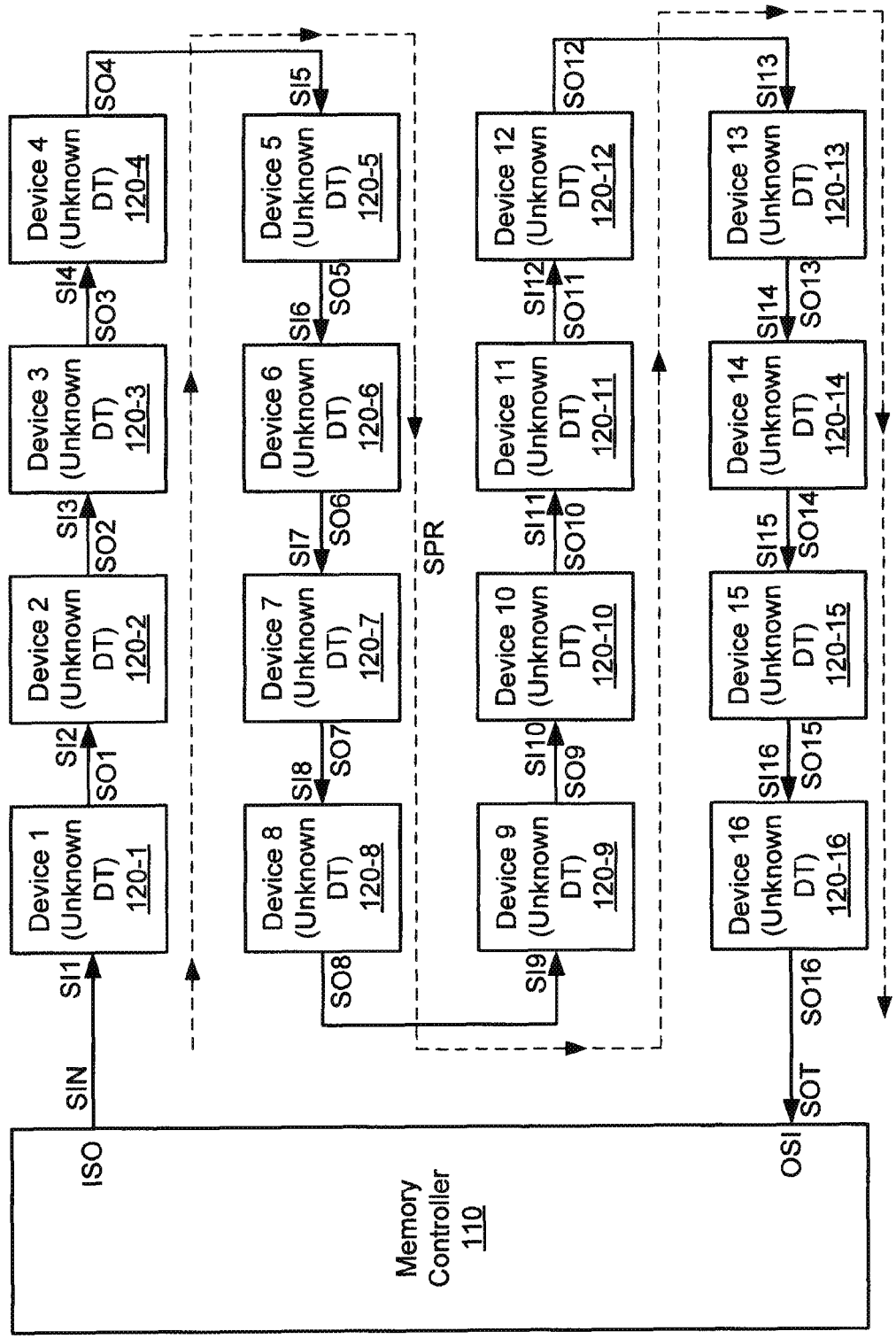
FIG. 2 is a block diagram illustrating an example of a system including a plurality of memory devices in an interconnection configuration to which embodiments of the present invention are applicable.

FIG. 2 shows an example of a system in which embodiments of the present invention are implemented. The system includes a memory controller and a plurality of memory devices in an interconnection configuration that correspond to the controller 104 and the group 106 of devices of FIG. 1, respectively.

In the particular example shown in FIG. 2, it is assumed that the memory controller is unaware of the number N of memory devices in the interconnection configuration. It is also assumed that a device type of each of the memory devices is unknown to the memory controller. In the particular example shown in FIG. 2, the number N of memory devices in the interconnection configuration is 16 and the device types of the 16 memory devices are unknown to the memory controller. For example, the device have different types (i.e., the types of devices are "mixed").

The example of FIG. 2 shows 16 devices. It will be apparent to those of ordinary skill in the art that any number of devices can be connected in-series in the interconnection configuration. The number is not, however, known to the memory controller.

Referring to FIG. 2, a memory controller 110 is coupled to the interconnection configuration of the N memory devices that are connected in-series (in this example, devices 1-16, 120-1-120-16). The series-connected memory devices in the interconnection configuration are of any type of memories, such as, for example, random access memories and Flash memories. For example, the random access memories are dynamic random access memory (DRAM), static random access memory (SRAM), magnetoresistive random access memory (MRAM) and other semiconductor memories. Flash memories are, for example, NAND-type, NOR-type, AND-type, and other type of Flash memories. The memory devices may be other types of semiconductor devices.

Each of the devices has a similar structure and has input and output connections. The input and output connections of each device are coupled to an output connection of a previous device and an input connection of a next device, respectively. The input connection of the first device (Device 1, 120-1) and the output of the last device (N-th device: Device 16, 120-16) are coupled to an input signal output connection ISO (hereinafter referred to as "ISO connection") and an output signal input connection OSI (hereinafter referred to as "OSI connection") of the memory controller 110, respectively.

The memory controller 110 sends an interconnection input signal SIN (hereinafter referred to as "SIN signal") over the ISO connection to the interconnection configuration. The SIN signal contains various information on instructions and data for system operation. The SIN signal is first fed to Device 1, 120-1 and subsequently propagated through the series-connected devices of the interconnection configuration as shown by SPR. Each of the devices receives the propagated signal from a previous device as an incoming signal and transfers as an outgoing signal to a next device. At an i-th device, an outgoing signal SO(i−1) from a previous device 120-(i−1) is fed as an incoming signal SIi and an outgoing signal SOi is provided therefrom to a next device 120-(i+1). The last device (Device 16, 120-16) provides its outgoing signal SO16, which is derived from the propagated signal SPR, to the OSI connection of the memory controller 110. The signal fed to the OSI connection is an interconnection output signal SOT (hereinafter referred to as "SOT signal").

Figure 3:
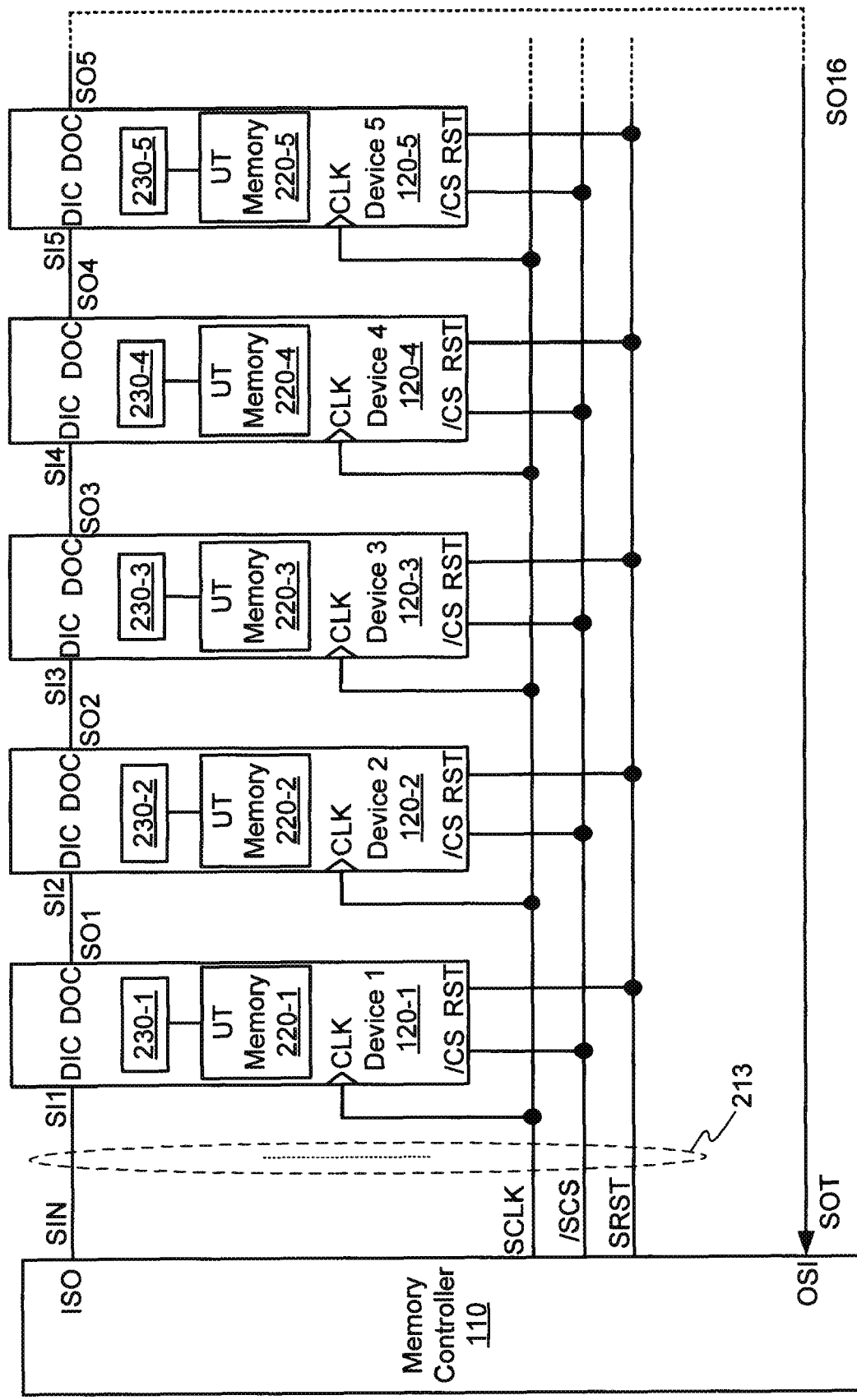
FIG. 3 is a block diagram illustrating an example of part of the interconnection configuration shown in FIG. 2.

FIG. 3 shows part of the system of FIG. 2 in more details. Referring to FIGS. 2 and 3, part of the interconnection configuration includes unknown type (UT) devices 1-5(120-1-120-5). Devices 1-5 (120-1-120-5) are associated with memories 220-1-220-5, respectively. A memory type of each device is unknown to the memory controller 110. Device types of devices 1-5 may be identical or mixed. Each of the unknown type (UT) memories 220-1-220-5 may be a NAND-type Flash memory, a NOR-type Flash memory, DRAM, SRAM, MRAM or another type memory. Devices 1-5 (120-1-120-5) are provided with device controllers 230-1-230-5, respectively. In each of the devices, the device controller controls operations of the device and is connected to the unknown type memory to access it for data processing.

The series-connected devices have the similar structure as the others, but their memory types may be different. Each of the devices has a device input connection DIC (hereinafter referred to as "DIC connection"), a device output connection DOC (hereinafter referred to as "DOC connection"), a chip select input connection/CS (hereinafter referred to as "ICS connection"), a clock input connection CLK (hereinafter referred to as "CLK connection")) and a reset input connection RST (hereinafter referred to as "RST connection").

The memory controller 110 provides a group of signals 213 containing SIN signal, chip select signal /SCS, clock signal SCLK, reset signal SRST and other signals (not shown) representing various information on control, data and others. In the particular example shown in FIG. 3, the chip select signal /SCS, the clock signal SCLK and the reset signal SRST are commonly fed to all of the series-connected devices. The system implements a common source clocking structure. A source synchronous clocking structure may be applicable and each device may need to include clock synchronous circuitry (e.g., phase-locked loop or delay-locked loop).

In a normal operation mode of the system, the SIN signal includes a device address (e.g., address "3") of a designated or target device, an instruction command (e.g., a write command) to be executed by the designated device, a memory address, data to be processed by the designated device in accordance with the memory address, and others. The SIN signal is propagated through non-designated devices without being processed (or altered). With reference to the transferred address, a device can recognize that it is the designated (or target) device. The designated (or addressed) device receives the transferred information and executes the command. Then, the processed (or altered) information is transmitted to a next device. The processed information is further transferred through non-designated devices. As such, the information included in the SIN signal is propagated through the series-connected devices in the interconnection configuration with or without being altered. The propagated information is contained in the SOT signal provided from the last device to the memory controller 110.

The SIN signal is fed through the ISO connection of the memory controller 110, as an input signal SI1 (incoming signal), to the DIC connection of Device 1, 120-1. The device controller 230-1 of the device 120-1 executes command (e.g., read or write data) contained in the input signal SI1 in the event that the device is designated in accordance with the device address. If the device 120-1 is not designated, the information of the signal SI1 is forwarded. Device 1 outputs an output signal SO1 (outgoing signal) from its DOC connection to a next device (i.e., Device 2, 120-2) to transmit processed data or forward the input information. The device 120-2 receives the output signal SO1 as an input signal SI2 and outputs an output signal SO2. Each of the devices performs similar functions and thus, the SIN signal is propagated through the series-connected devices with or without being altered. The SOT signal, or SO16, derived from the propagated SIN signal is fed from the DOC connection of the last device (i.e., Device 16) to the memory controller 110 through its OSI connection.

Figure 4:
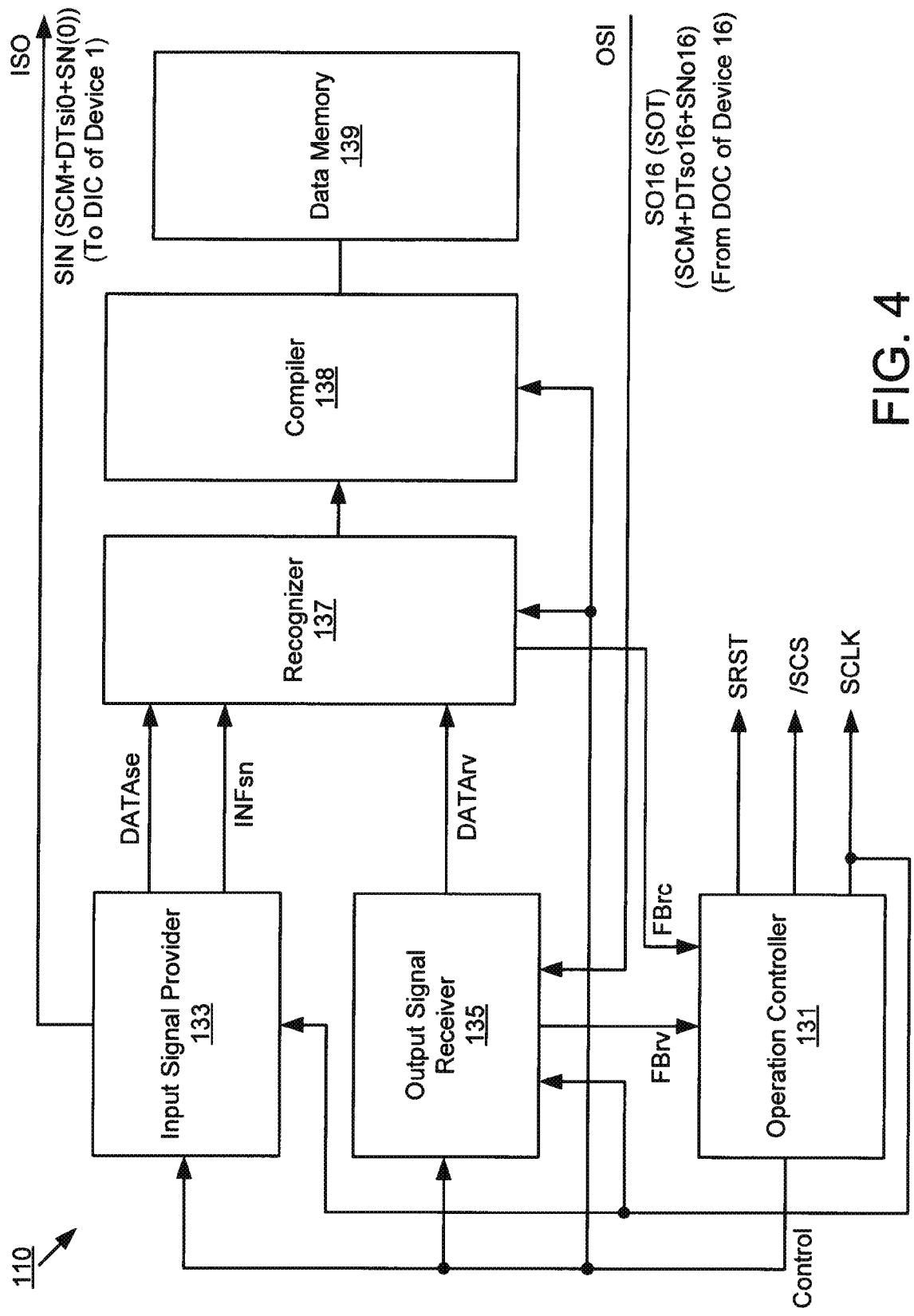
FIG. 4 is a block diagram illustrating an example of a memory controller shown in FIG. 2.

FIG. 4 shows details of the memory controller 110 shown in FIG. 2. Referring to FIGS. 2-4, the memory controller 110 includes an operation controller 131, an input signal provider 133, an output signal receiver 135, a recognizer 137, a compiler 138 and a data memory 139. The operation controller 131 provides the clock signal SCLK, the chip select signal /SCS and the reset signal SRST to the devices 120-1-120-16 of the interconnection configuration. The clock signal SCLK is provided to the input signal provider 133 and the output signal receiver 135 for their operations. The operations of the input signal provider 133, the output signal receiver 135, the recognizer 137 and the compiler 138 are controlled by the operation controller 131. The input signal provider 133 sends the SIN signal through the ISO connection to the first device (Device 1, 120-1) of the interconnection configuration.

In the device type identification process, the SIN signal contains a search command SCM, an initial search device type DTsi0 and an initial search number SN(0). The search command SCM, a modified or non-modified device type DT and a modified or non-modified search number SN are propagated through the series-connected devices. Each device performs a DT match determination and modifies (or alters) the DT and the SN in response to the DT match determination. The modified or non-modified DT and SN accompanying the search command SCM are transmitted from the DOC connection of one device to the DIC connection of the next device. The propagated SIN signal, is provided as the SOT signal to the memory controller 110. The output signal receiver 135 receives the SOT signal through the OSI connection from the last device (Device 16, 120-16) of the interconnection configuration.

The input signal provider 133 provides the recognizer 137 with data DATAse that is sent through the ISO connection to Device 1. Also, the input signal provider 133 provides information INFsn on the bit number q of the initial search number SN(0) to the recognizer 137. The output signal receiver 135 provides the recognizer 137 with data DATArv that is received through the OSI connection. The recognizer 137 performs data recognition in response to the data DATAse and DATArv and the bit information INFsn. The recognizer 137 provides the recognized data to the compiler 138. Based on the data recognition, the compiler 138 performs compiling of data and provides data and/or compiled data to the data memory 139 for storing the provided data and compiled data. The operation controller 131 receives feedback information FBrv from the output signal receiver 135 and feedback information FBrc from the recognizer 137 for use in a control of the input signal provider 133 and of the output signal receiver 135.

Figure 5:
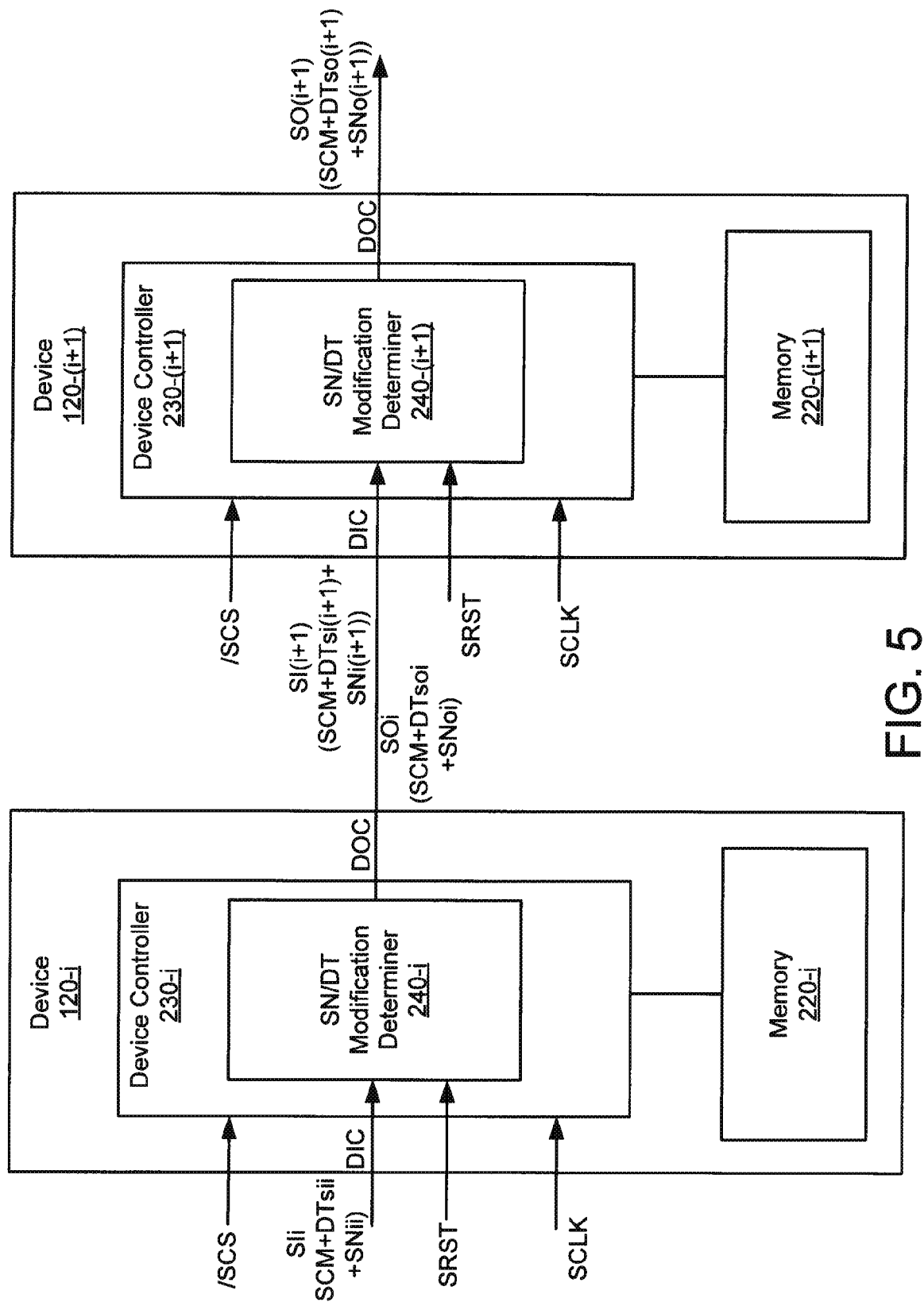
FIG. 5 is a block diagram illustrating two interconnected devices in the interconnection configuration shown in FIG. 3.

FIG. 5 shows two neighboring devices in the interconnection configuration shown in FIG. 3. Referring to FIG. 5, a device 120-i represents one of the devices 120-1-120-5 shown in FIG. 3 and another device 120-(i+1) represents the next device to device 120-i. Each device has a similar structure. The device 120-i includes a device controller 230-i and a memory 220-i connected thereto. The types of memories are unknown to the memory controller 110, because they have not been detected (or identified). Similarly, the next device 120-(i+1) includes a device controller 230-(i+1) and a memory 220-(i+1) connected thereto. Each device controller includes a processor for processing data and executing commands (not shown). In the particular example shown in FIG. 5, only a search number (SN)/device type (DT) modification determiner is shown as included in the device controller. In the device type identification process, an SN/DT modification determiner 240-i of the device 120-i receives an input signal SIi containing a search command SCM, a search device type DTsii and a search number SNii from a previous device and performs a DT match determination, a device type (DT) modification and a search number (SN) modification. The device 120-i outputs an output signal SOi containing the search command SCM, an output device type DTsoi and an output search number SNoi. The output signal SOi is transmitted to the next device 120-(i+1) that performs similar functions as the device 120-i.

For example, the commands of the input signal SIi are a search command SCM, a read command and a write command of p-bits (e.g., p being eight). The search command is used in an initial or set-up phase. The read and write commands are used in a normal operation mode. The device type (DT) contains m bits (e.g., eight bits) and the search number (SN) contains n bits (e.g., eight bits). The DT and/or SN is propagated through the devices in the interconnection configuration with or without being modified (or altered) together with a command (e.g., the search command SCM).

Figure 6:
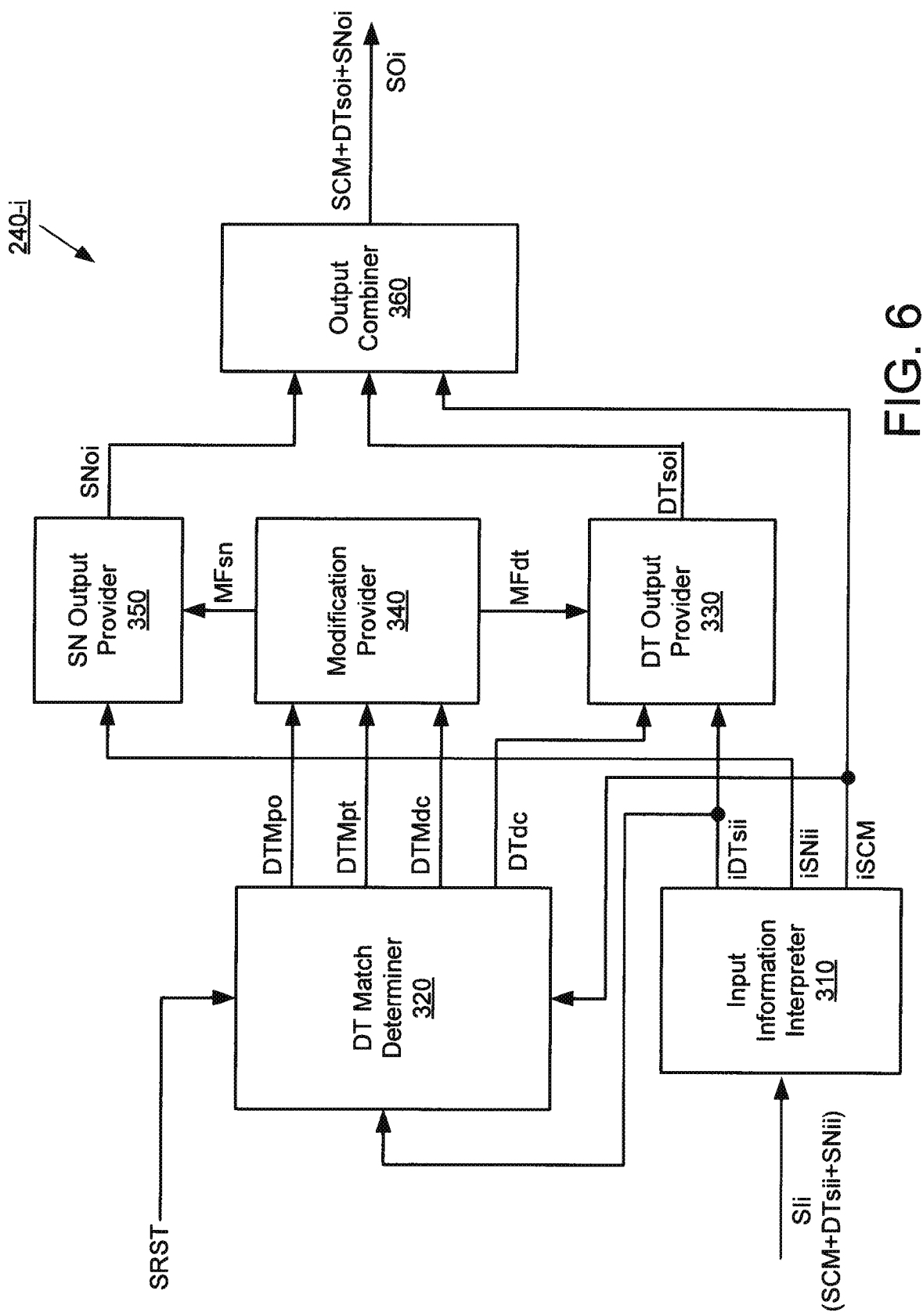
FIG. 6 is a block diagram illustrating an example of a search number (SN)/device type (DT) modification determiner shown in FIG. 5.

FIG. 6 shows details of the SN/DT modification determiner shown in FIG. 5. Referring to FIGS. 5 and 6, the SN/DT modification determiner 240-i includes an input information interpreter 310, a DT match determiner 320, a DT output provider 330, a modification provider 340, a search number (SN) output provider 350 and an output combiner 360. The input signal SIi is fed to the input information interpreter 310 that interprets the search command SCM, the search device type DTsii and the search number SNii contained in the input signal SIi and interpreted search number, search device type and search command are output as internal search number iSNii, search device type iDTsii and search command iSCM. The internal search device type iDTsii is provided to the DT match determiner 320 and the DT output provider 330. The internal search number iSNii is fed to the SN output provider 350. The internal search command iSCM is fed to the DT match determiner 320 and the output combiner 360.

The DT match determiner 320 performs the DT match determination based on the input internal search device type iDTsii in response to the internal search command iSCM and outputs a present DT match indication DTMpt, a "don't care" DT match indication DTMdc and a previous DT match indication DTMpo that are fed to the modification provider 340. The DT match determiner 320 provides a "don't care" code DTdc to the DT output provider 330.

In response to the present DT match indication DTMpt, the "don't care" DT match indication DTMdc and the previous DT match indication DTMpo, the modification provider 340 performs modification determination functions and provides a search number (SN) modifying indication MFsn to the SN output provider 350 and a device type (DT) modifying indication MFdt to the DT output provider 330.

The SN output provider 350 modifies the internal search number iSNii in response to the SN modifying indication MFsn, and provides an output search number SNoi. The DT output provider 330 modifies the input device type by selecting one of the internal search device type iDTsii and the don't care code DTdc in response to the DT modifying indication MFdt, so that an output device type DTsoi is provided. In this particular example, the output device type DTsoi is either the internal search device type iDTsii or the don't care code DTdc. The output combiner 360 receives the output search number SNoi, the output device type DTsoi and the internal search command iSCM and combines them to output combined SCM+DTsoi+SNoi. The combined SCM+DTsoi+SNoi is provided by the SN/DT modification determiner 240-i of the device 120-i to the next device 120-(i+1).

Figure 7:
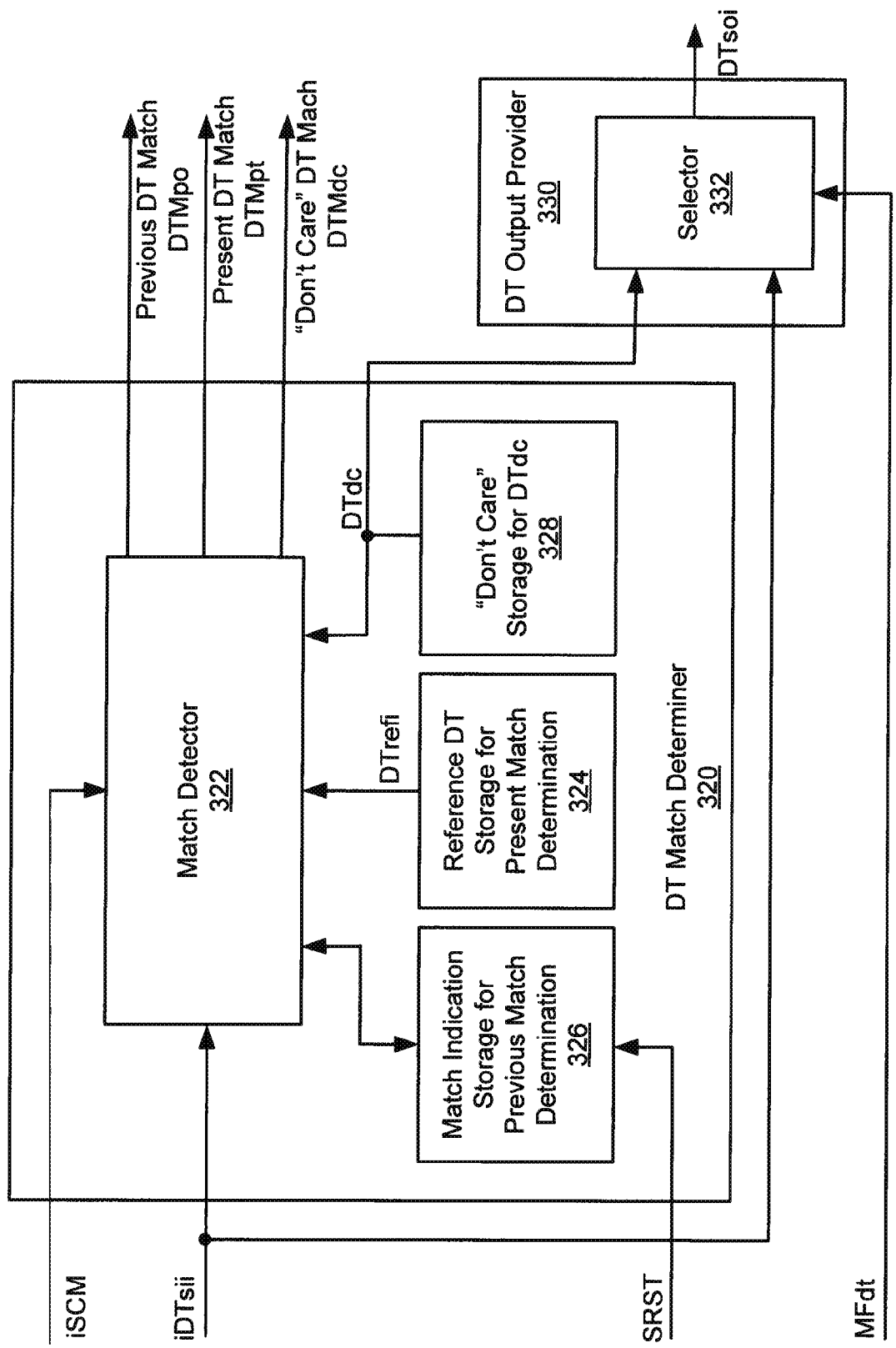
FIG. 7 is a block diagram illustrating details of a DT match determiner and a DT output provider shown in FIG. 6.

FIG. 7 shows details of the DT match determiner 320 and of the DT output provider 330 shown in FIG. 6. Referring to FIGS. 3-7, the DT match determiner 320 (of a present device DVi: the present device 120-i as shown in FIG. 5) includes a match detector 322 that is activated by the internal search command iSCM. The match detector 322, which is, e.g., a q-bit comparator, is connected to three storages: a reference DT storage 324, a match indication storage 326 (e.g., a one-bit register) and a "don't care" storage 328. The reference DT storage 324 stores a reference device type DTrefi associated with the present device DVi, which indicates the type of the memory 220-i included in the device DVi. The reference device type DTrefi is provided to the match detector 322. When the match detector 322 compares the internal search device type iDTsii with the reference device type DTrefi and finds a match between them, the match indication is stored in the match indication storage 326. The match indication is held until the match indication storage 326 is reset or powered-off. Thereafter, the match indication is held as a "previous match" indication that is provided to the match detector 322. The other storage 328 stores the "don't care" code DTdc that is fed to the match detector 322. The "don't care" code DTdc is pre-defined.

In response to the internal search device type iDTsii, the match detector 322 performs a DT match determination with reference to the previous match indication, the don't care code DTdc and the reference device type DTrefi. When the determination function of the match detector 322 is activated, (i) if the previous match indication is found or detected in the match indication storage 326, the previous DT match indication DTMpo will be output;

(ii) if a match with the "don't care" code DTdc is detected, the "don't care" DT match indication DTMdc will be output; and (iii) if there is a match between the internal search device type iDTsii and the reference device type DTrefi, the present DT match indication DTMpt will be output.

The DT output provider 330 includes a selector 332 that receives the input internal search device type iDTsii and the don't care code DTdc. In response to the DT modifying indication MFdt, the selector 332 selects one of the internal search device type iDTsii and the don't care code DTdc and outputs the selected one as the output device type DTsoi.

Figure 8:
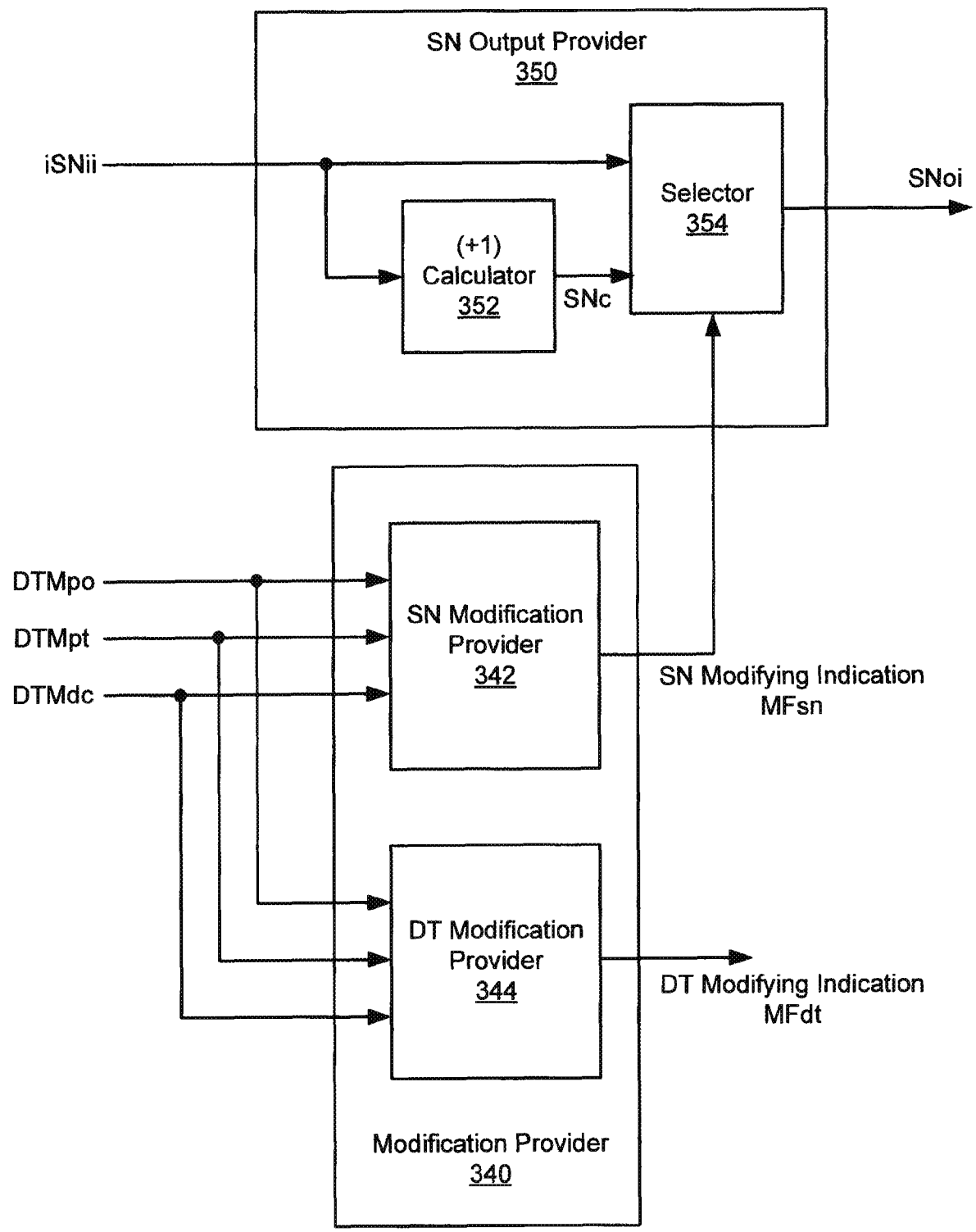
FIG. 8 is a block diagram illustrating details of a modification provider and a search number (SN) output provider shown in FIG. 6.

FIG. 8 shows details of the modification provider 340 and the SN output provider 350 shown in FIG. 6. Referring to FIGS. 6 and 8, the modification provider 340 includes a search number (SN) modification provider 342 and a device type (DT) modification provider 344, which receive the previous DT match indication DTMpo, the "don't care" DT match indication DTMdc and the present DT match indication DTMpt. The SN modification provider 342 enables the SN modifying indication MFsn when an enabled present DT match indication DTMpt or an enabled "don't care" DT match indication DTMdc is input thereto. The DT modification provider 344 enables the DT modifying indication MFdt only when an enabled present DT match indication DTMpt is input thereto.

The SN output provider 350 includes a calculator 352 and a selector 354. The internal search number iSNii is fed to the calculator 352 and the selector 354. The calculator 352 performs an arithmetic operation, the arithmetic result SNc of which is fed to the selector 354. In response to the SN modifying indication MFsn from the SN modification provider 342, the selector 354 selects one of the internal search number iSNii and the arithmetic result SNc and the selected one is output as the output search number SNoi. In this particular example, the calculator 352 performs an adding operation ("+1") and thus, the SNc is "internal search number iSNii+1". Alternatively, another calculation with another value can be applicable.

The output search number SNoi, the output device type DTsoi and the internal search command iSCM are input to the output combiner 360, by which they are combined, with the result that the combined SCM+DTsoi+SNoi is output as the output signal SOi, as shown in FIG. 6.

Again referring to FIG. 7, the reference DT storage 324 is a reference device type provider that is, for example, a one-time-programmable (OTP) element configured by a non-volatile memory. The OTP element stores a device type number as a device type reference (reference device type DTref) that is programmed to the device prior to the system operation. Alternatively, the device type number storage is a programmable memory that can store a device type number or value as a device type reference (reference device type DTref) programmed to the device prior to performing the SN and DT modification process. Table 1 shows an example of the definition of device types in byte code.

TABLE 1

| Device Type | HEX | Bit 7 | Bit 6 | Bit 5 | Bit 4 | Bit 3 | Bit 2 | Bit 1 | Bit 0 |
|---|---|---|---|---|---|---|---|---|---|
| NAND Flash (DTnd) | 00h | 0 | 0 | 0 | 0 | 0 | 0 | 0 | 0 |
| NOR Flash (DTnr) | 01h | 0 | 0 | 0 | 0 | 0 | 0 | 0 | 1 |
| AND Flash (DTad) | 02h | 0 | 0 | 0 | 0 | 0 | 0 | 1 | 0 |
| DRAM (DTdm) | 03h | 0 | 0 | 0 | 0 | 0 | 0 | 1 | 1 |
| SRAM (DTsm) | 04h | 0 | 0 | 0 | 0 | 0 | 1 | 0 | 0 |
| MRAM (DTmm) | 05h | 0 | 0 | 0 | 0 | 0 | 1 | 0 | 1 |
| — | — | — | — | — | — | — | — | — | — |
| — | — | — | — | — | — | — | — | — | — |
| — | — | — | — | — | — | — | — | — | — |
| Not Used* | FFh | 1 | 1 | 1 | 1 | 1 | 1 | 1 | 1 |

As shown in Table 1 (*), a device type of all bits being "1" is not used as a reference device type. Such a bit structure is pre-defined to be used as a "don't care" code DTdc as a device type. The storage 328 stores the "don't care" code. Alternatively, the storage 328 is provided with a code generator that generates the pre-determined code to be fed to the match determiner 322 and the DT output provider 330. Those of ordinary skill in the art understand that the definitions of the device types in Table 1 can be changed and that more device types can be added.

Figure 9:
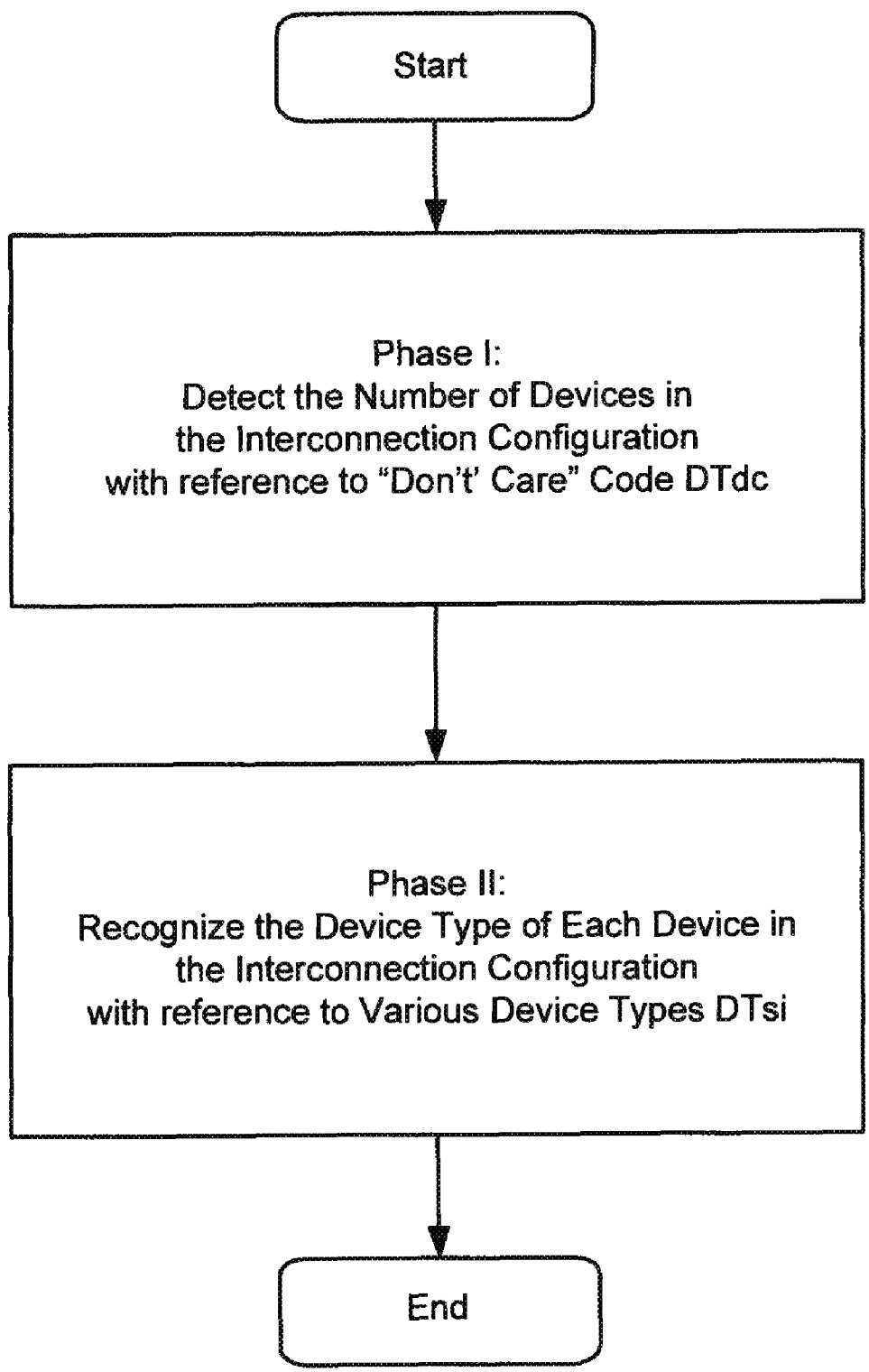
FIG. 9 is a flow chart illustrating a process conducted by the system shown in FIG. 2.

FIG. 9 shows a process conducted by the system shown in FIG. 2. As shown in FIG. 9, the device identification process includes two phases. Phase I is to detect and obtain the number of devices Ndv in the series-connection using the "don't care" code DTdc. Phase II is to identify the device type of each device using various search device types, after obtaining the number of devices Ndv upon completion of the Phase I operations.

Figure 10:
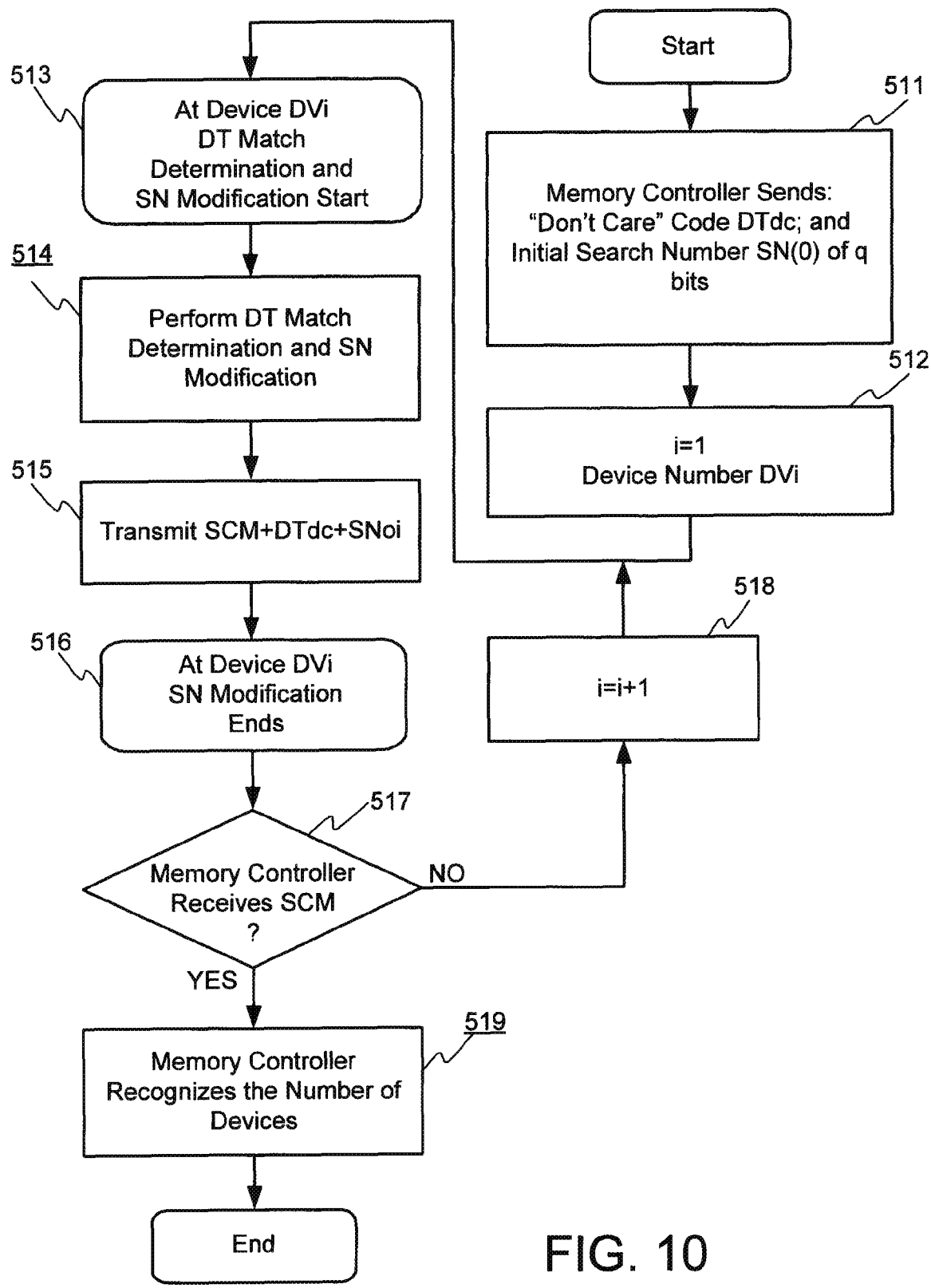
FIG. 10 is a flow chart illustrating an example method for identifying the number of devices in the interconnection configuration shown in FIG. 2.

FIG. 10 shows a method for identifying the number of devices in the interconnection configuration shown in FIG. 2. The method shown in FIG. 10 is to perform operations of Phase I shown in FIG. 9.

Referring to FIGS. 2-10, under control of the memory controller 110, the input signal provider 133 sends the search command SCM, the "don't care" code DTdc and an initial search number SN(0) to the first device (Device 1, 120-1) of the interconnection configuration (step 511). In the particular example shown in the figures, the initial search number SN(0) is a binary code and has q bits, q being an integer (e.g., four). The search command SCM, the don't care code DTdc and the initial search number SN(0) are as DATAse fed to the recognizer 137. Also, the bit information INFsn (i.e., q) is fed to the recognizer 137.

For the operations of each device, first, a device number i is assigned as 1 (step 512). The i-th device DVi, which corresponds to the present device 120-i as shown in FIG. 5, starts a search number (SN) modification process (step 513). The present device DVi (e.g., Device 2) receives, from a previous device DV(i−1), for example, Device 1, the search number SNii and the device type DTdc accompanying the search command SCM. The device DVi performs a device type (DT) match determination and the SN modification (step 514). Details of step 514 will be described later with reference to FIG. 16. The device DVi outputs a modified SN as an output search number SNoi in response to a DT match determination result. Upon completion of the DT match determination and the SN modification, a combination of the search command SCM, the don't care code DTdc and the output search number SNoi (SCM+DTdc+SNoi) is transmitted to a next device DV(i+1) (step 515). At device DVi, the DT match determination and the SN modification end (step 516). If the next device DV(i+1) that received the combined information from the present device DVi is another device in the interconnection configuration, the present device DVi will not be determined as the last device in the interconnection configuration (NO at step 517). Then, the next device DV(i+1) operates as a present device DVi (step 518) and the operations at steps 513-516 are performed. Such operations are repeated by all of the devices in the interconnection configuration.

If the next device DV(i+1) that received the combined information from the present device DVi is the memory controller 110, the present device DVi will be determined as the last device in the interconnection configuration (YES at step 517). This is determined whether the memory controller 110 (the output signal receiver 135) received the search command SCM in the SOT signal from the last device. If the output signal receiver 135 finds the SCM in the received data DATArv, the feedback information FBrv is provided to the operation controller 131. Then, the memory controller 110 recognizes from the received SOT signal the number of devices Ndv of the interconnection configuration (step 519). The SOT signal from the last device 120-16 contains the modified SN that indicates the number of devices. With the received data DATArv, the recognizer 137 of the memory controller 110 recognizes the number of devices Ndv.

Figure 11:
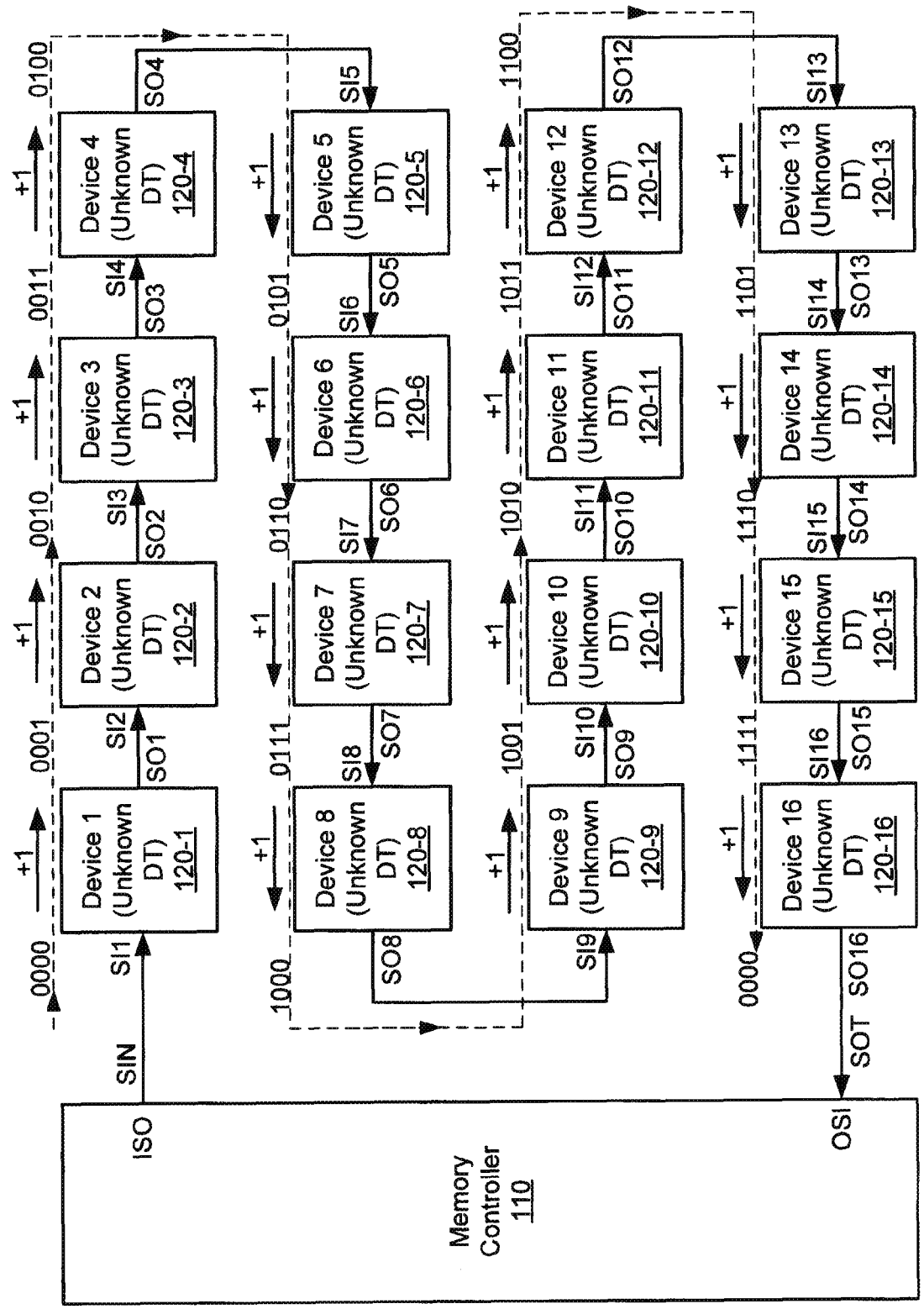
FIG. 11 is a schematic diagram illustrating a protocol conducted in the devices shown in FIG. 2, with a search device type DTsi of a "don't care" code.

In the event that a search device type DTsi of the input signal SI is a "don't care" code DTdc, it matches any one of devices types. With the device type match, every device modifies the input search number SNii to SNii+1 (at step 514) that is provided as the search number to the next device. If the number of the devices is 16 ($2^4$) and the initial search number of four bits is provided, the output from the last device will be zero (0=binary code "0000") as shown in FIG. 11.

The initial search number SN(0) and the propagated SN are binary codes of q bits. In the case where the number of the devices in the interconnection configuration is the maximum number (i.e., $2^q$), the propagated SN (the number of devices Ndv) is "0-0". Thus, it is required to distinguish the number of devices Ndv is "0" or the maximum number. In the particular example, the operation at step 519 shown in FIG. 10 needs to perform such a distinguishing operation.

Figure 12:
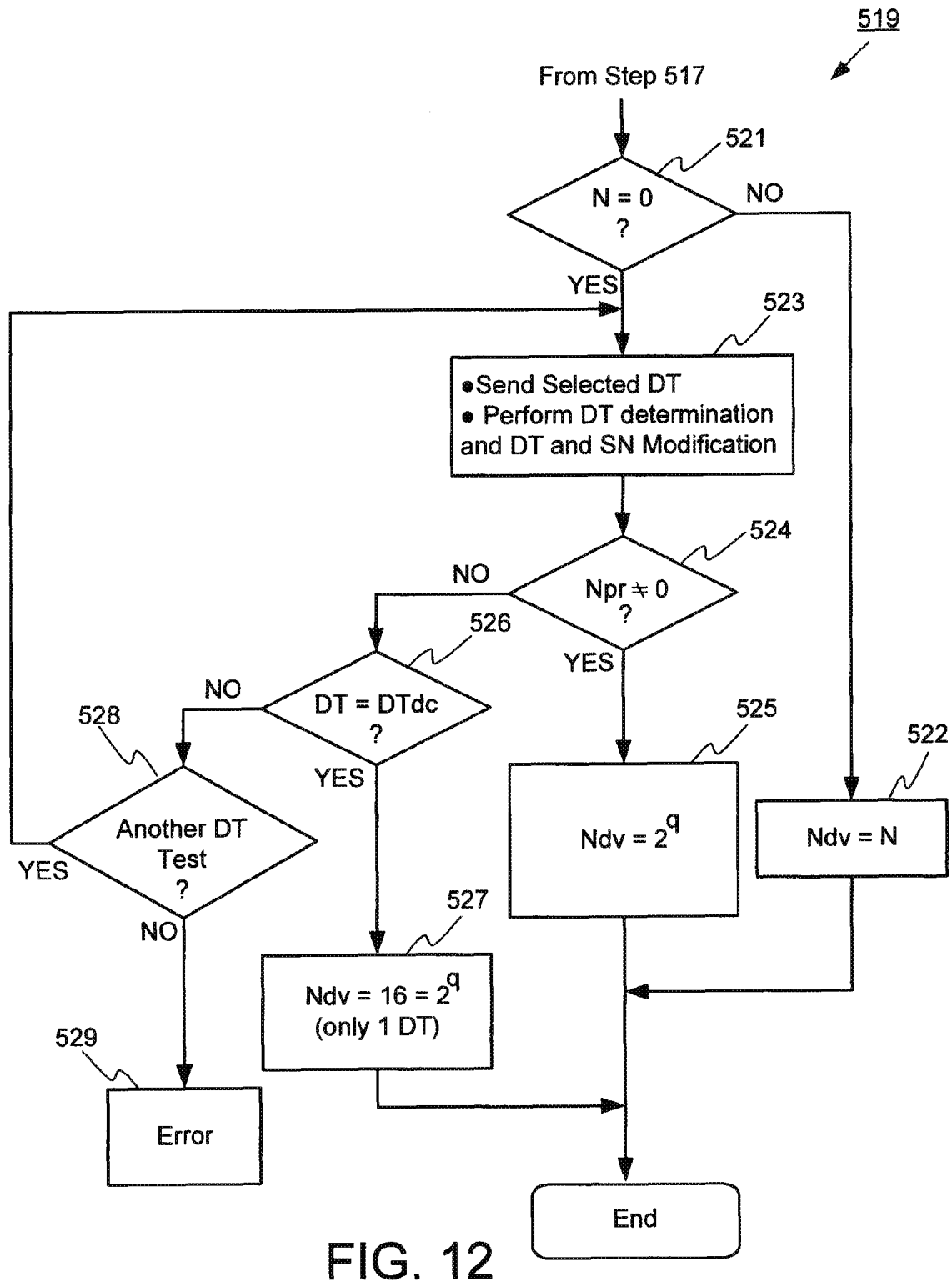
FIG. 12 is a flow chart illustrating part of the operations shown in FIG. 10.

FIG. 12 shows details of the operations of step 519 shown in FIG. 10. Referring to FIGS. 2-12, after step 517, the memory controller 110 (the recognizer 137) determines whether the number or value N of the received number of devices is "0" (step 521). If the value of the received number Ndv of the received data DATArv is not 0 (NO at step 521), the number of devices Ndv will be determined as the received number N (step 522).

If the value of the received number N is "0" (YES at step 521), the number of devices Ndv will be determined as "0" or the maximum number (i.e., $2^q$). If the recognizer 137 of the memory controller 110 recognizes value or number "0" of the SN in the received data DATArv (i.e., Ndv), the feedback information FBrc is provided to the operation controller 131. Thereafter, a maximum determination process is conducted by following steps 523-527.

After the positive determination at step 521, the memory controller 110 sends a selected device type DT (e.g., the NAND Flash device type DTnd, the NOR Flash device type DTnr) as a temporary test device type to the series-connected devices of the interconnection configuration. Then, the series-connected devices perform the device type match determination and the DT and SN modification operations (step 523). Then, if the memory controller 110 receives a non-zero number of devices Npr (YES at step 524), the number of devices Ndv will be determined as the maximum number (i.e., $2^q$) in accordance with the q-bit information contained in INFsn (step 525). Step 524 is to determine whether or not at least one device exists in the interconnection configuration.

In a case where, with the previously selected device type at step 523, the memory controller 110 still receives Npr of 0 (NO at step 524), then if the don't care DT, DTdc, is received together with the Npr of 0 (YES at step 526), no further search operation will be necessary (step 527). In this case, the number of devices of the series-connected devices is equivalent to the maximum number (i.e., $2^q$) and all of the devices have the same device type that has been provided as the test device type. Therefore, the interconnection configuration has the devices of only one device type.

If determination operations with all selected device types are not completed (NO at step 528), another determination process with another test device type will be performed (step 523). If, with all selected temporary device types sent at step 523, the received number of devices Npr is zero (NO at step 524) and the received device type is the test device type, the number of devices Ndv of the interconnected configuration cannot be determined (an error) (step 529). No further operations are performed.

The operations performed at step 523 are similar to those of the method later described with reference to FIGS. 14 and 16. After the number of devices Ndv is determined at step 522 or 525, it is provided by the recognizer 137 to the compiler 138. The number Ndv is to be used for device type determination operations conducted at Phase II shown in FIG. 9.

With the determination process of the number of devices Ndv as the maximum number (i.e., $2^q$) or zero when the received number Ndv is "0", the interconnection configuration can include the maximum number ($2^q$) of series-connected devices. For example, in the case of q being eight bits, the interconnection configuration can include 256 (=$2^8$) devices. If such a determination process regarding Ndv being "0" is not, however, implemented, the interconnection configuration cannot include the maximum number ($2^q$) of devices therein, because the memory controller is unable to distinguish a binary code of "0-0" as "0" or the maximum number (=$2^q$).

Figure 13:
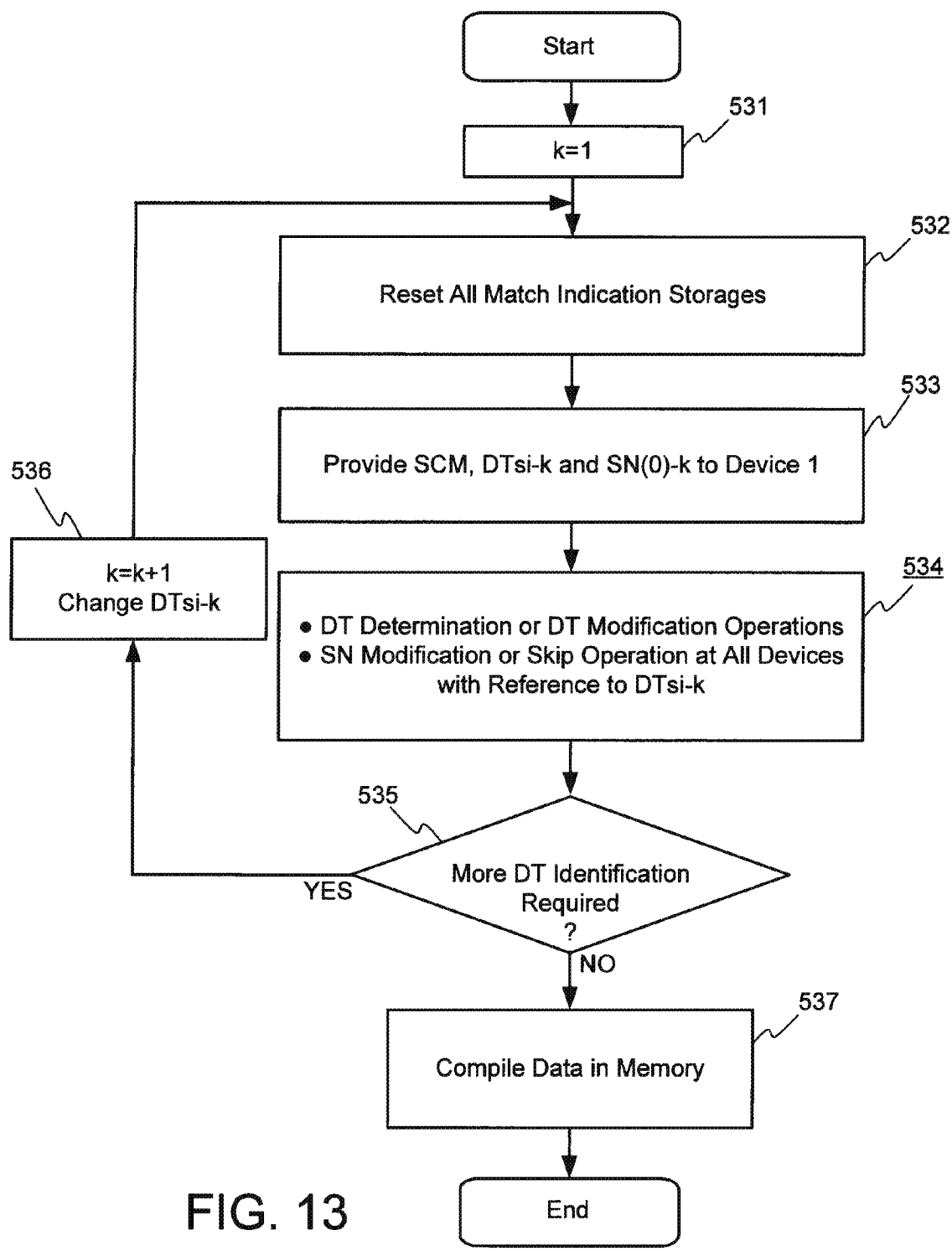
FIG. 13 is a flow chart illustrating operations of a device type match determination and an SN modification performed in the identifying method by the devices shown in FIG. 2.

FIG. 13 depicts the operations of a device type match determination and a search number modification performed in the identifying method of the devices shown in FIG. 2. The method shown in FIG. 13 is to perform operations of Phase II shown in FIG. 9.

Referring to FIGS. 2-13, to operate with a search of various device types, an operation repetition parameter k is assigned a value of 1 (step 531), that is, a first search device type DTsi. The search device type DTsi is chosen and sent by the memory controller 110. Prior to the providing of the search device type DTsi, the memory controller 110 sends the reset signal SRST to the devices 120-1-120-16 of the interconnection configuration to reset the match indication storages 326 in all devices (step 532). Thus, no match indications are stored in the match indication storages 326 before the DT match determination operation.

The memory controller 110 (the input signal provider 133) sends a search command SCM, a k-th search device type DTsi-k and an initial search number SN(0)-k, in a combination, to Device 1 (step 533). The SN(0)-k is a binary number or code of q bits, q being an integer (e.g., four). At device DVi, the DT determination and/or DT modification operation, the SN modification or the skip operation is performed and successively, such operations are performed at all devices with reference to the search device type DTsi-k (step 534). Once one cycle of the search for devices 1-16 is completed, the search device type DTsi-k and the search result (e.g., the SN value of a propagated SNo16) are compiled by the compiler 138 of the memory controller 110. The compiled data is stored in the data memory 139. With reference to the search device type DTsi-k, search cycles for devices 1-16 are reiterated if necessary. Such DT determination, DT/SN modifications and data compiling/store are performed at every cycle of the search operation. Upon completion of all search operation cycles with the search device type DTsi-k, it is determined whether or not another device identification process with reference to another search device type DTsi is necessary (step 535).

If another device identification process is required with reference to another search device type DTsi (YES at step 535), steps 532-534 will be repeated with a new repetition parameter k (k=k+1) and a new search device type DTsi (step 536). If no more DT match search and SN modification are required (NO at step 535), the compiler 138 of the memory controller 110 re-compiles the data in the data memory 139 and re-store re-compiled data therein.

Figure 14:
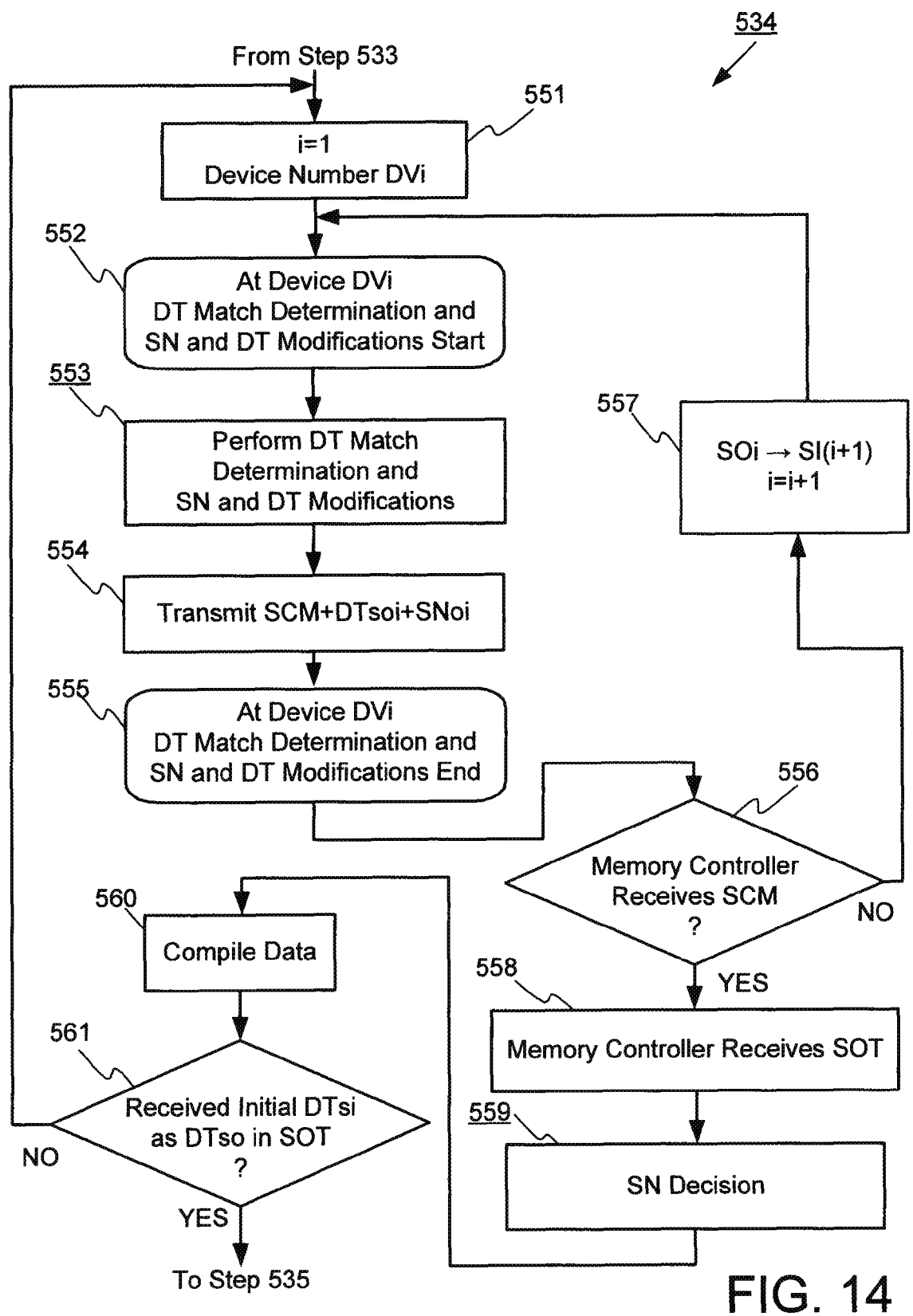
FIG. 14 is a flow chart illustrating part of the operations shown in FIG. 13.

FIG. 14 shows details of the DT determination and DT modification operations at step 534 of FIG. 13. Referring to FIGS. 2-14, first, a device DVi is assigned as i=1 (step 551). Then, at the i-th device DVi, the DT match determination and SN modification process starts (step 552). The present device DVi (e.g., Device 2) receives, from a previous device DV(i−1) (e.g., Device 1), a search command SCM, a search device type DTsi-k, and a search number SNii, in a combination. The DT match determination is performed and then, the DT modification and the SN modification are performed in response to a DT match determination result (step 553). The input search device type DTsi-k or a modified DT is output as an output device type DTsoi. The input search number SNii or a modified SN is output as an output search number SNoi. The output device type DTsoi and the output search number SNoi are provided by the DT output provider 330 and the SN output provider 350, respectively, of the SN/DT modification determiner of the device DVi. Details of step 553 will be described later with reference to FIG. 16. The search command SCM, the output device type DTsoi and the search number SNoi are combined by the output combiner 360 of the device DVi. Then, the combined information including SCM+DTsoi+SNoi is transmitted to a next device DV(i+1) (step 554). At device DVi, the DT match determination and the SN and DT modifications end (step 555).

If the next device DV(i+1) that received the combined information output from the present device DVi is another device in the interconnection configuration, the present device DVi will not be determined as the last device in the interconnection configuration (NO at step 556). Then, the next device DV(i+1) operates as a present device DVi (step 557) and the operations at steps 552-555 are performed. Thus, the operations are repeated by all of the devices in the interconnection configuration. If the next device DV(i+1) that receives the combined information from the present device DVi is the memory controller 110, the present device DVi will be determined as the last device in the interconnection configuration. If so, the memory controller 110 receives the SCM contained in the SOT signal (YES at step 556).

The memory controller 110 (the output signal receiver 135) receives the combined information contained in the SOT signal from the last device of the interconnection configuration (step 558) and the SN contained in the SOT signal is determined (step 559). The recognizer 137 of the memory controller 110 performs the data recognition operations and the compiler 138 compiles data. The compiled data is stored in the data memory 139 (step 560). One search cycle ends. If the DTso16 included in the combined information in the SOT is not the initial search device type DTsi-k (NO at step 561), another search cycle will start and i is re-assigned as 1 (step 551). Thereafter, the operations of steps 552-560 are repeated. If the DTso16 is the initial search device type DTsi-k (YES at step 561), the search cycle ends and operation will continue to determine whether another device identification is required (step 535 of FIG. 13).

In a case where the first device of the interconnection configuration matches the search DT, while the SNo16 contained in the SOT signal should be 16, SNo16 is zero (0=binary code "0000"). Thus, it is necessary for determining whether the "0000" of SNo16 is 16 or 0 at step 559.

Figure 15:
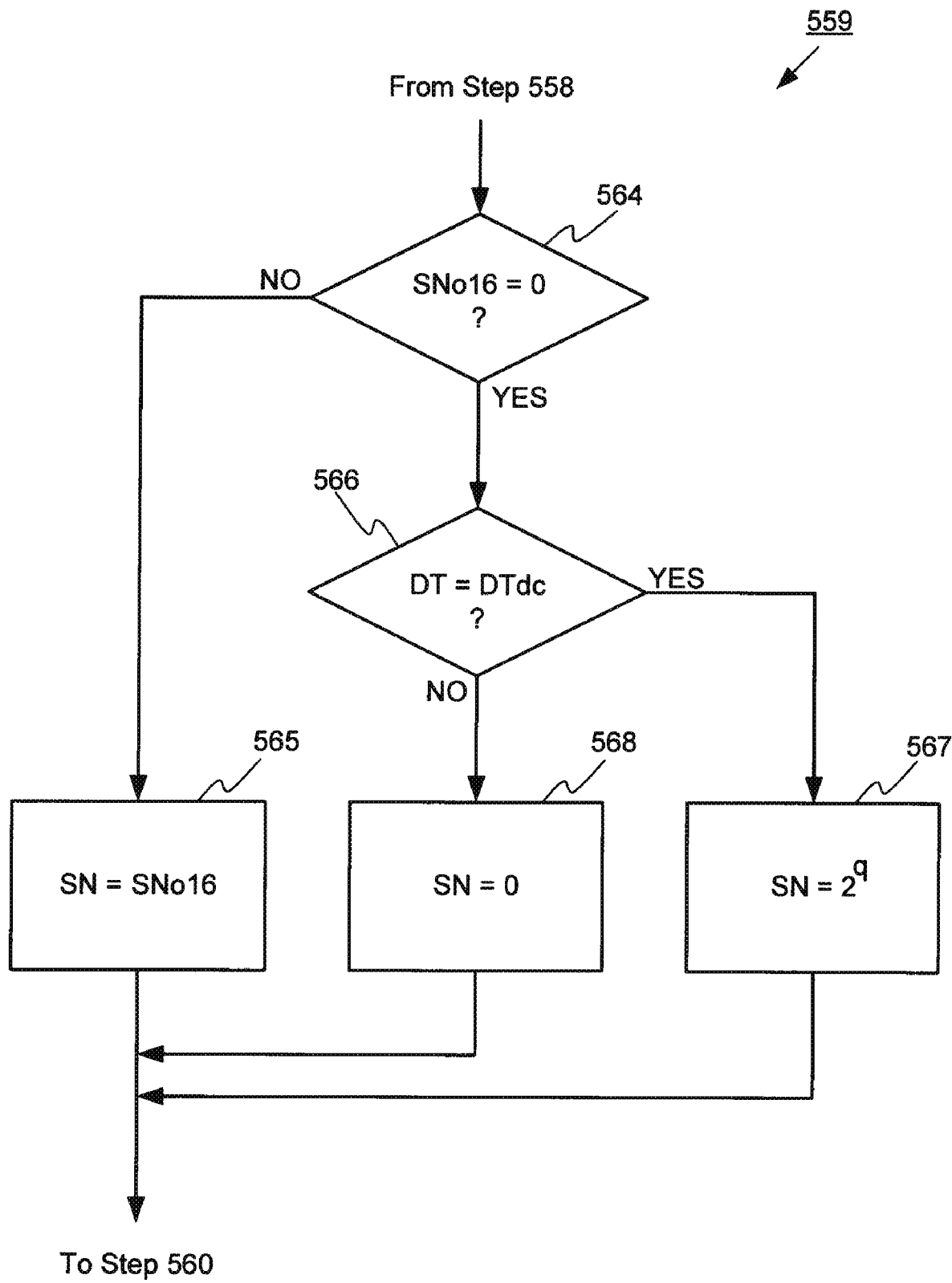
FIG. 15 is a flow chart illustrating part of the operations shown in FIG. 14.

FIG. 15 shows details of step 559 shown in FIG. 14. Referring to FIG. 14, it is determined whether the SNo16 is 0 (step 564). If SNo16 is not 0 (NO at step 564), the SNo16 will be determined as the SN (step 565). If SNo16 is 0 (YES at step 564), then it is determined whether the DTo16 contained in the SOT signal is the "don't care" code DTdc (step 566). If the DTo16 is DTdc (YES at step 566), the SN will be 16 (=$2^4$) (step 567). If the DTo16 is not DTdc (NO at step 566), the SN will be 0 (step 568). The SN determined at step 565, 567 or 568 is used for data compilation (step 560).

Figure 16:
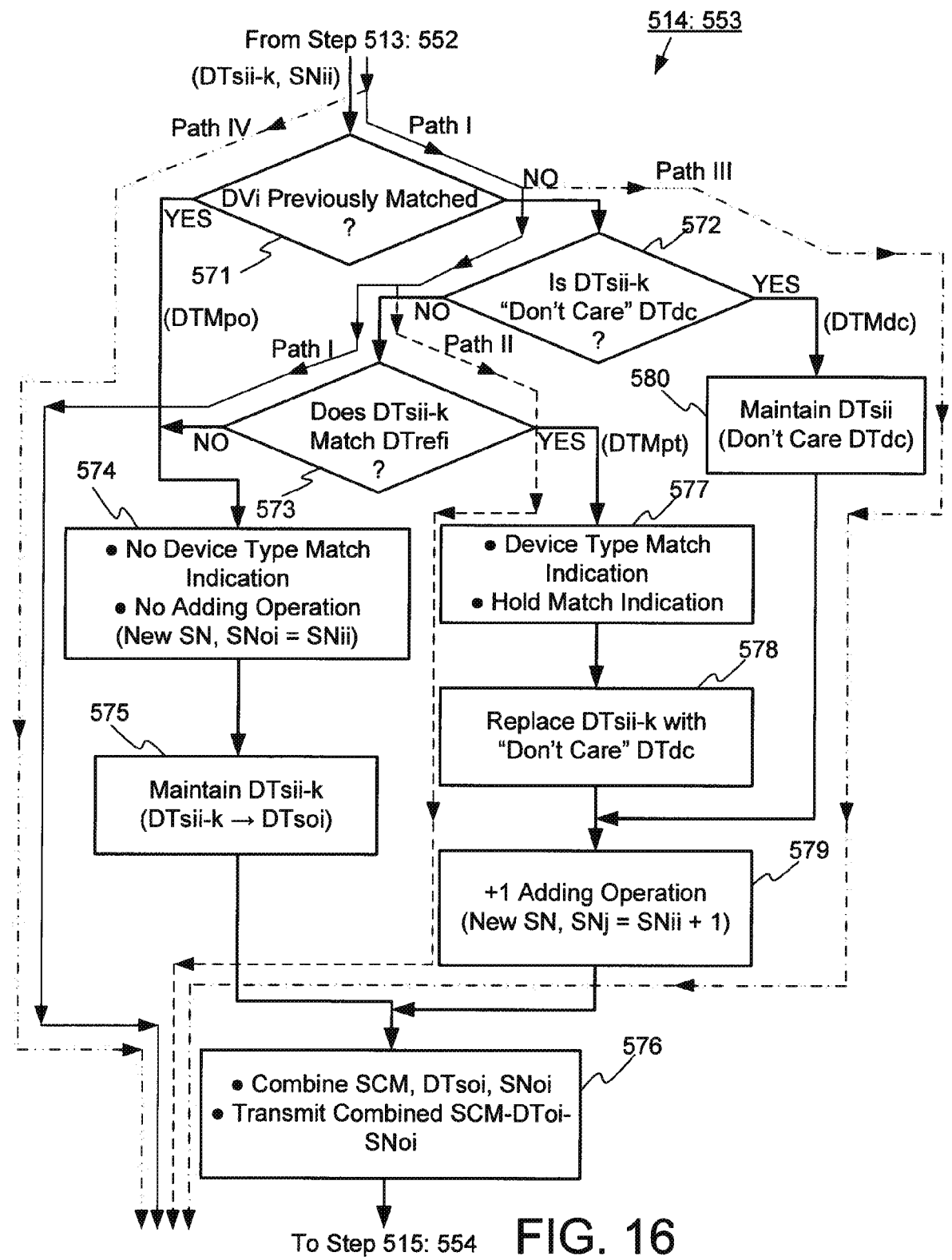
FIG. 16 is a flow chart illustrating a method for performing DT match determination and modification shown in FIGS. 10 and 14.

FIG. 16 shows the operations of the DT match determination and modification of step 514 as shown in FIG. 10 and step 553 as shown in FIG. 14. The operations of step 514 are similar to those of step 553. There are four determination operations depicted as "Path I", "Path II", "Path III" and "Path IV".

(i) Path I:
Path I is an operation path in which none of the present DT match indication DTMpt, the "don't care" DT match indication DTMdc and the previous DT match indication DTMpo is enabled. No device match is detected. No modifications of the DT and the SN are performed.

(ii) Path II:
Path II is an operation path in which only the present DT match indication DTMpt is enabled. Both the DT and the SN are modified.

(iii) Path III:
Path III is an operation path in which only the "don't care" DT match indication DTMdc is enabled. The DT is not modified. The SN is modified.

(iv) Path IV:
Path IV is an operation path in which only the previous DT match indication DTMpo is enabled. No modifications of the DT and the SN are performed.

Referring to FIGS. 2-16, the present device DVi receives the search device type DTsi-k and the search number SNii accompanying the search command SCM and starts the determination and modification operations. At the device DVi, in response to the search command SCM, the match detector 322 of the SN/DT modification determiner 240-i performs the DT match determination.

The match detector 322 checks the match indication storage 326 of the DT match determiner 320 (step 571). If no "previous match indication" is stored in the match indication storage 326 (NO at step 571), the match detector 322 will compare the search device type DTsii-k with the "don't care" code DTdc stored in (or generated by) the storage 328 (step 572). If the received search device type DTsii-k is not the "don't care" code DTdc (NO at step 572), the match detector 322 will further compare the search device type DTsii-k with the reference DT, reference device type DTrefi, stored in the reference DT storage 324 (step 573). If no match between the search device type DTsii-k and the reference device type DTrefi (NO at step 573), the input search device type DTsii-k will be determined as none of the previously matched DT, the DTdc and the reference device type DTrefi. Thus, none of the previous DT match indication DTMpo, the "don't care" DT match indication DTMdc and the present DT match indication DTMpt is enabled. Without a match between the search device type DTsii-k and the reference device type DTrefi, the match detector 322 does not store a match indication in the match indication storage 326. Neither the SN modifying indication MFsn nor the DT modifying indication MFdt are enabled by the modification provider 340. The selector 354 of the SN output provider 350 selects the search number SNii as the output search number SNoi (step 574). Thus, the modification of the SN is skipped (or bypassed). Furthermore, the selector 332 of the DT output provider 330 selects the search device type DTsii-k and outputs the selected search device type DTsii-k as the output device type DTsoi (step 575). Thus, the modification of the DT is skipped (or bypassed). The output device type DTsoi and the output search number SNoi are combined with the search command SCM by the output combiner 360 of the present device DVi and the combined SCM+DT+SN is transmitted to the next device DV(i+1) (step 576). This operation route is depicted as "Path I". Then, step 515 or 554 is performed.

If the search device type DTsii-k matches the reference device type DTrefi (YES at step 573), the match detector 322 will store a "present match" indication in the match indication storage 326 and enable the present DT match indication DTMpt. Thus, once a match between the search device type DTsii-k and the reference device type DTrefi is determined, the match indication is held in the storage (step 577). In response to the enabling of the present DT match indication DTMpt, the SN modification provider 342 and the DT modification provider 344 provide the SN modifying indication MFsn and the DT modifying indication MFdt, respectively. In response to the DT modifying indication MFdt, the selector 332 of the DT output provider 330 selects the DTdc and outputs the DTdc as the output device type DTsoi. Thus, the input search device type DTsii-k is replaced with the DTdc (step 578). In response to the SN modifying indication MFsn, the selector 354 of the SN output provider 350 selects the SNc from the calculator 352 and outputs the SNc (=SNii+1) as the output search number SNoi. Thus, "+1" adding operation is performed (step 579). Then, the replaced DTdc and the added SNc are combined with the search command SCM by the output combiner 360 and the combined SCM+DT+SN is transmitted to the next device DV(i+1) (step 576). This operation route is depicted as "Path II". Then, step 515 or 554 is performed.

If the search device type DTsii-k is the DTdc, the match detector 322 will enable the "don't care" DT match indication DTMdc (YES at step 572). In response to the "don't care" DT match indication DTMdc, the SN modification provider 342 enables the SN modifying indication MFsn and the DT modification provider 344 does not enable the DT modifying indication MFdt. The selector 332 of the DT output provider 330 selects the input search device type DTsii-k (i.e., the DTdc) and the DTdc is output as the output device type DTsoi (step 580). In response to the enabled SN modifying indication MFsn, the selector 354 of the SN output provider 350 selects the SNc from the calculator 352 and the added SN (=SNii+1) is output as the output search number SNoi (step 579). The selected output device type DTsoi and the added output search number SNoi are combined with the search command SCM by the output combiner 360 and the combined SCM+DT+SN is transmitted to the next device DV(i+1) (step 576). This operation route is depicted as "Path III". Then, step 515 or 554 is performed.

As mentioned above, once a match between the search device type DTsii-k and the reference device type DTrefi is determined (YES step 573), the "present match indication" DTMpt is stored in the match indication storage 326, in one search cycle. In another (or a next, or later) search cycle, the stored "match indication" is referenced to as a "previous match" in that device DVi.

If, in a next search cycle, a "previous match indication" is stored in the match indication storage 326 (YES at step 571), the match detector 322 will not perform further determinations. The operations of steps 574-576 are performed. None of the previous DT match indication DTMpo, the "don't care" DT match indication DTMdc and the present DT match indication DTMpt is enabled. Thus, the operations of match determination and modifications are skipped. This operation route is depicted as "Path IV". Then, step 515 or 554 is performed.

Figure 17:
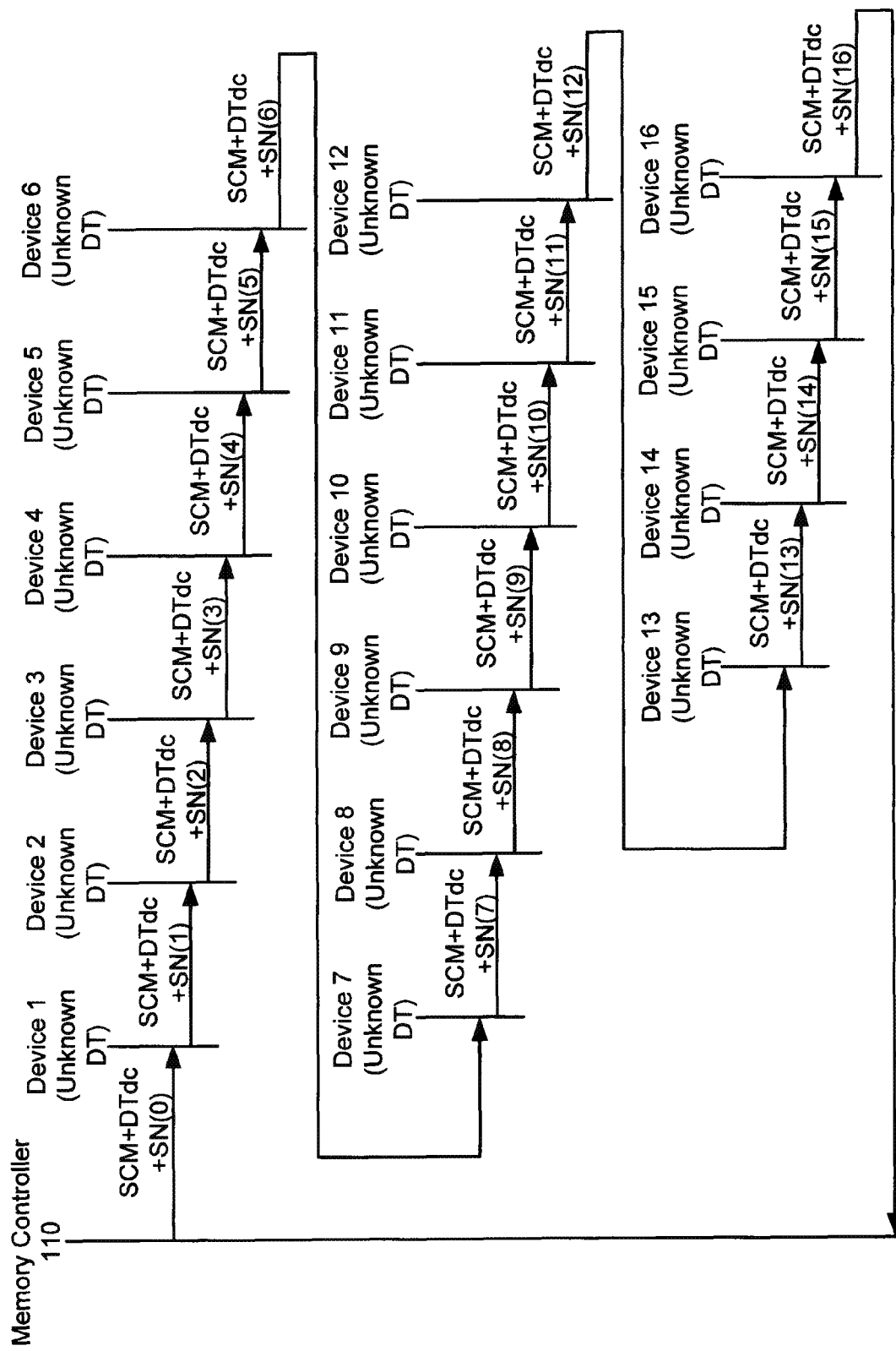
FIG. 17 is a schematic diagram illustrating a protocol conducted in the devices, with a search device type DTsi of a "don't care" code DTdc, to identify the number of the devices in the interconnection configuration shown in FIG. 2.

FIG. 17 shows a protocol conducted in the devices, with a search device type DTsi of a "don't care" code DTdc, to identify the number of devices in the interconnection configuration shown in FIG. 2. Referring to FIGS. 2-17, the memory controller 110 sends the DTdc as a search device type DTsi and an initial search number SN(0) to Device 1 of the interconnection configuration. The DTdc and the SN(0) are combined with a search command SCM. In this case, the match detector 322 of Device 1 detects the search device type DTsi (i.e., the DTdc) and the "don't care" DT match indication DTMdc is enabled (YES step 572). The DTdc of the search device type DTsi is maintained (step 580). The SN(0) is incremented by the calculator 352 and an incremented SN (SNo1=SN(0)+1) is output (step 579). The output combiner 360 of Device 1 transmits combined SCM+DTdc+(SN(0)+1) to Device 2 (step 576).

Device 2 performs similar operations as Device 1 and the search number SN is further incremented to "SN(1)+1". Such operations are repeated by all of the devices and the SN is incremented by each device. In this case, all devices perform the operations of "Path III". The incremented SN is propagated through the devices in the interconnection configuration. In this particular case, the value or number of the SNo16 contained in the SO16 is "SN(16)". From the SNo16 (=SN(16)), the memory controller 110 (the recognizer 137) recognizes that the number of devices Ndv of the interconnection configuration is "16". This number is stored in the data memory 139 of the memory controller 110. Information on the number Ndv will be used later for identifying the device type of each device.

As previously described with reference to FIG. 11, the binary code of the SNo16 (=16) is "0000" in the event that the interconnection includes 16 devices. By the memory controller 110 verifies the binary code of "0000" represents 16 by performing the operations steps 521-528 shown in FIG. 12.

Figure 18:
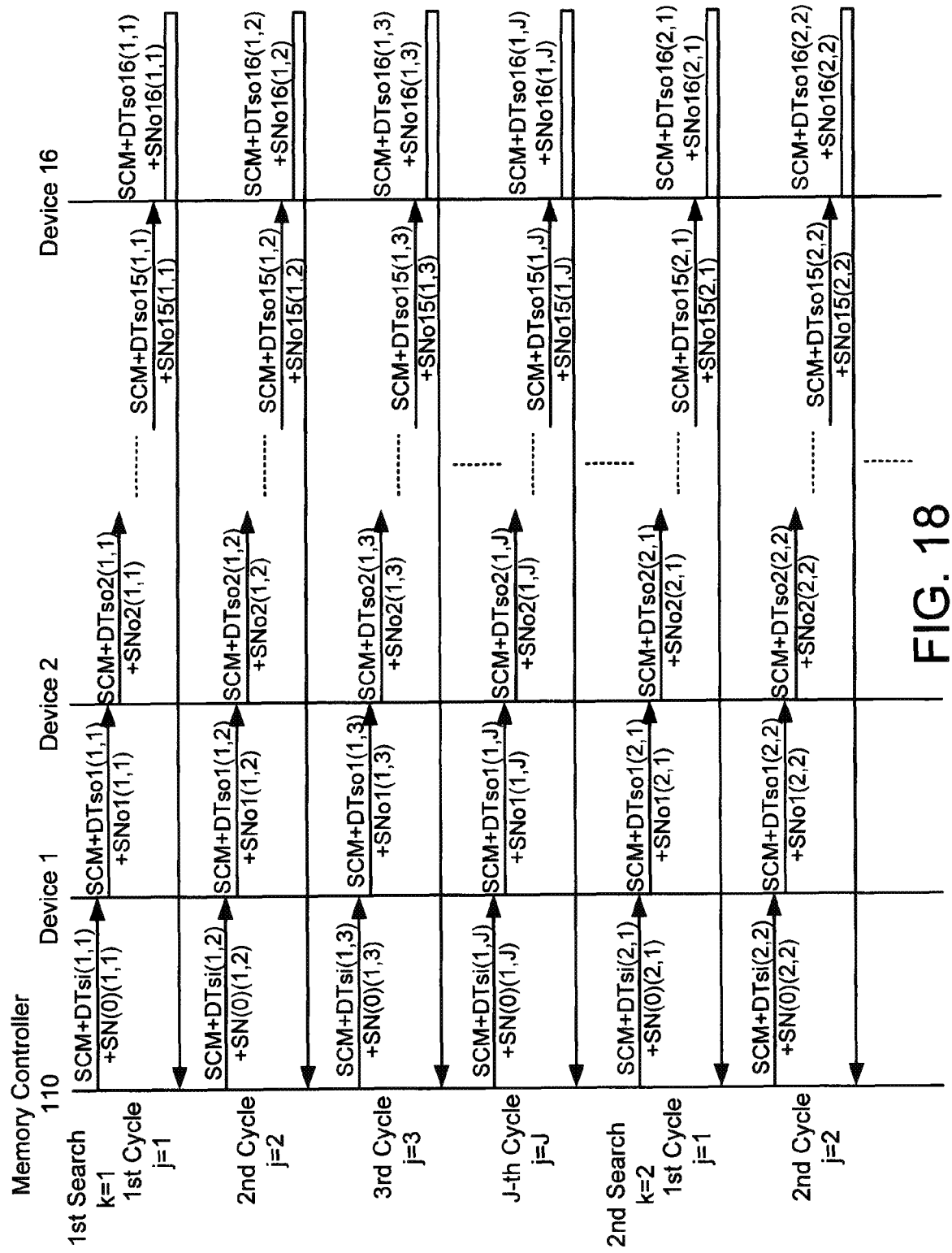
FIG. 18 is a schematic diagram illustrating a protocol conducted in the devices shown in FIG. 2, with various search device types DTsi.

FIG. 18 shows a protocol conducted in the devices shown in FIG. 2, with various search device types DTsi to identify the device type of the memory devices in the interconnection configuration. For each search device type, a plurality of cycles of search operations is repeated. When an operation repetition parameter k is 1, with reference to a first search device type DTsi-1 (e.g., a device type DTnd for NAND Flash devices), a search cycle of the DT and SN modification operations is repeated, the search cycle being represented by j. Then, with reference to another search device type DTsi (i.e., another number of the operation repetition parameter k), the device type identification is conducted. Such device type identification operations are reiterated with reference to all search device type DTsi-k ($1 \leq k \leq M$). Combined information provided by the memory controller is given by "SCM+DTsi(k,j)+SN(0)(k,j)". Similarly, combined information output by an i-th device is given by "SCM+DTsoi(k,j)+SNoi(k,j)".

A first device identification operation (k=1) will be described, referring to FIGS. 2-18. A reference search device type DTsi-1 is the DTnd for NAND Flash devices. Each of FIGS. 19A-19E shows a protocol conducted in the devices shown in FIG. 2, with a search device type DTsi of a NAND Flash device type DTnd and a device type match of a NAND Flash device being detected.

To perform operations of the first search cycle (j=1), the memory controller 110 (the input signal provider 133) sends the search device type DTsi-1 of the DTnd to Device 1 of the interconnection configuration, the DTnd being in a combination of the search command SCM and an initial search number SN(0). If the match detector 322 of Device 1 determines that the input search device type DTsi-1 (DTnd) matches a reference device type DTref associated with Device 1 (stored in the match indication storage 326), a "present match" indication will be provided by the match detector 322 and stored in the match indication storage 326 (steps 573 and 577). Then, the input DTnd of the search device type DTsi-1 is replaced with the "don't care" code DTdc by the selector 332 of the DT output provider (step 578). The input SN(0) is incremented by the SN output provider 350 (step 579). Combined SCM+DTdc+SN(1) is transmitted as the SO1 to Device 2 (step 576). Device 1 performs the operations of Path II.

Device 2 receives SI2 (i.e., SO1) that contains the DTdc. Thus, the DT match determiner 320 of Device 2 conducts the operations of steps 580, 579 and 576. Thus, an incremented SN(2) is output and combined with the SCM and the DTdc. Combined SCM+DTdc+SN(2) is transmitted. Device 2 performs the operations of Path III.

Similarly, each of devices 3-16 repeats a similar process to that of Device 2. An incremented SN is provided by each device. The devices perform the operations of Path III. Thus, the SNo16 contains a propagated SN(16). From the received SNo16 (SN(16)), the memory controller 110 (the recognizer 137) can identify which device has the search device type DTsi-1 (i.e., DTnd) sent by the memory controller 110 by performing the calculation:

$$(Ndv+1)-(\text{Number or Value of } SNo16).$$

Figure 19A:
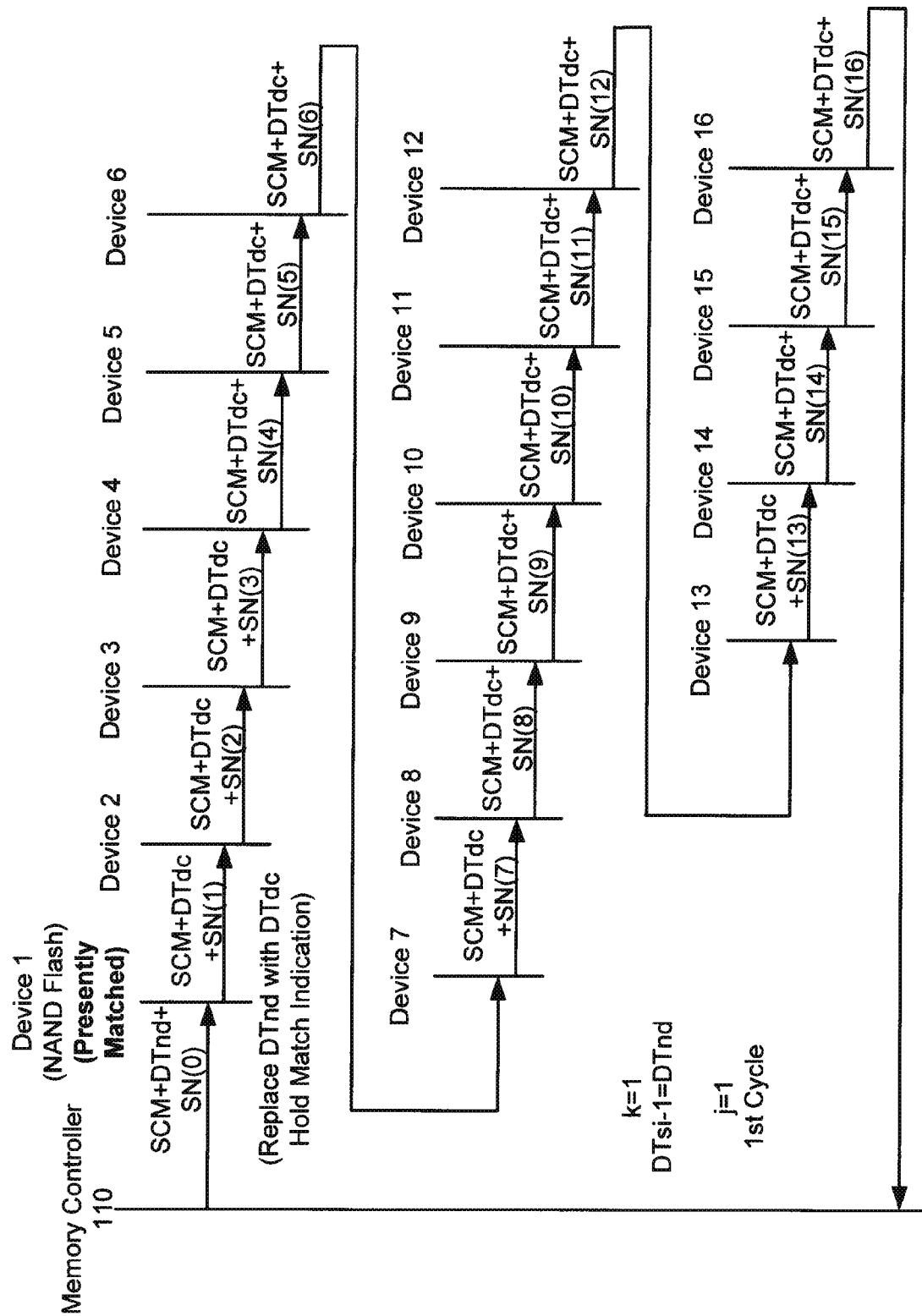
FIGS. 19A, 19B, 19C, 19D and 19E are schematic diagrams illustrating protocols conducted in the devices shown in FIG. 2, with a search device type DTsi of a NAND Flash device type DTnd.

In this case, the SNo16 has a value or number of SN(16) and thus, the DT of Device 1 is a NAND Flash device. Such operations of the first search cycle are depicted in FIG. 19A.

Figure 19B:
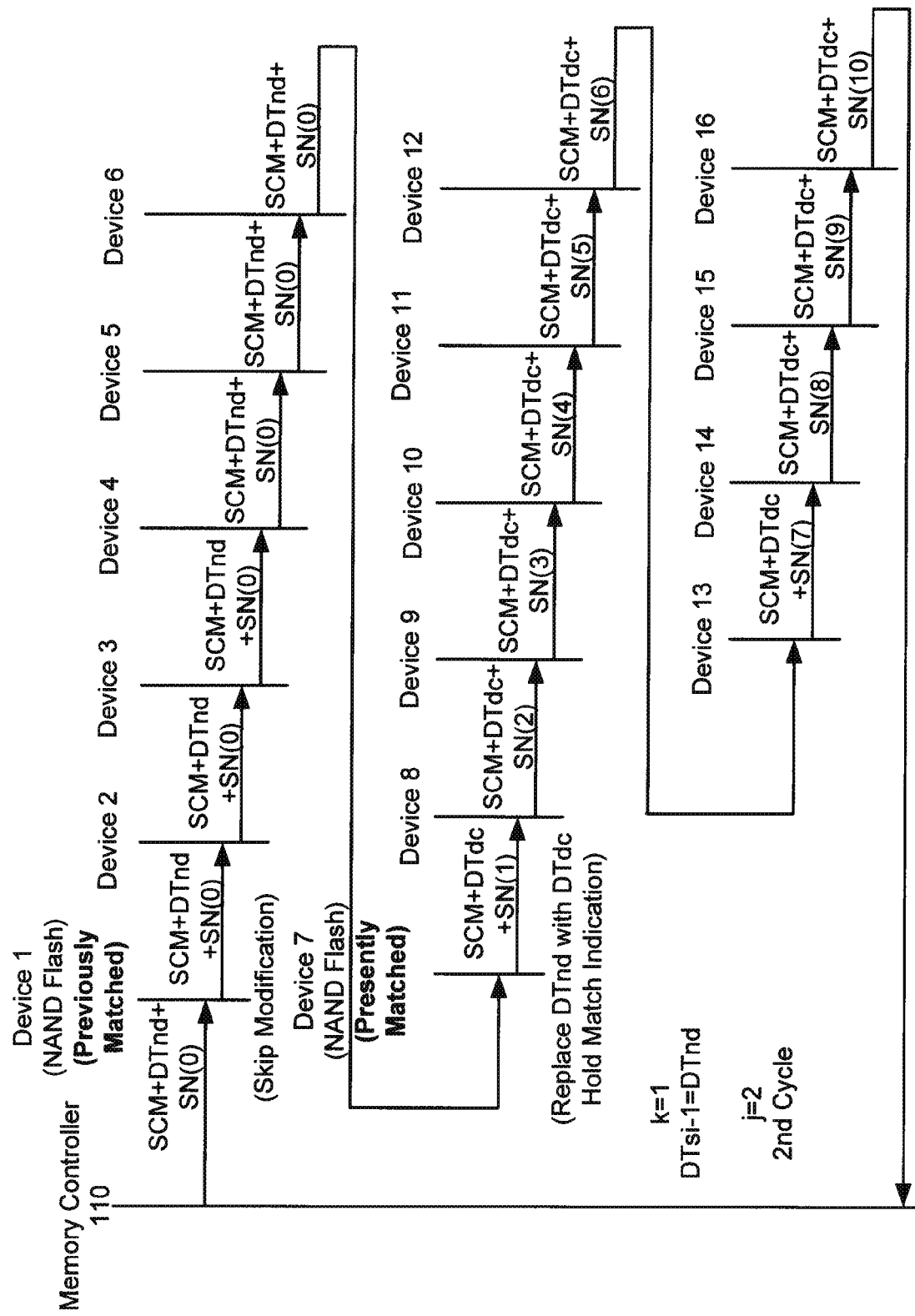

To perform operations of the second search cycle (j=2), the memory controller 110 again sends the DTnd as a search device type DTsi with an initial search number SN(0) to Device 1. Since the match indication storage 326 of the DT match determiner 320 has stored the "previous match indication" therein in the first search cycle (j=1), while the search device type DTsi-1 (DTnd) matches the reference device type DTref of Device 1, the match detector 322 skips the determination and modification operations (YES at step 571). Device 1 conducts the operations of steps 574-576 and transmits combined SCM+DTnd+SN(0) to Device 2. Device I performs the operations of Path IV. If each of devices 2-6 does not determine a "present match" between the DTnd and its reference device type DTref (NO at steps 571, 572 and 573), the modification operation will be skipped in that device (steps 574, 575 and 576). The devices perform the operations of Path I. If Device 7 determines a "present match" (YES at step 573), the operations of steps 577, 578, 579 and 576 will be conducted. Device 7 performs the operations of Path II. An incremented SN (SN(0)+1=SN(1)) is output and the search device type DTsi (DTnd) is replaced with the DTdc. Combined SCM+DTdc+SN(1) is transmitted to Device 8. Then, each of devices 8-16 conducts the operations of steps 580, 579 and 576 (Path III). Thus, the SNo16 contains the propagated SN(10). From the value of "10", the memory controller 110 identifies Device 7 (=(16+1)–10) as a NAND Flash device. This is shown in FIG. 19B.

Figure 19C:
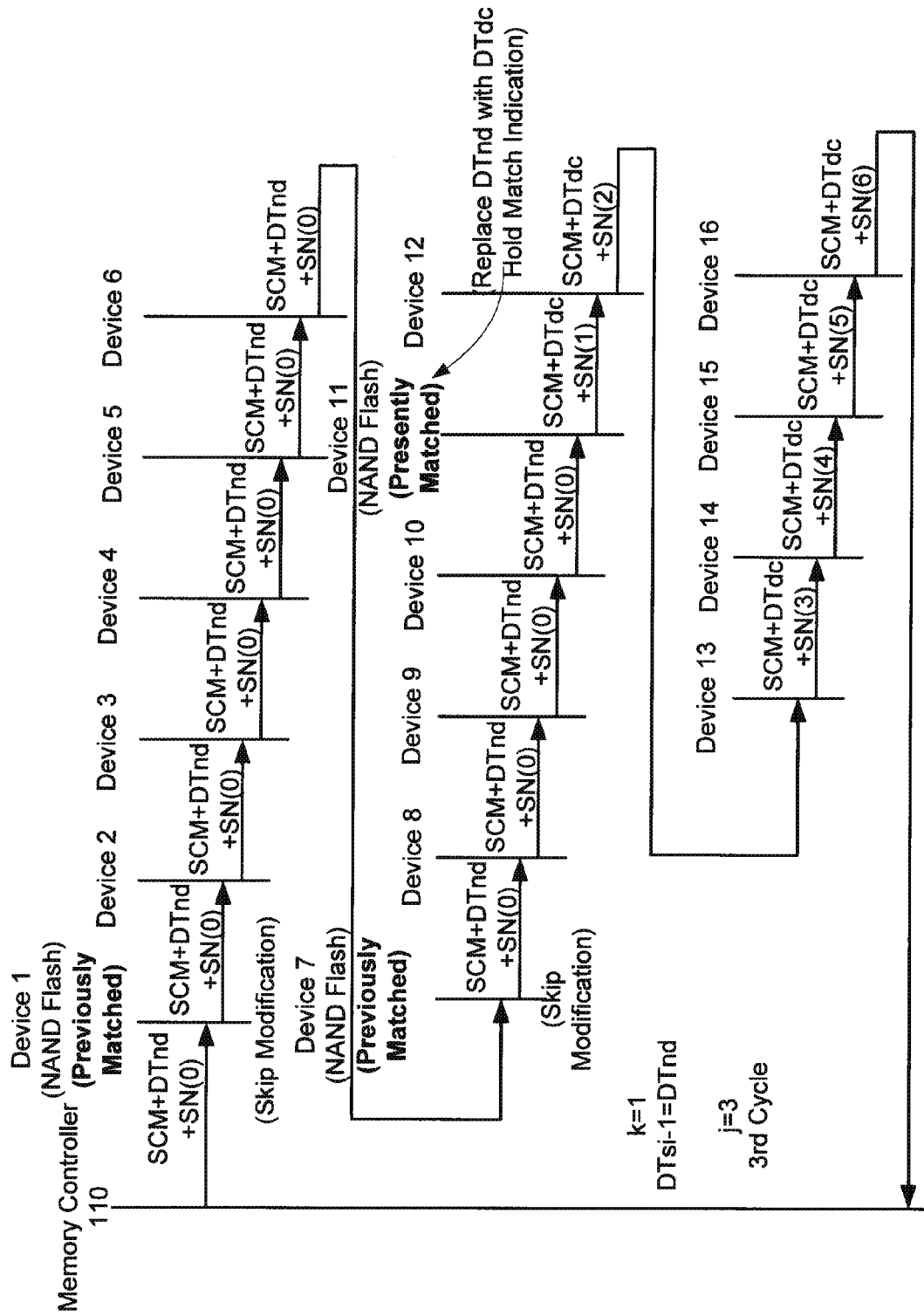

To perform operations of the third search cycle (j=3), the memory controller 110 again sends the DTnd as a search device type DTsi with an initial search number SN(0) to Device 1. The match indication storages 326 of devices 1 and 7 store the "previous match indication" in the first search cycle and the second search cycle, respectively. While the search device type DTsi-1 (DTnd) matches the reference device type DTref of Devices 1 and 7, the match detector 322 of each of Devices 1 and 7 skips the determination and modification operations (YES at step 571). Thus, combined SCM+DTnd+SN(0) is transmitted to Device 8. Devices 1 and 7 perform the operations of Path IV. Devices 2-6 perform the operations of Path I. If each of Devices 8-10 does not determine a "present match", the modification operation will be skipped. Devices 8-10 perform the operations of Path I. If Device 11 determines a "present match" (YES at step 573), the operations of steps 577, 578, 579 and 576 will be conducted. Device 11 performs the operations of Path II. An incremented SN (SN(0)+1=SN(1)) is output and the search device type DTsi (DTnd) is replaced with the DTdc. Combined SCM+DTdc+SN(1) is transmitted to Device 12. Then, each of Devices 12-16 conducts the operations of steps 580, 579 and 576. The devices perform the operations of Path III. Thus, the SNo16 contains the propagated SN(6). From the value of "6", the memory controller 110 identifies Device 11 (=(16+1)–6) as a NAND Flash device. This is shown in FIG. 19C.

Figure 19D:
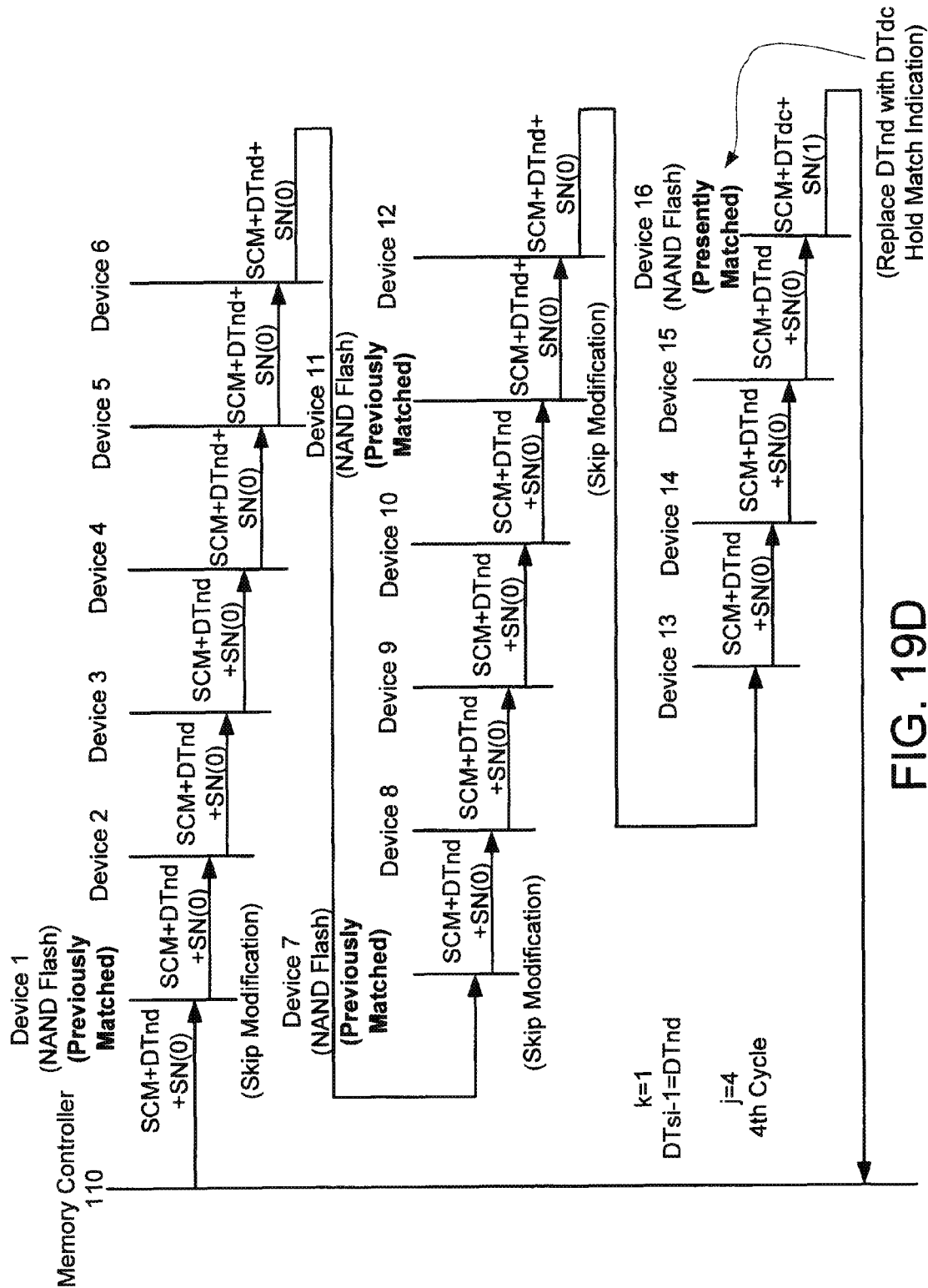

To perform operations of the fourth search cycle (j=4), the memory controller 110 again sends the DTnd as a search device type DTsi with an initial search number SN(0) to Device 1. The match indication storages 326 of Devices 1, 7 and 11 store the "previous match indication" in the first, second and third search cycles, respectively. While the search device type DTsi-1 (DTnd) matches the reference device type DTref of each of Devices 1, 7 and 11, the match detector 322 of each of Devices 1, 7 and 11 skips the determination and modification operations (YES at step 571). Devices 1, 7 and 11 perform the operations of Path IV. Devices 2-6 and 8-10 perform the operations of Path I. Thus, combined SCM+DTnd+SN(0) is transmitted to Device 12. If none of Devices 12-15 determines a "present match", the modification operation will be skipped. The devices perform the operations of Path I. If Device 16 determines a "present match" (YES at step 573), an incremented SN (SN(0)+1=SN(1)) is output and the search device type DTsi (DTnd) is replaced with the DTdc. Device 16 performs the operations of Path II. Combined SCM+DTdc+SN(1) is transmitted to the next device, that is, to the memory controller 110. The SNo16 contains the propagated SN(1). From the value of "1", the memory controller 110 identifies Device 16 (=(16+1)–1) as a NAND Flash device. This is shown in FIG. 19D.

Figure 19E:
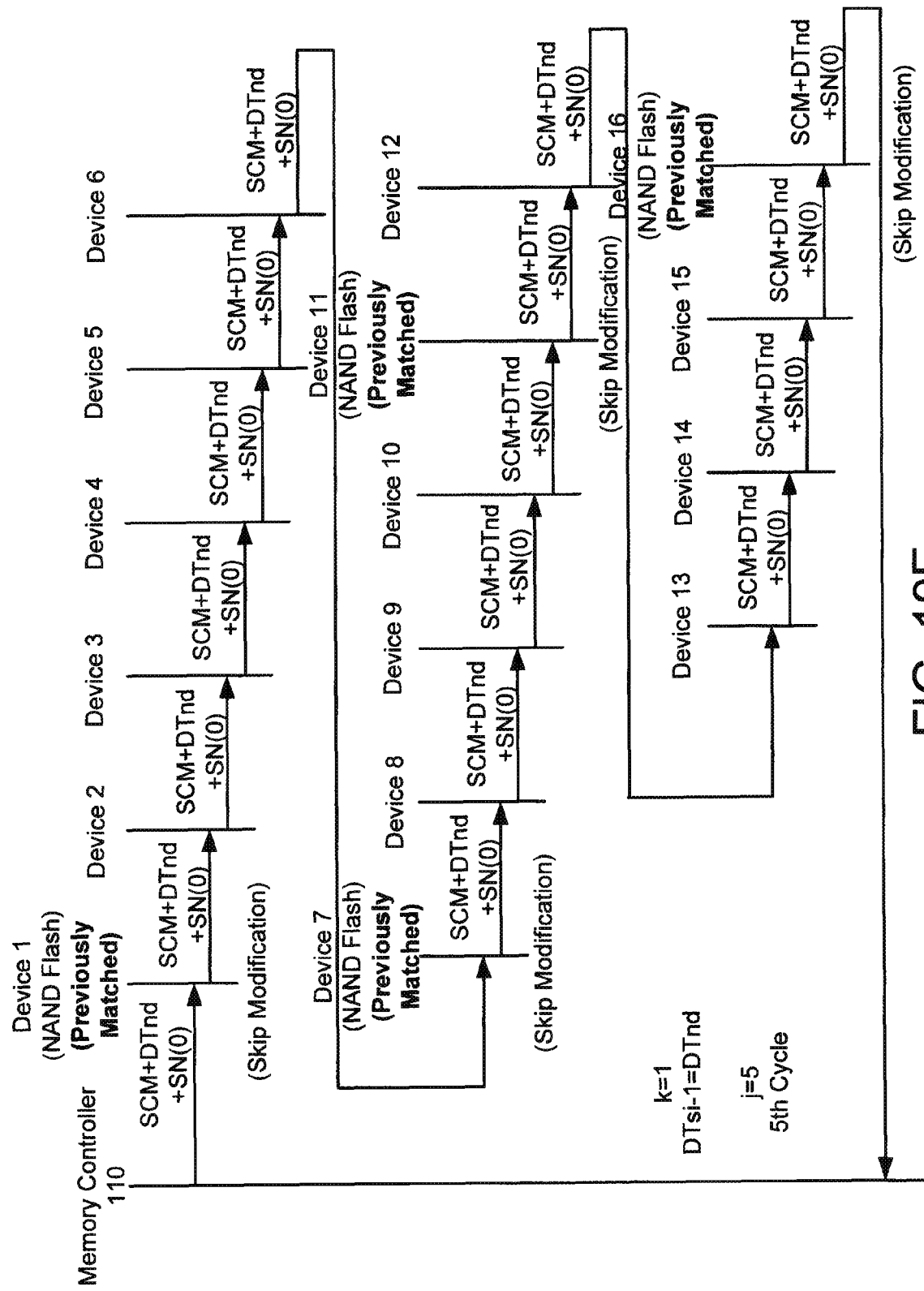

To perform the fifth search cycle (j=5), the memory controller 110 again sends the DTnd as a search device type DTsi with an initial search number SN(0) to Device 1. The match indication storages 326 of Devices 1, 7, 11 and 16 store the "previous match indication" in the first, second, third and fourth search cycles, respectively. While the search device type DTsi-1 (DTnd) matches the reference device type DTref of each of Devices 1, 7, 11 and 16, the match detector 322 of each of Devices 1, 7, 11 and 16 skips the determination and modification operations (YES at step 571). Devices 1, 7, 11 and 16 perform the operations of Path IV. The other devices perform the operations of Path I. Thus, combined SCM+DTnd+SN(0) is transmitted to a next device, that is, the memory controller 110. The SNo16 contains the propagated SN(0). From the value of "0", the memory controller 110 recognizes that no more devices are required to be identified with reference to the search device type DTsi-1 (DTnd). This is depicted in FIG. 19E. If another search is required (YES at step 535), the memory controller 110 changes the search device type DTsi-k to another search device type DTsi (step 536). Then, the modification operations are repeated.

A second device identification operation (k=2) will be described. A search device type DTsi-2 is the DTnr for NOR Flash devices. Each of FIGS. 20A-20D shows a protocol conducted in the devices shown in FIG. 2, with a search device type DTsi of a NOR Flash device type DTnr and a device type match of a NOR Flash device being detected.

Prior to the start of the match determination and modification operations, the match indication storages 326 of the DT match determiners 320 of all devices are reset by the reset signal SRST to cancel the "previous match indications" in the previous search with reference to the DTnd (step 532). A second device identification operation will be described referring to FIGS. 2-18 and 20A-20D.

Figure 20A:
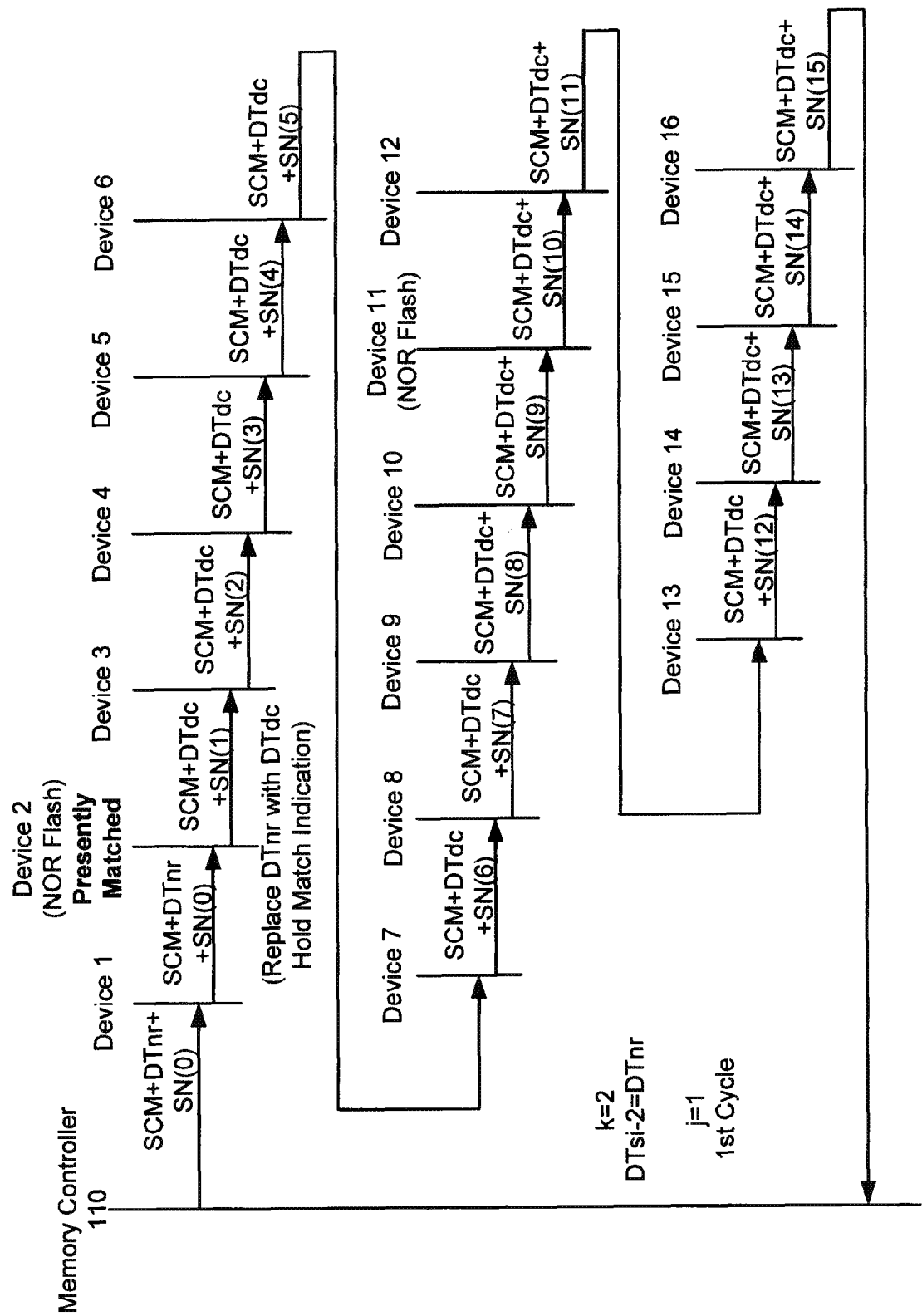
FIGS. 20A, 20B, 20C and 20D are schematic diagrams illustrating protocols conducted in the devices shown in FIG. 2, with a search device type DTsi of a NOR Flash device type DTnr.

To perform operations of the first search cycle (j=1), the memory controller 110 (the input signal provider 133) sends the search device type DTsi-2 of the DTnr to Device 1 of the interconnection configuration, the DTnr being in a combination of the search command SCM and an initial search number SN(0). If Device 1 does not detect a match determination with the DTnr, combined SCM+DTnr+SN(0) is transmitted to Device 2. In a case where the match detector 322 of Device 2 determines that the search device type DTsi matches its reference device type DTref (step 573), a match indication is stored in the match indication storage 326 (step 577) and the DTnr is replaced with the DTdc by the selector 332 of the DT output provider (step 578). The SN is incremented by the SN output provider 350 (step 579). Combined SCM+DTdc+SN (1) is transmitted to Device 3. Then, since the input search device type DTsi is the DTdc, the DT match determiners 320 of all of devices 3-16 conduct the operations of steps 580, 579 and 576. The input SN is incremented by each device. Thus, the SNo16 contains the propagated SN(15). From the value of "15", the memory controller 110 identifies Device 2 (=(16+1)−15) as a NOR Flash device. In this case, Device 1 performs the operations of Path I. Device 2 performs the operations of Path II. The other devices perform the operations of Path III. This is shown in FIG. 20A.

Figure 20B:
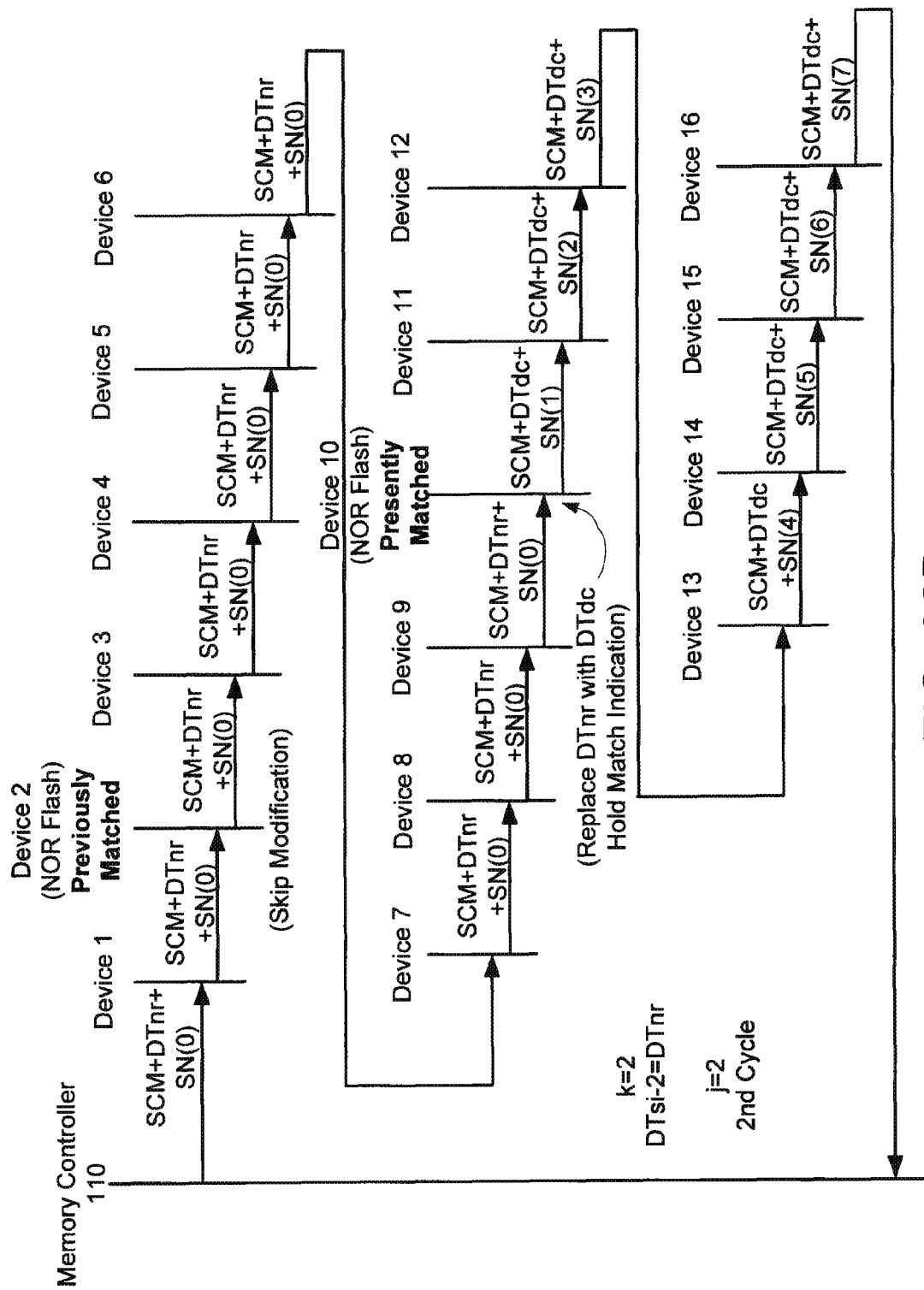

To perform operations of the second search cycle (j=2), the memory controller 110 again sends the DTnr as a search device type DTsi with an initial search number SN(0) to Device 1. Since the match indication storage 326 of Device 2 has the "previous match indication" stored therein in the first search cycle (j=1), while the search device type DTsi-2 (DTnr) matches the reference device type DTref of Device 2, the match detector 322 skips the determination and modification operations (YES at step 571). Combined SCM+DTnr+SN(0) is transmitted. It is assumed that Device 10 detects a "present match" (YES at step 573). Device 10 performs the operations of Path II. Devices 1 and 3-9 perform the operations of Path I. The other devices perform the operations of Path III. Thus, the SNo16 contains the propagated SN(7). From the value of "7", the memory controller 110 identifies Device 10 (=(16+1)−7) as a NOR Flash device. This is shown in FIG. 20B.

Figure 20C:
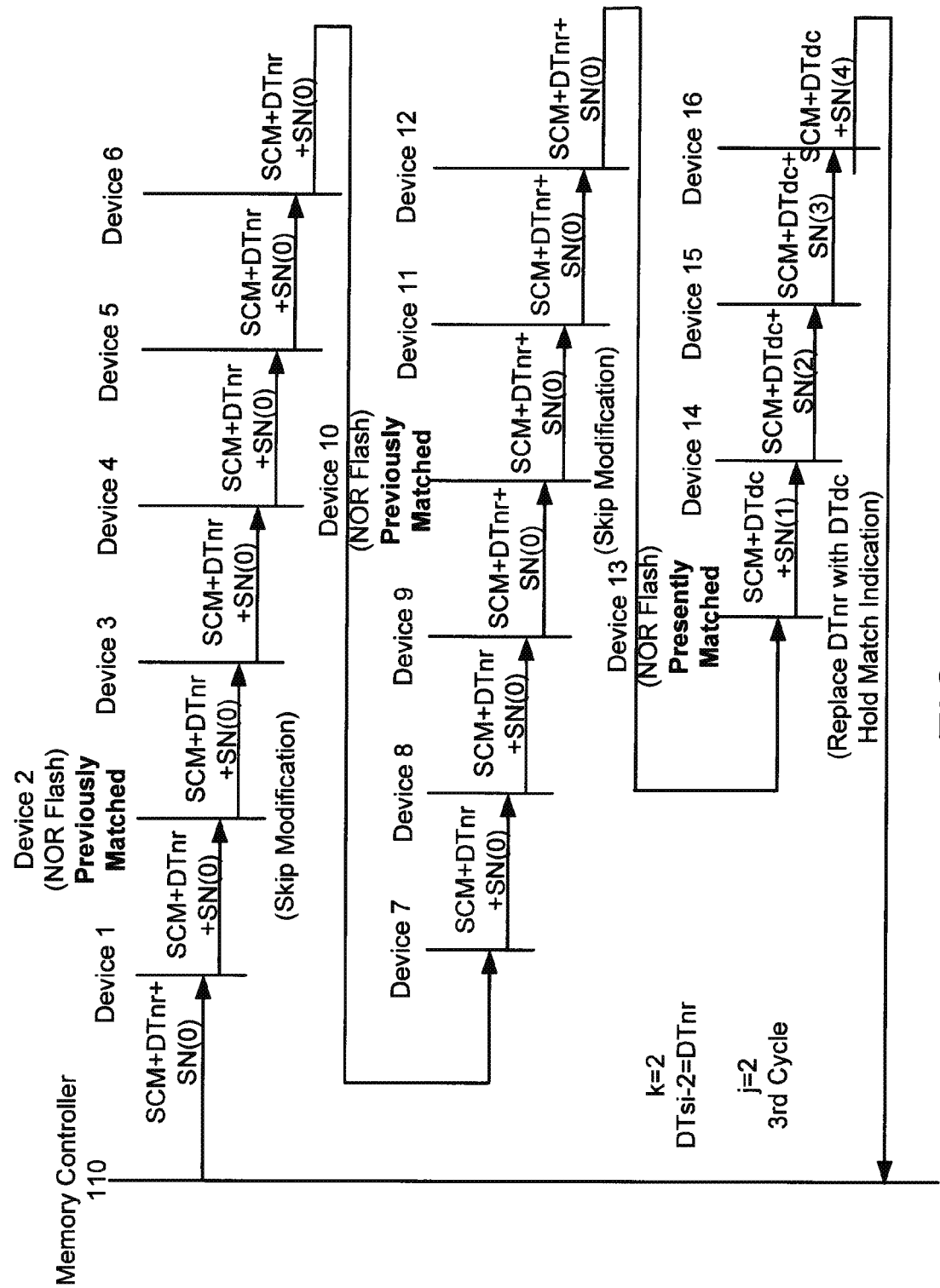

To perform operations of the third search cycle (j=3), the memory controller 110 again sends the DTnr as a search device type DTsi with an initial search number SN(0) to Device 1. The match indication storages 326 of Devices 2 and 10 store the "previous match indication" in the first and second search cycles, respectively. Devices 2 and 10 perform the operations of Path IV. It is assumed that Device 13 detects a "present match" (YES at step 573). Device 13 performs the operations of Path II. Devices 1, 3-9 and 11-12 perform the operations of Path I. The other devices perform the operations of Path III. Thus, the SNo16 contains the propagated SN(4). From the value of "4", the memory controller 110 identifies Device 13 (=(16+1)−4) as a NOR Flash device. This is shown in FIG. 20C.

Figure 20D:
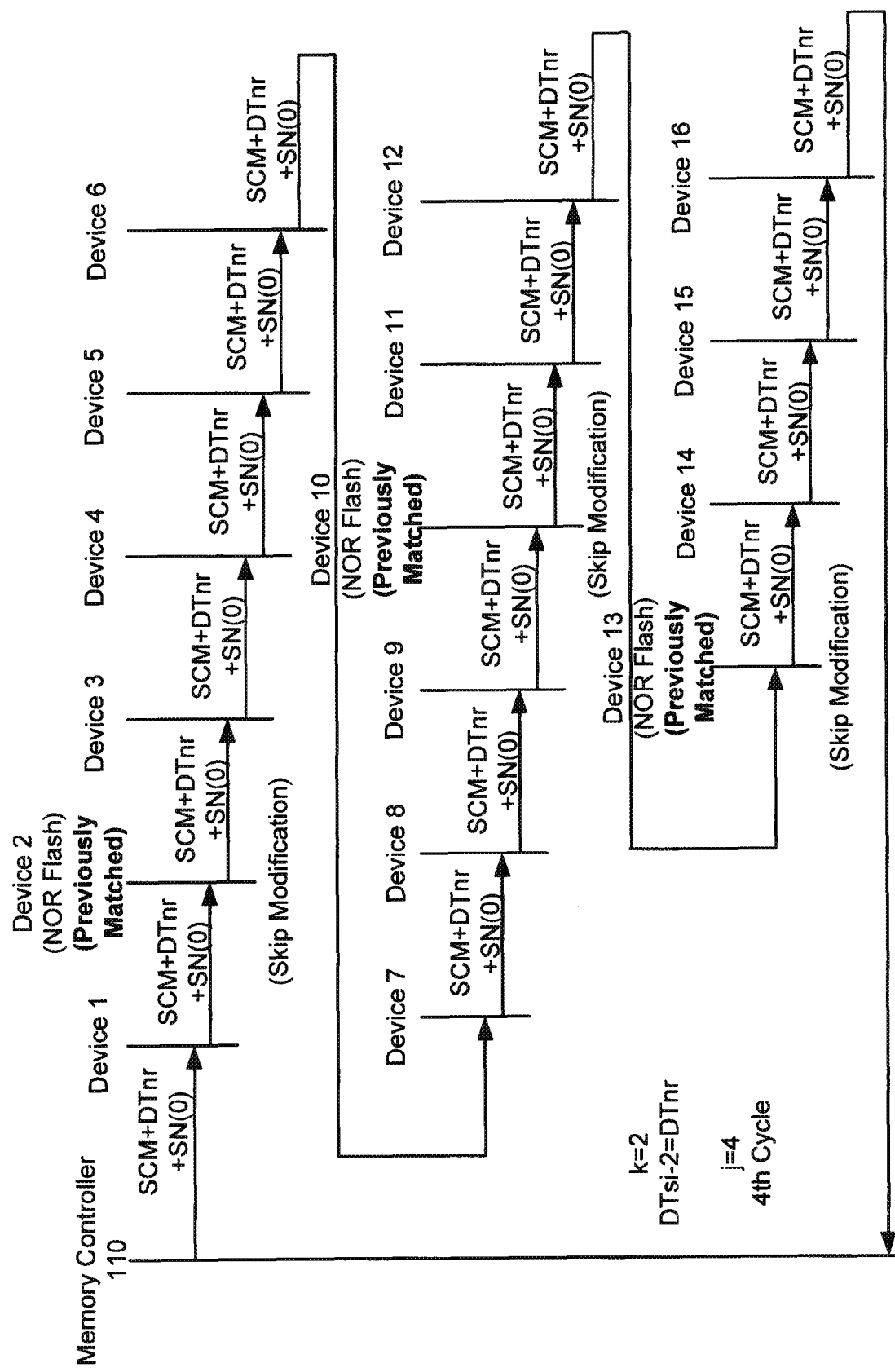

To perform operations of the fourth search cycle (j=4), the memory controller 110 again sends the DTnr as a search device type DTsi with an initial search number SN(0) to Device 1. The match indication storages 326 of Devices 2, 10 and 13 store the "previous match indication" in the first, second and third search cycles, respectively. Devices 2, 10 and 13 perform the operations of Path IV. It is assumed that no other devices detect a "present match" (NO at step 573). Devices 1, 3-9, 11-12 and 14-16 perform the operations of Path I. The modification operation is skipped. Therefore, the search number SN is propagated without being modified. The propagated SNo16 contains the SN(0). From the value of "0", the memory controller 110 recognizes that no more devices are required to be identified with reference to the search device type DTsi-2 (DTnr). This is depicted in FIG. 20D. If another search is required (YES at step 535), the memory controller 110 changes the search device type DTsi-k to another search device type DTsi (step 536). Then, the modification operations are repeated.

A third device identification operation (k=3) will be described. A search reference device type search device type DTsi-3 is the DTdm for DRAM devices. Each of FIGS. 21A-21D shows a protocol conducted in the devices shown in FIG. 2, with a search device type DTsi of a DRAM device type DTdm and a device type match of a DRAM device being detected.

Prior to the start of the match determination and modification operations, the match indication storages 326 of the DT match determiners 320 of all devices are reset by the reset signal SRST to cancel the "previous match indications" in the previous search with reference to the DTnr (step 532). A third device identification operation will be described referring to FIGS. 2-18 and 21A-21D.

Figure 21A:
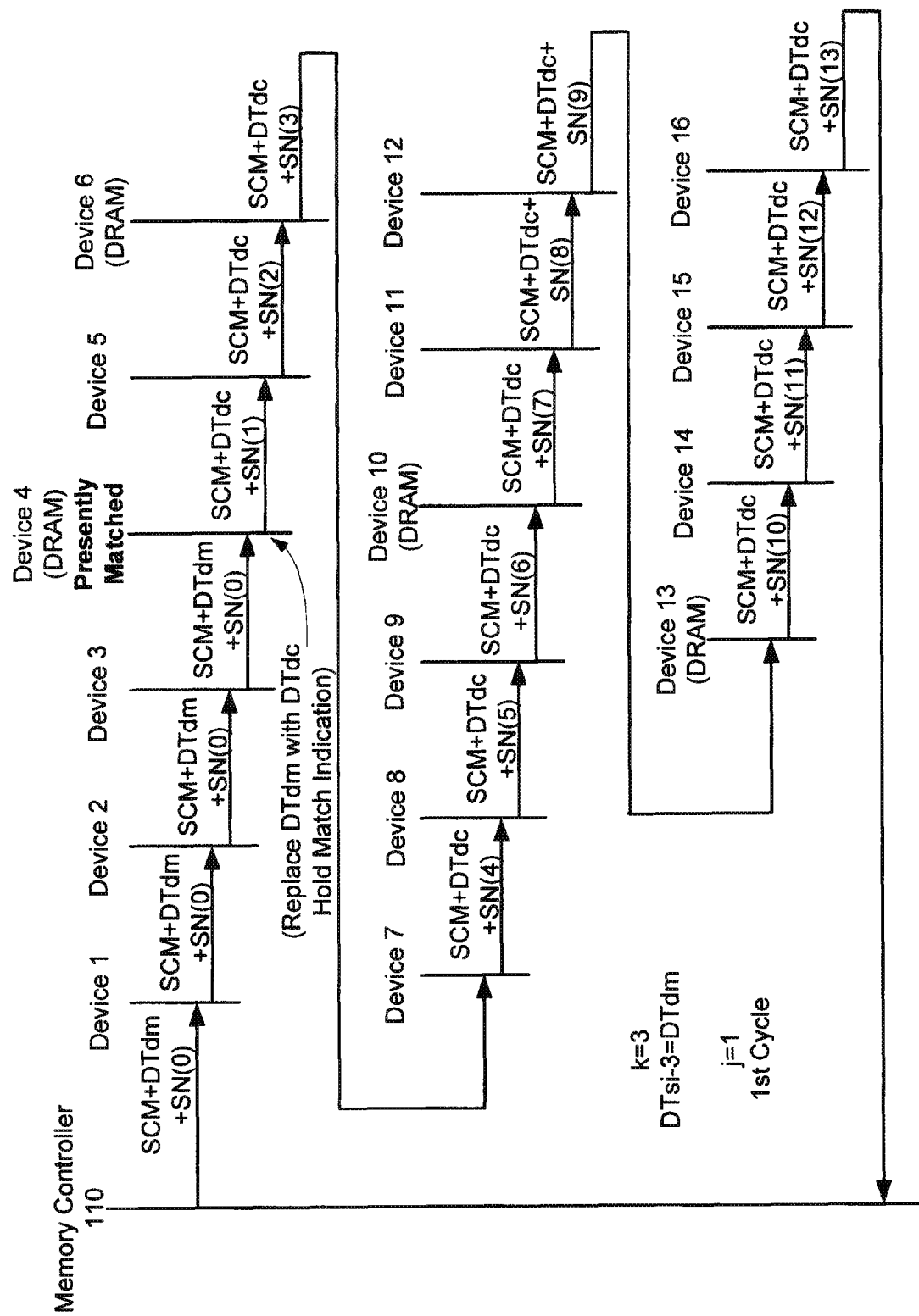
FIGS. 21A, 21B, 21C and 21D are schematic diagrams illustrating protocols conducted in the devices shown in FIG. 2, with a search device type DTsi of a DRAM device type DTdm.

To perform operations of the first search cycle (j=1), the memory controller 110 (the input signal provider 133) sends the search device type DTsi-3 of the DTdm to Device 1 of the interconnection configuration, the DTdm being in a combination of the search command SCM and an initial search number SN(0). It is assumed that Device 4 detects a "present match" (YES at step 573). Device 4 performs the operations of Path II. Devices 1-3 perform the operations of Path I. The other devices perform the operations of Path III. The SNo16 contains the propagated SN(13). From the value of "13", the memory controller 110 identifies Device 4 (=(16+1)−13) as a DRAM device. This is shown in FIG. 21A.

Figure 21B:
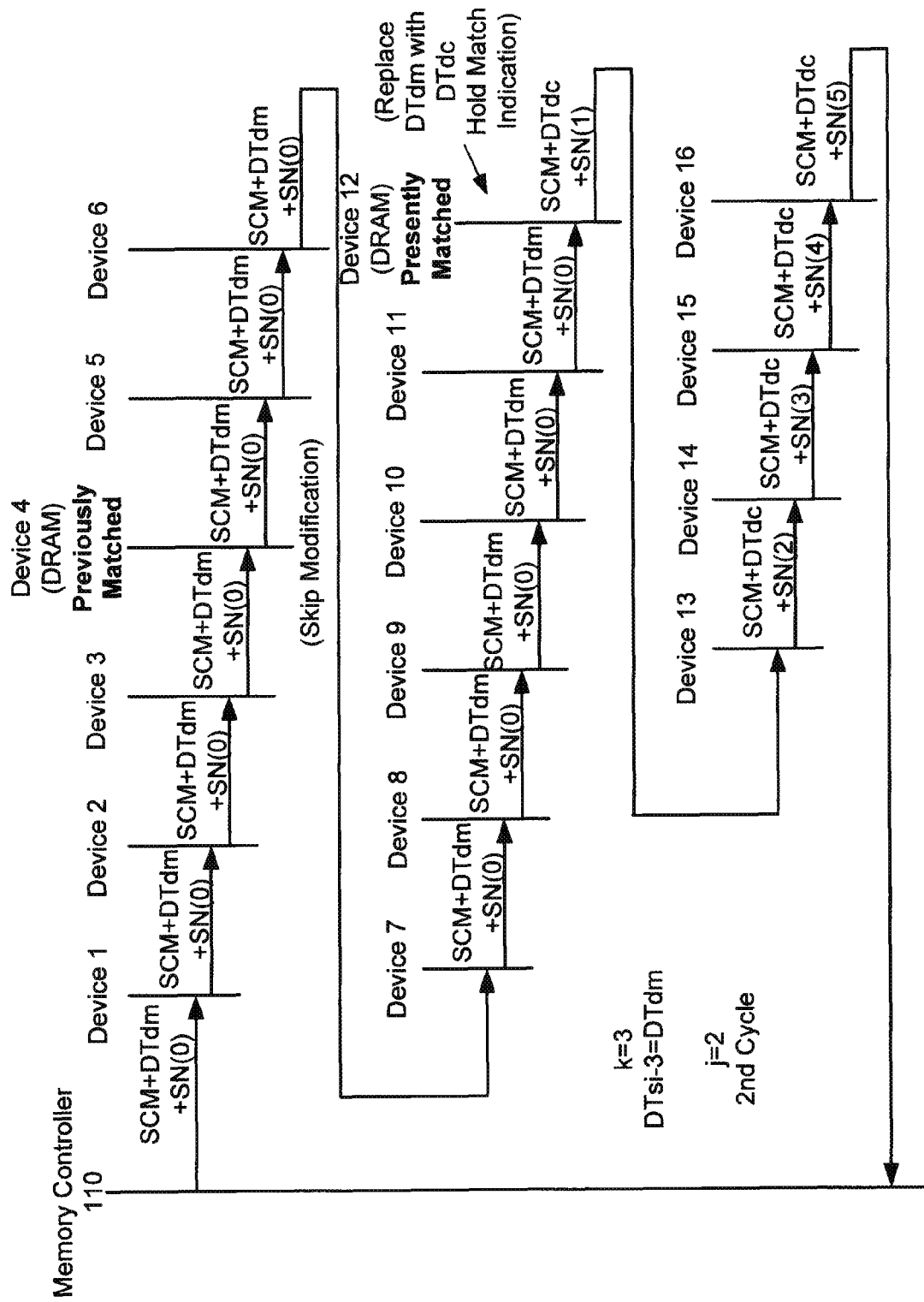

To perform operations of the second search cycle (j=2), the memory controller 110 again sends the DTdm as a search device type DTsi with an initial search number SN(0) to Device 1. The match indication storage 326 of Device 4 has the "previous match indication" stored therein in the first search cycle. Device 4 performs the operations of Path IV. It is assumed that Device 12 detects a "present match" (YES at step 573). Device 12 performs the operations of Path II. Devices 1-3 and 5-11 perform the operations of Path I. The other devices perform the operations of Path III. The SNo16 contains the propagated SN(5). From the value of "5", the memory controller 110 identifies Device 12 (=(16+1)−5) as a DRAM device. This is shown in FIG. 21B.

Figure 21C:
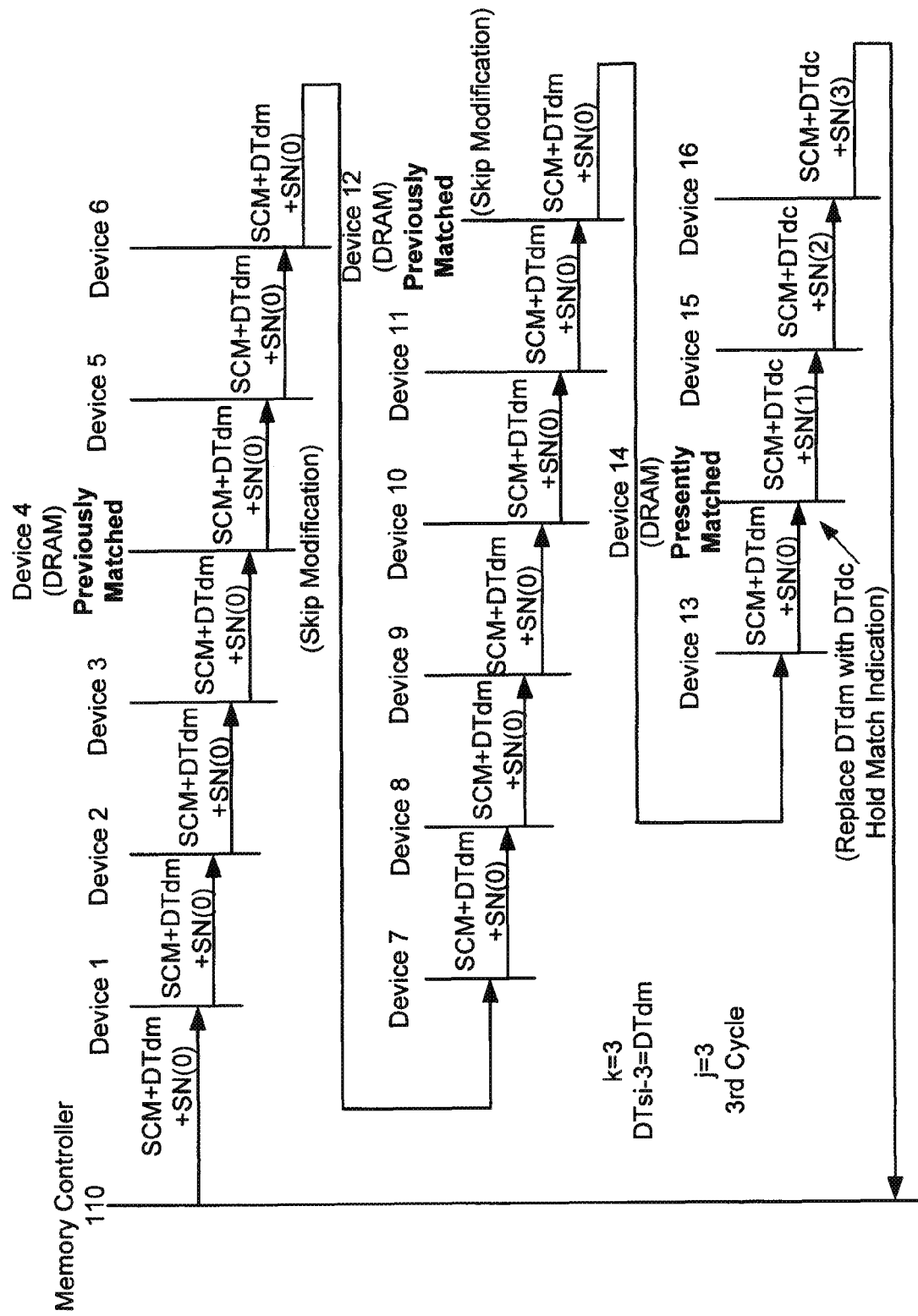
Figure 21D:
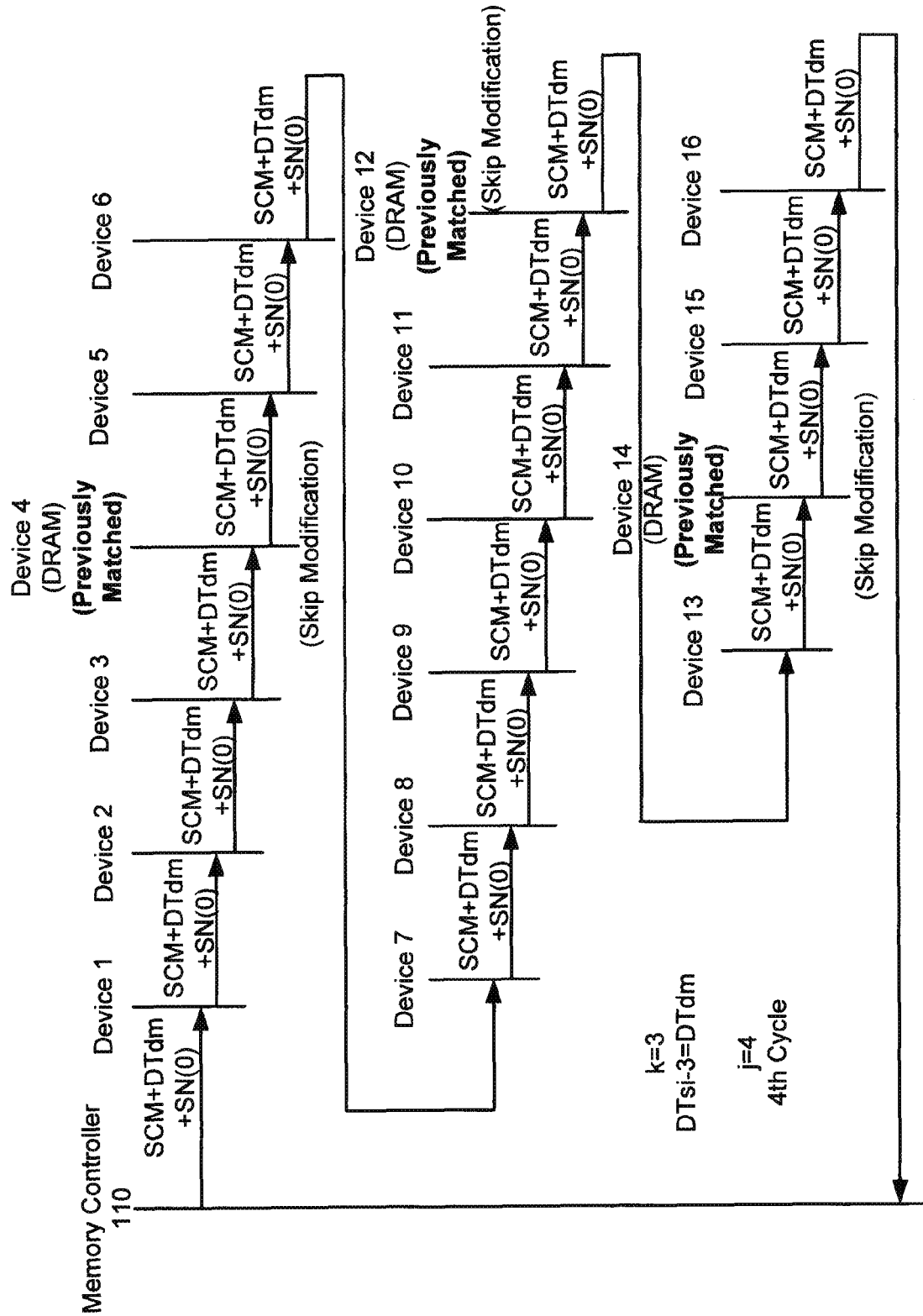

To perform operations of the third search cycle (j=3), the memory controller 110 again sends the DTdm as a search device type DTsi with an initial search number SN(0) to Device 1. The match indication storages 326 of devices 4 and 12 store the "previous match indication" in the first and second search cycles, respectively. Devices 4 and 12 perform the operations of Path IV. It is assumed that Device 14 detects a "present match" (YES at step 573). Device 14 performs the operations of Path II. Devices 1-3, 5-11 and 13 perform the operations of Path I. The other devices perform the operations of Path III. The SNo16 contains the propagated SN(3). From the value of "3", the memory controller 110 identifies Device 14 (=(16+1)−3) as a NOR Flash device. This is shown in FIG. 21C.

To perform operations of the fourth search cycle (j=4), the memory controller 110 again sends the DTdm as a search device type DTsi with an initial search number SN(0) to Device 1. The match indication storages 326 of devices 4, 12 and 14 store the "previous match indication" in the first, second and third search cycles, respectively. Devices 4, 12 and 14 perform the operations of Path IV. It is assumed that none of devices detect a "present match". Devices 1-3, 5-11, 13 and 15-16 perform the operations of Path I. In this case, the modification operation is skipped. Therefore, the search number SN is propagated without being modified. The propagated SNo16 contains the SN(0). From the value of "0", the memory controller 110 recognizes that no more devices are required to be identified with reference to the search device type DTsi-3 (DTdm). This is depicted in FIG. 21O. If another search is required (YES at step 535), the memory controller 110 changes the search device type DTsi-k to another search device type DTsi (step 536). Then, the modification operations are repeated.

A fourth device identification operation (k=4) will be described. A search device type DTsi-4 is the DTsm for SRAM devices. Each of FIGS. 22A-22D shows a protocol conducted in the devices shown in FIG. 2, with a search device type DTsi of an SRAM device type DTsm and a device type match of an SRAM device being detected.

Prior to the start of the match determination and modification operations, the match indication storages 326 of the DT match determiners 320 of all devices are reset by the reset signal SRST to cancel the "previous match indications" in the previous search with reference to the DTdm (step 532). A fourth device identification operation will be described referring to FIGS. 2-18 and 22A-22D.

Figure 22A:
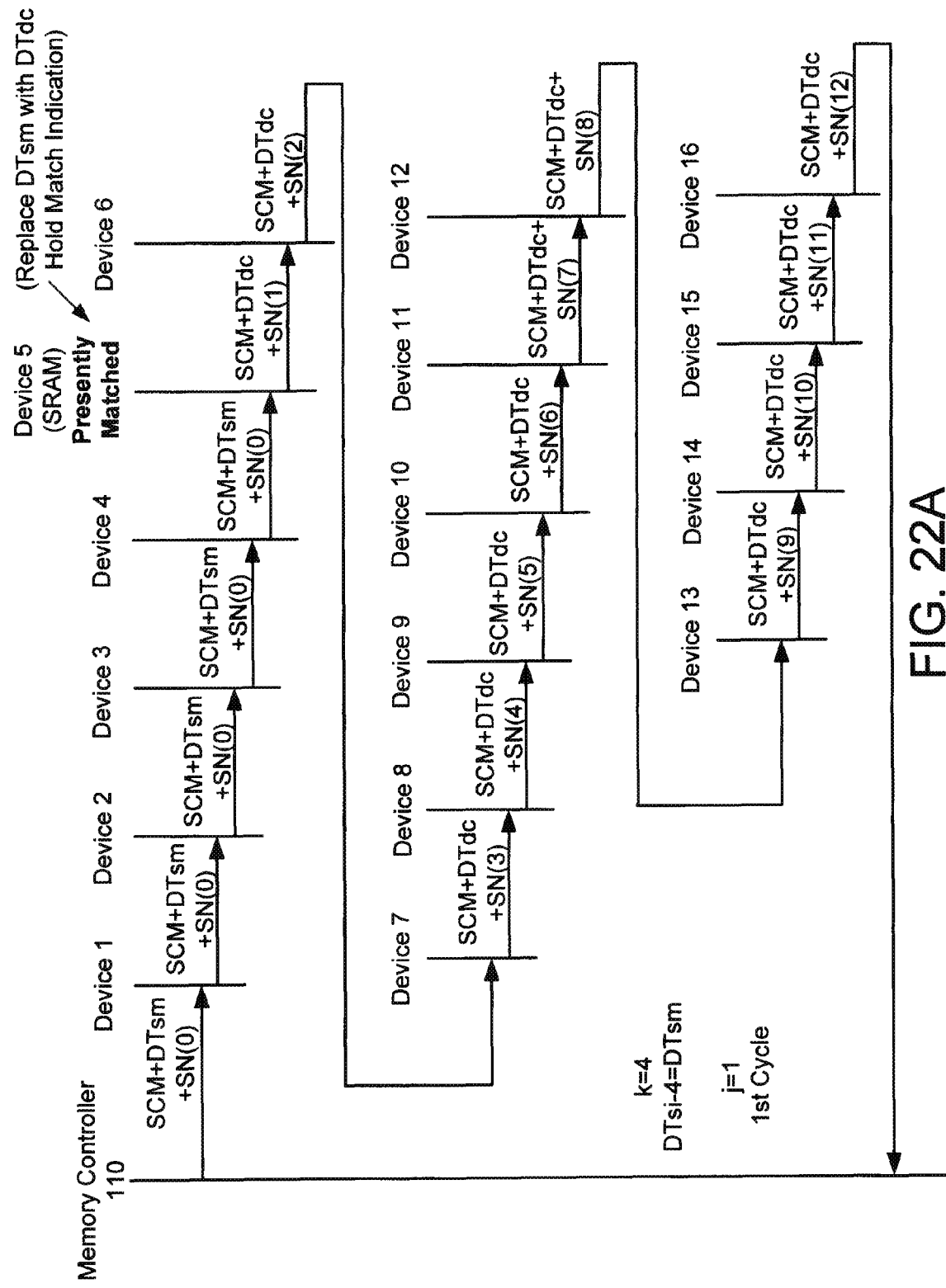
FIGS. 22A, 22B, 22C, 22C and 22D are schematic diagrams illustrating protocols conducted in the devices shown in FIG. 2, with a search device type DTsi of an SRAM device type DTsm.

To perform operations of the first search cycle (j=1), the memory controller 110 (the input signal provider 133) sends the search device type DTsi-4 of the DTsm to Device 1 of the interconnection configuration, the DTsm being in a combination of the search command SCM and an initial search number SN(0). It is assumed that Device 5 detects a "present match". Device 5 performs the operations of Path II. Devices 1-4 perform the operations of Path I. The other devices perform the operations of Path III. The SNo16 contains the propagated SN(12). From the value of "12", the memory controller 110 identifies Device 5 (=(16+1)−12) as a SRAM device. This is shown in FIG. 22A.

Figure 22B:
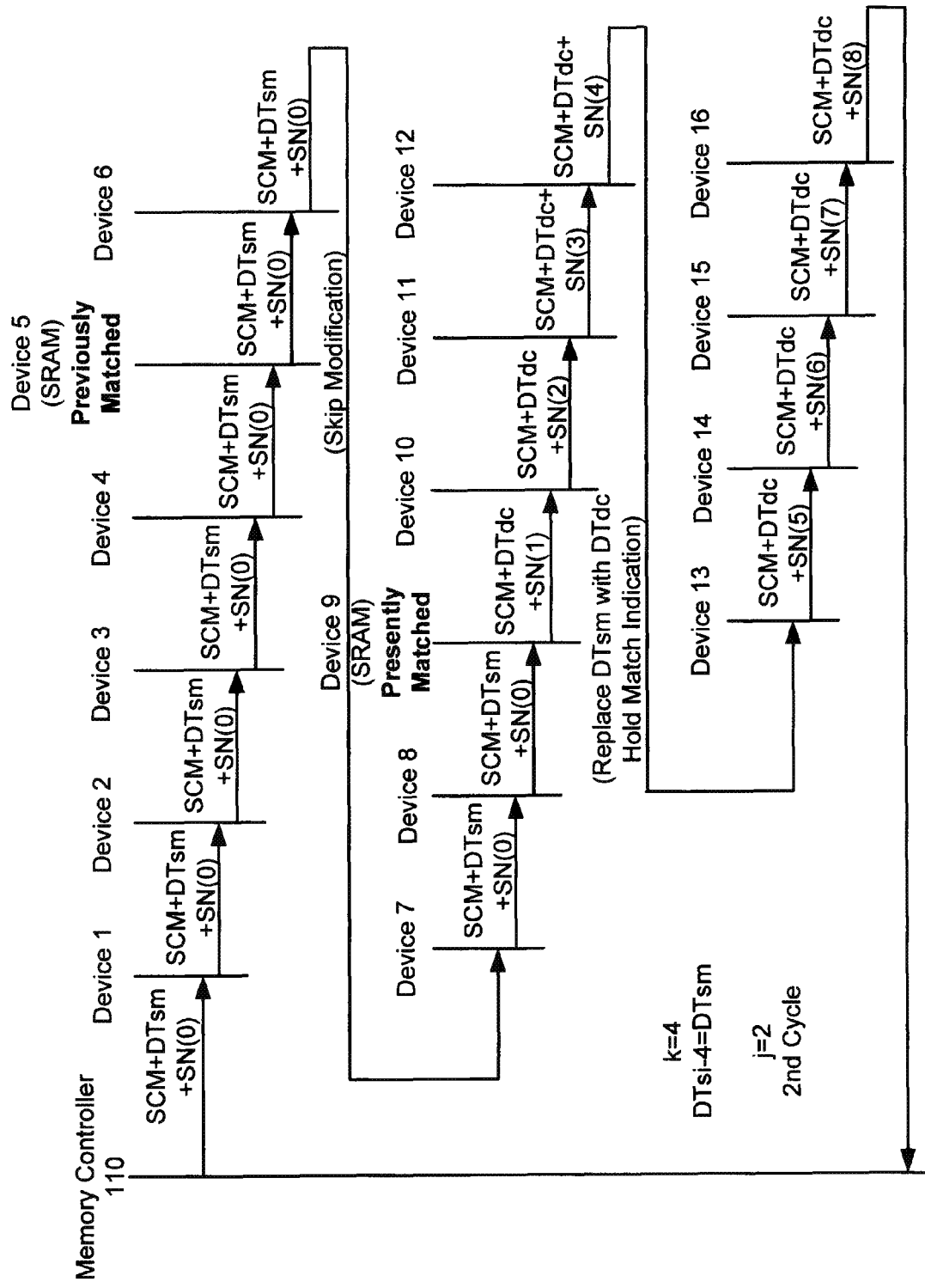

To perform operations of the second search cycle (j=2), the memory controller 110 again sends the DTsm as a search device type DTsi with an initial search number SN(0) to Device 1. The match indication storage 326 of Device 5 has the "previous match indication" stored therein in the first search cycle. Device 5 performs the operations of Path IV. It is assumed that Device 9 detects a "present match". Device 9 performs the operations of Path II. Devices 1-4 and 6-8 perform the operations of Path I. Devices 10-16 perform the operations of Path III. The SNo16 contains the propagated SN(8). From the value of "8", the memory controller 110 identifies Device 9 (=(16+1)−8) as a SRAM device. This is shown in FIG. 22B.

Figure 22C:
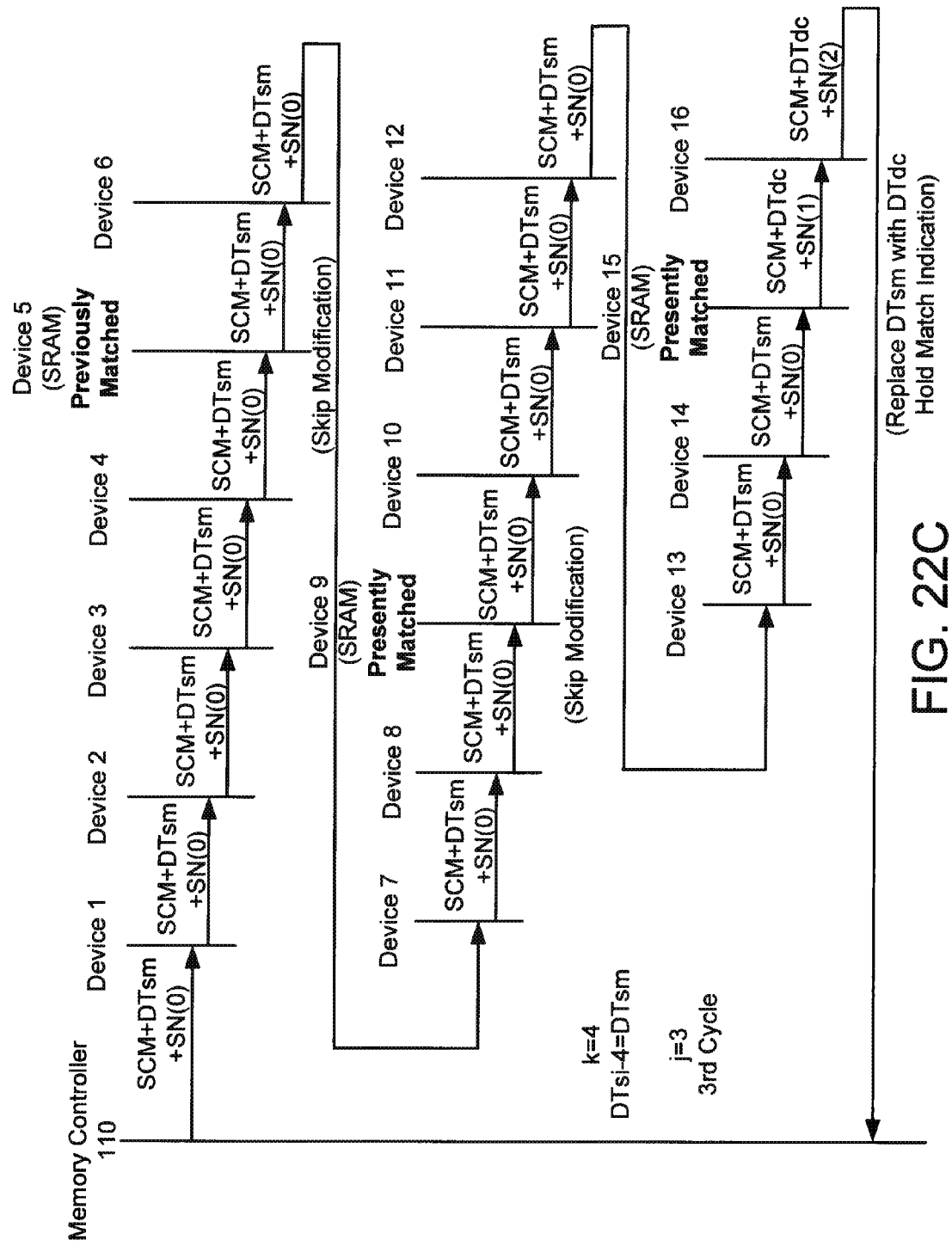

To perform operations of the third search cycle (j=3), the memory controller 110 again sends the DTsm as a search device type DTsi with an initial search number SN(0) to Device 1. The match indication storages 326 of devices 5 and 9 store the "previous match indication" in the first and second search cycles, respectively. Devices 5 and 9 perform the operations of Path IV. It is assumed that Device 15 detects a "present match". Device 15 performs the operations of Path II. Devices 1-4, 6-8 and 10-14 perform the operations of Path I. Device 16 performs the operations of Path III. The SNo16 contains the propagated SN(2). From the value of "2", the memory controller 110 identifies Device 15 (=(16+1)−2) as an SRAM device. This is shown in FIG. 22C.

Figure 22D:
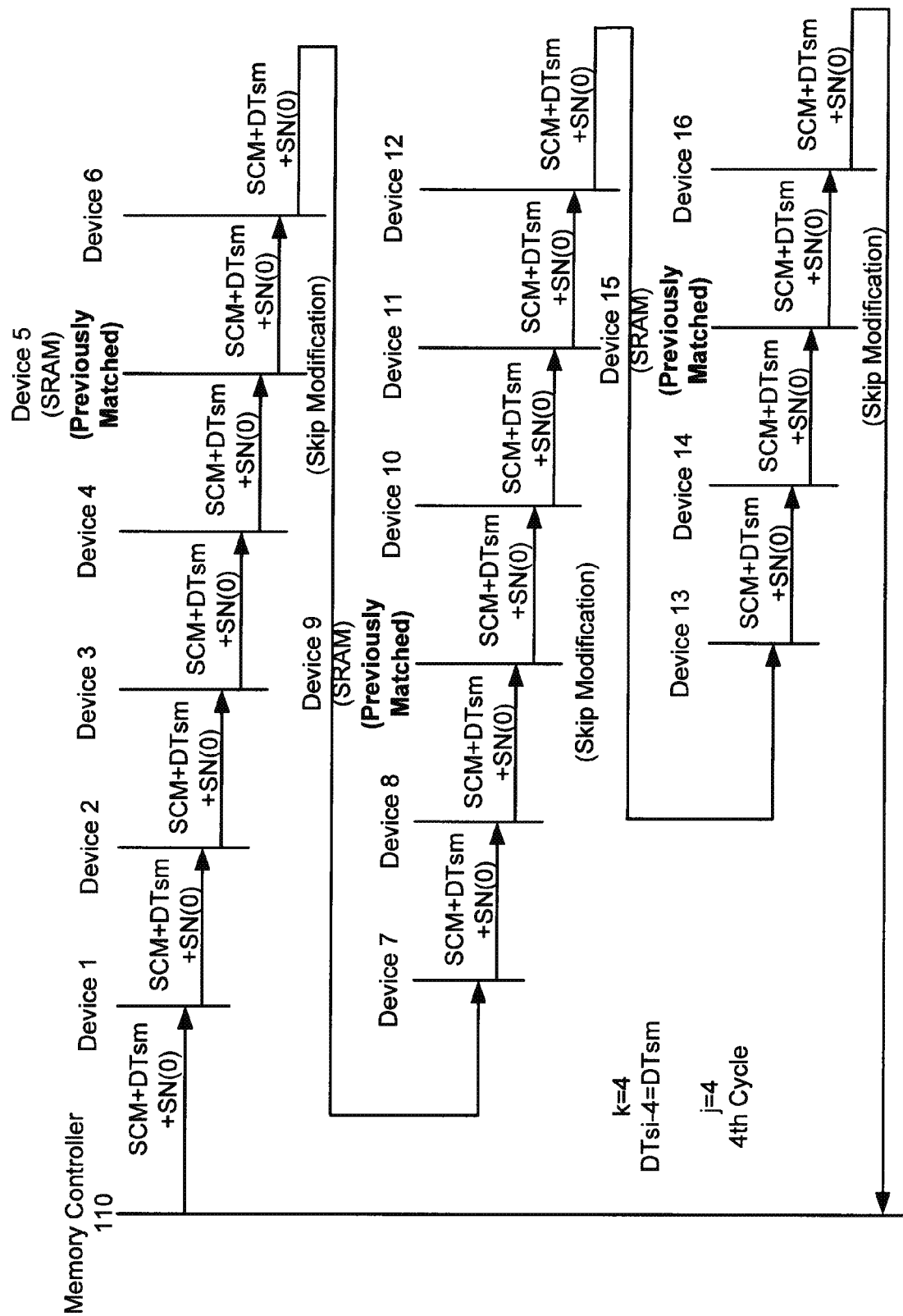

To perform operations of the fourth search cycle (j=4), the memory controller 110 again sends the DTsm as a search device type DTsi with an initial search number SN(0) to Device 1. The match indication storages 326 of devices 5, 9 and 15 store the "previous match indication" in the first, second and third search cycles, respectively. Devices 5, 9 and 15 perform the operations of Path IV. It is assumed that none of the other devices detect a "present match". Devices 1-4, 6-8, 10-14 and 16 perform the operations of Path I. In this case, the modification operation is skipped. Therefore, the search number SN is propagated without being modified. The propagated SNo16 contains the SN(0). From the value of "0", the memory controller 110 recognizes that no more devices are required to be identified with reference to the search device type DTsi-4 (DTsm). This is depicted in FIG. 22D. If another search is required (YES at step 535), the memory controller 110 changes the search device type DTsi-k to another search device type DTsi (step 536). Then, the modification operations are repeated.

Figure 23A:
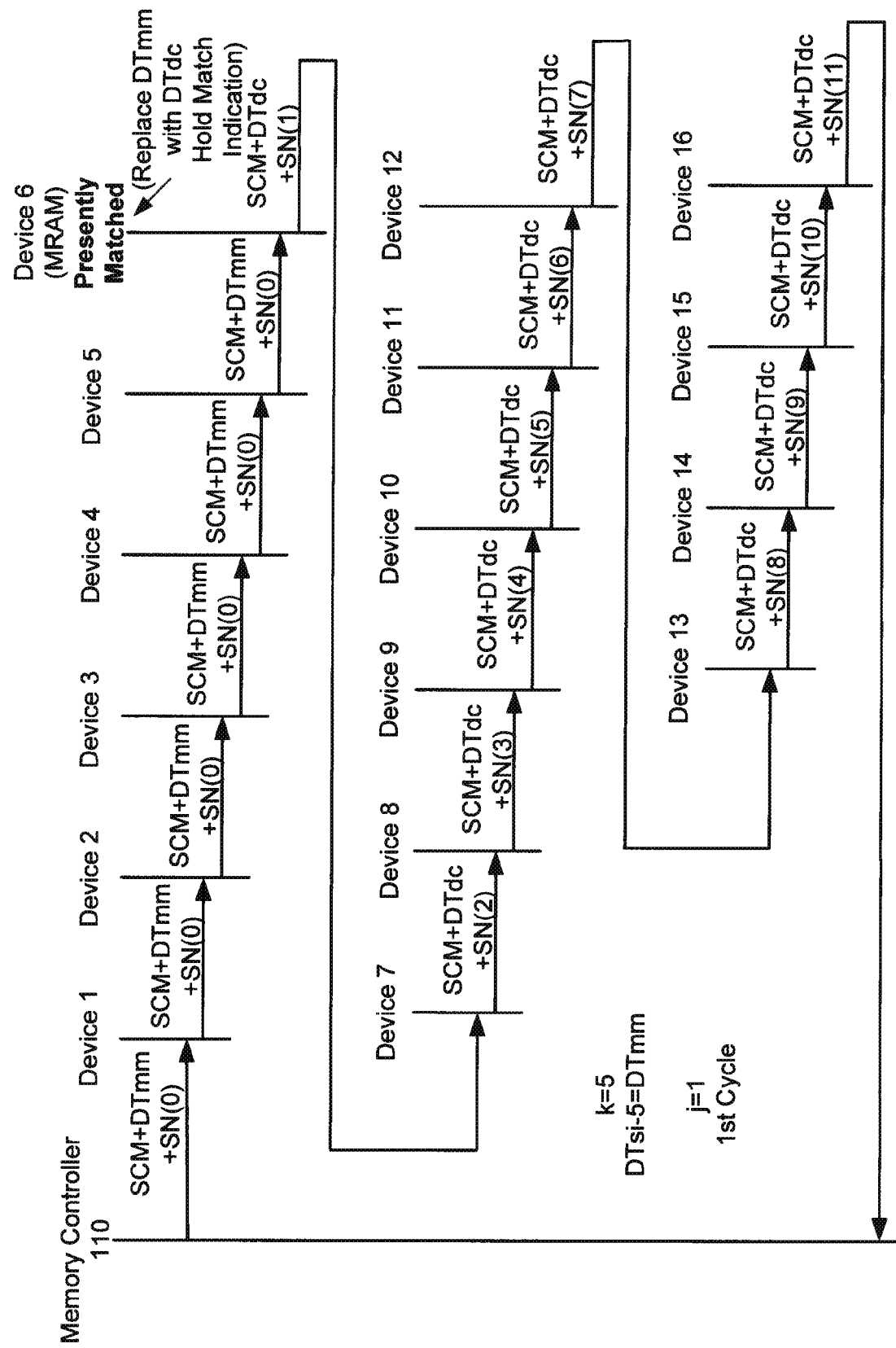
FIGS. 23A, 23B and 23C are schematic diagrams illustrating protocols conducted in the devices shown in FIG. 2, with a search device type DTsi of a MRAM device type DTmm.
Figure 23B:
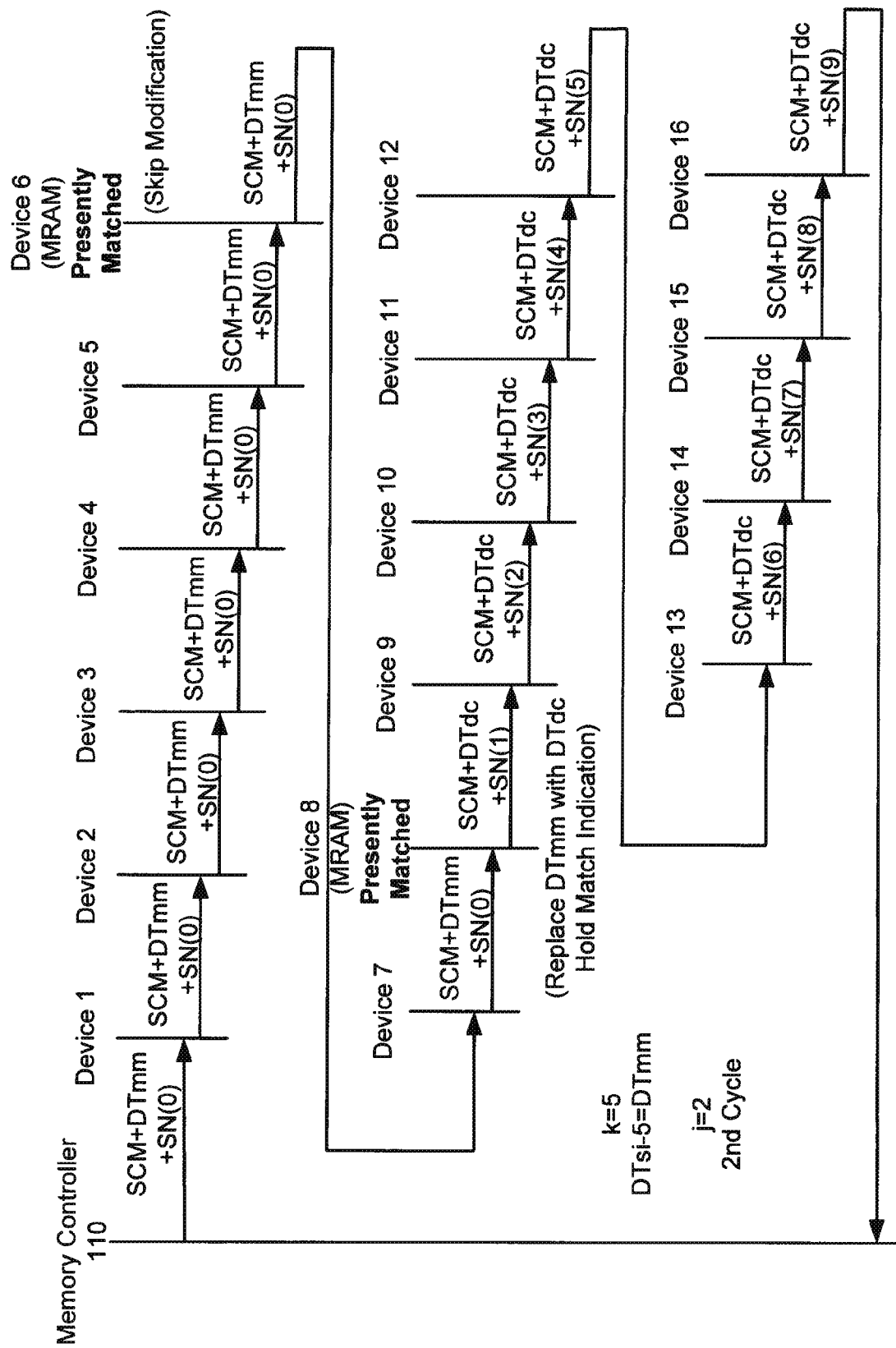
Figure 23C:
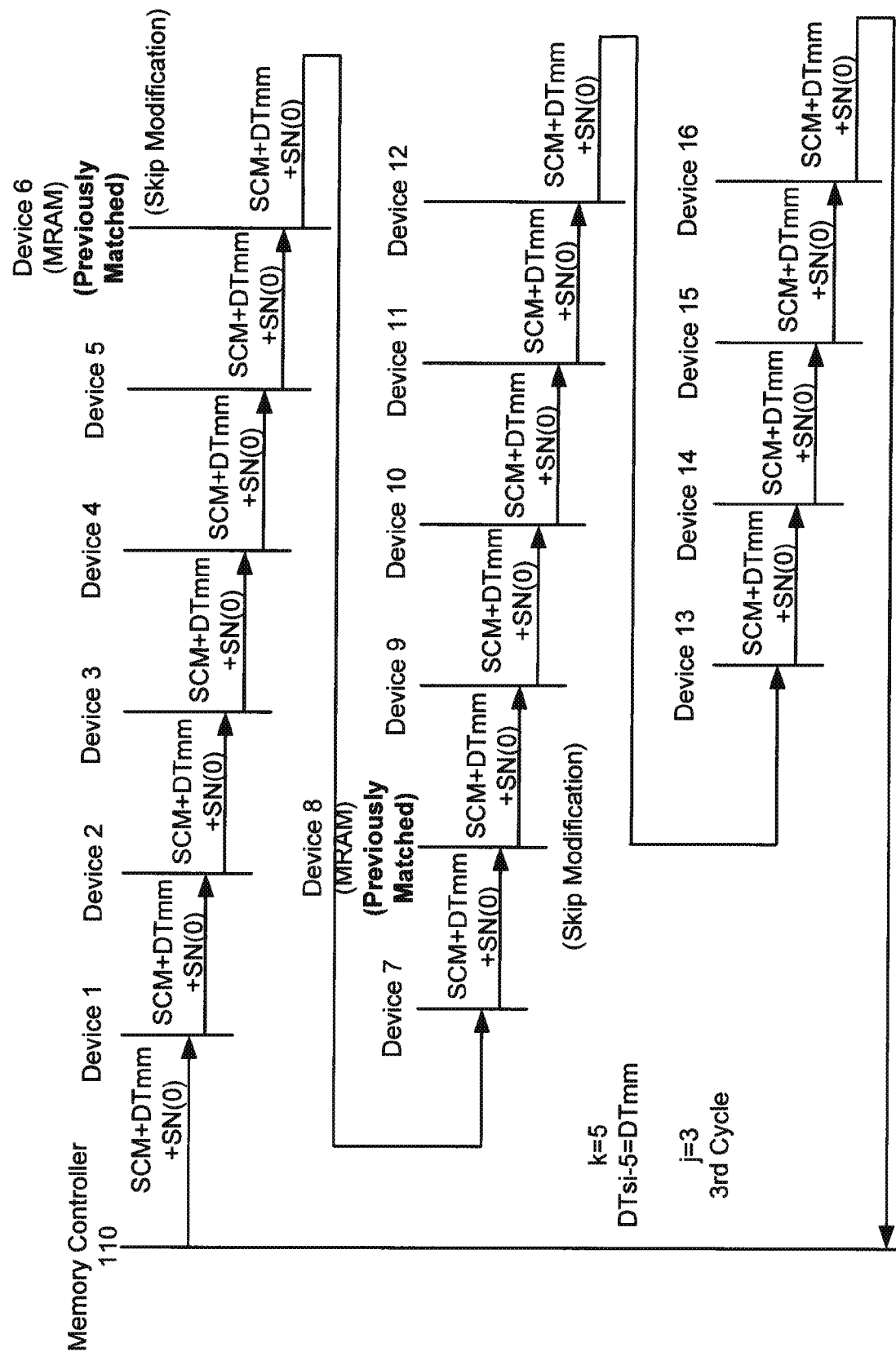

A fifth device identification operation (k=5) will be described. A search device type DTsi-5 is the DTmm for MRAM devices. Each of FIGS. 23A-23C shows a protocol conducted in the devices shown in FIG. 2, with a search device type DTsi of an MRAM device type DTmm and a device type match of an MRAM device being detected.

Prior to the start of the match determination and modification operations, the match indication storages 326 of the DT match determiners 320 of all devices are reset by the reset signal SRST to cancel the "previous match indications" in the previous search with reference to the DTsm (step 532). A fifth device identification operation will be described referring to FIGS. 2-18 and 23A-23C.

To perform operations of the first search cycle (j=1), the memory controller 110 (the input signal provider 133) sends the search device type DTsi-5 of the DTmm to Device 1 of the interconnection configuration, the DTmm being in a combination of the search command SCM and an initial search number SN(0). It is assumed that Device 6 detects a "present match". Device 6 performs the operations of Path II. Devices 1-5 perform the operations of Path I. Devices 7-16 perform the operations of Path III. The SNo16 contains the propagated SN(11). From the value of "11", the memory controller 110 identifies Device 6 (=(16+1)−11) as an MRAM device. This is shown in FIG. 23A.

To perform operations of the second search cycle (j=2), the memory controller 110 again sends the DTmm as a search device type DTsi with an initial search number SN(0) to Device 1. The match indication storage 326 of Device 6 stores the "previous match indication" stored therein in the first search cycle. Device 6 performs the operations of Path IV. It is assumed that Device 8 detects a "present match". Device 8 performs the operations of Path II. Devices 1-5 perform the operations of Path I. Devices 9-16 perform the operations of Path III. The SNo16 contains the propagated SN(9). From the value of "9", the memory controller 110 identifies Device 8 (=(16+1)−9) is an MRAM device. This is shown in FIG. 23B.

To perform operations of the third search cycle (j=3), the memory controller 110 again sends the DTmm as a search device type DTsi with an initial search number SN(0) to Device 1. The match indication storages 326 of devices 6 and 8 store the "previous match indication" in the first and second search cycles, respectively. Devices 6 and 8 perform the operations of Path IV. It is assumed that none of devices detect a "present match". Devices 1-5, 7 and 9-16 perform the operations of Path I. In this case, the modification operation is skipped. Therefore, the search number SN is propagated without being modified. The propagated SNo16 contains the SN(0). From the value of "0", the memory controller 110 recognizes that no more devices are required to be identified with reference to the search device type DTsi-5 (DTmm). This is depicted in FIG. 23C. If another search is required (YES at step 535), the memory controller 110 changes the search device type DTsi-k to another search device type DTsi (step 536). Then, the modification operation is repeated.

Figure 24A:
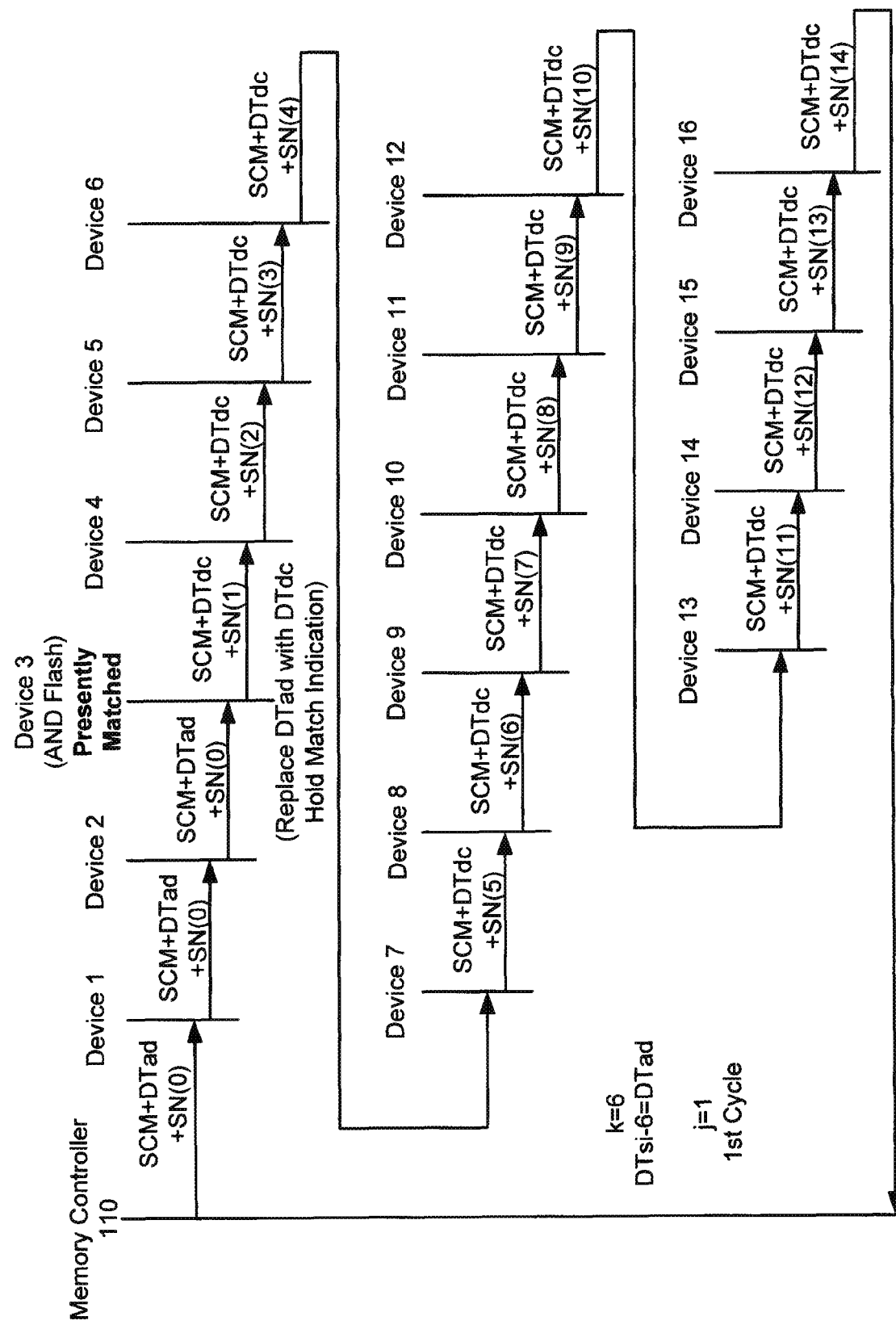
FIGS. 24A and 24B are schematic diagrams illustrating protocols conducted in the devices shown in FIG. 2, with a search device type DTsi of an AND Flash device type DTad.
Figure 24B:
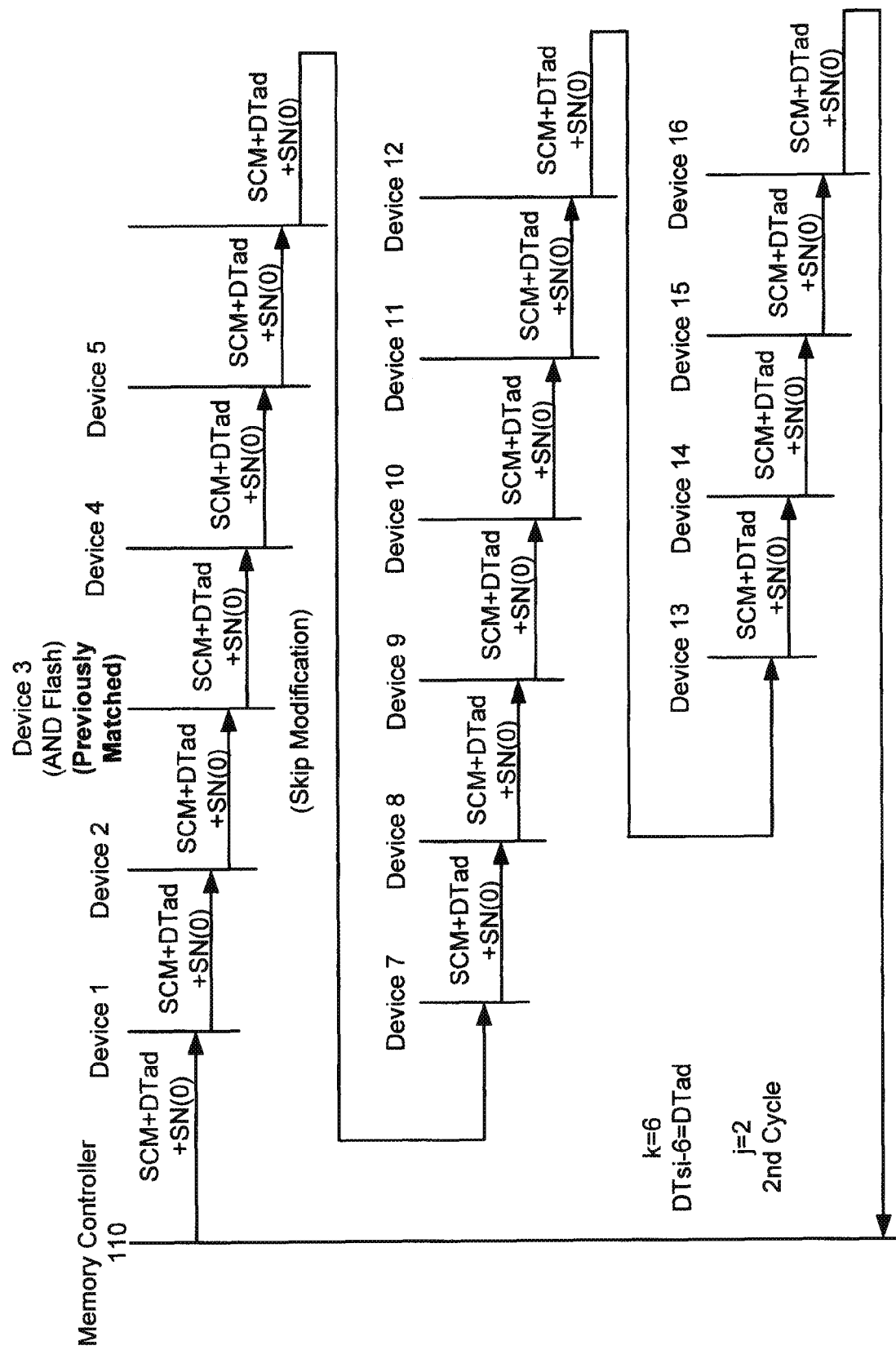

A sixth device identification operation (k=6) will be described. A search device type DTsi-6 is the DTad for AND Flash devices. Each of FIGS. 24A-24B shows a protocol conducted in the devices shown in FIG. 2, with a search device type DTsi of an AND Flash device type DTad and a device type match an AND Flash device being detected.

Prior to the start of the match determination and modification operations, the match indication storages 326 of the DT match determiners 320 of all devices are reset by the reset signal SRST to cancel the "previous match indications" in the first search with reference to the DTmm (step 532). A sixth device identification operation will be described referring to FIGS. 2-18 and 24A-24B.

To perform operations of the first search cycle (j=1), the memory controller 110 (the input signal provider 133) sends the search device type DTsi-6 of the DTad to Device 1 of the interconnection configuration, the DTad being in a combination of the search command SCM and an initial search number SN(0). It is assumed that Device 3 detects a "present match". Device 3 performs the operations of Path II. Devices 1-2 perform the operations of Path I. Devices 4-16 perform the operations of Path III. The SNo16 contains the propagated SN(14). From the value of "14", the memory controller 110 identifies Device 3 (=(16+1)−14) as an AND Flash device. This is shown in FIG. 24A.

To perform operations of the second search cycle (j=2), the memory controller 110 again sends the DTad as a search device type DTsi with an initial search number SN(0) to Device 1. The match indication storage 326 of Device 3 has the "previous match indication" stored therein in the first search cycle. Device 3 performs the operations of Path IV. It is assumed that none of devices detect a "present match". Devices 1-2 and 4-16 perform the operations of Path I. In this case, the modification operation is skipped. Therefore, the search number SN is propagated without being modified. The propagated SNo16 contains the SN(0). From the value of "0", the memory controller 110 recognizes that no more devices are required to be identified with reference to the search device type DTsi-6 (DTad). This is depicted in FIG. 24B. If another search is required (YES at step 535), the memory controller 110 changes the search device type DTsi-k to another search device type DTsi (step 536). Then, the modification operations are repeated.

Figure 25:
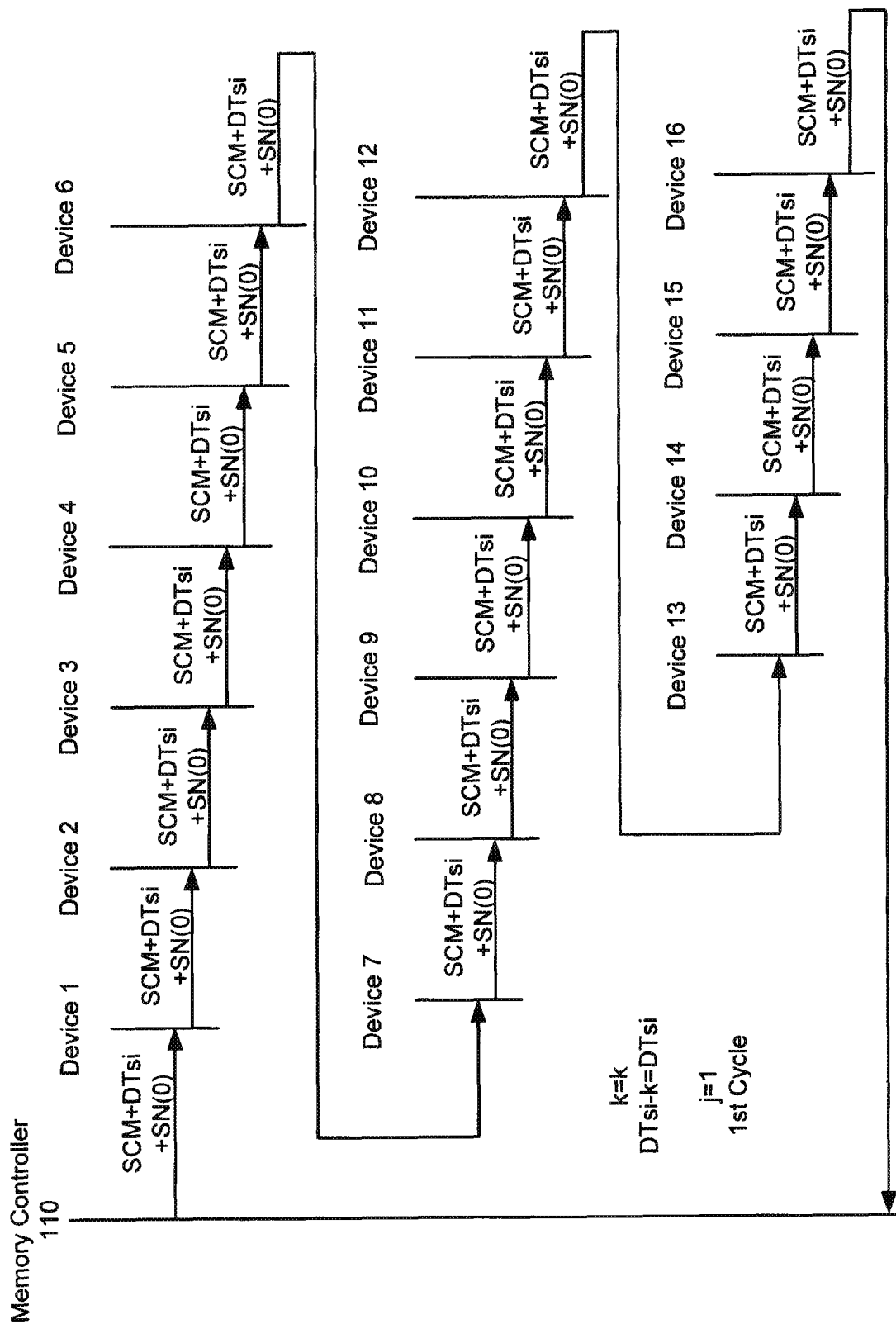
FIG. 25 is a schematic diagram illustrating a protocol conducted in the devices shown in FIG. 2, with a search device type DTsi that does not match any one of the devices.

If a search device type DTsi sent by the memory controller 110 does not match any of the memory devices in an interconnection configuration as shown in FIG. 2, the propagated SNo16 will contain an initial search number SN(0), as shown in FIG. 25. In this case, all devices perform the operations of Path I and skip the modification operations.

During the device identifying operations as described above, the data fed by the compiler 138 is stored in the data memory 139 of the memory controller 110. Table 2 shows compiled data.

In Table 2, N/A* indicates that search cycles of that device identification process end. N/A** indicates that there is no data.

Upon completion of the M-th device identification process, no more device identification is required (NO at step 535), the compiler 138 of the memory controller 110 re-compiles the data stored in the data memory 139 and re-stores the re-compiled data therein.

Figure 26:
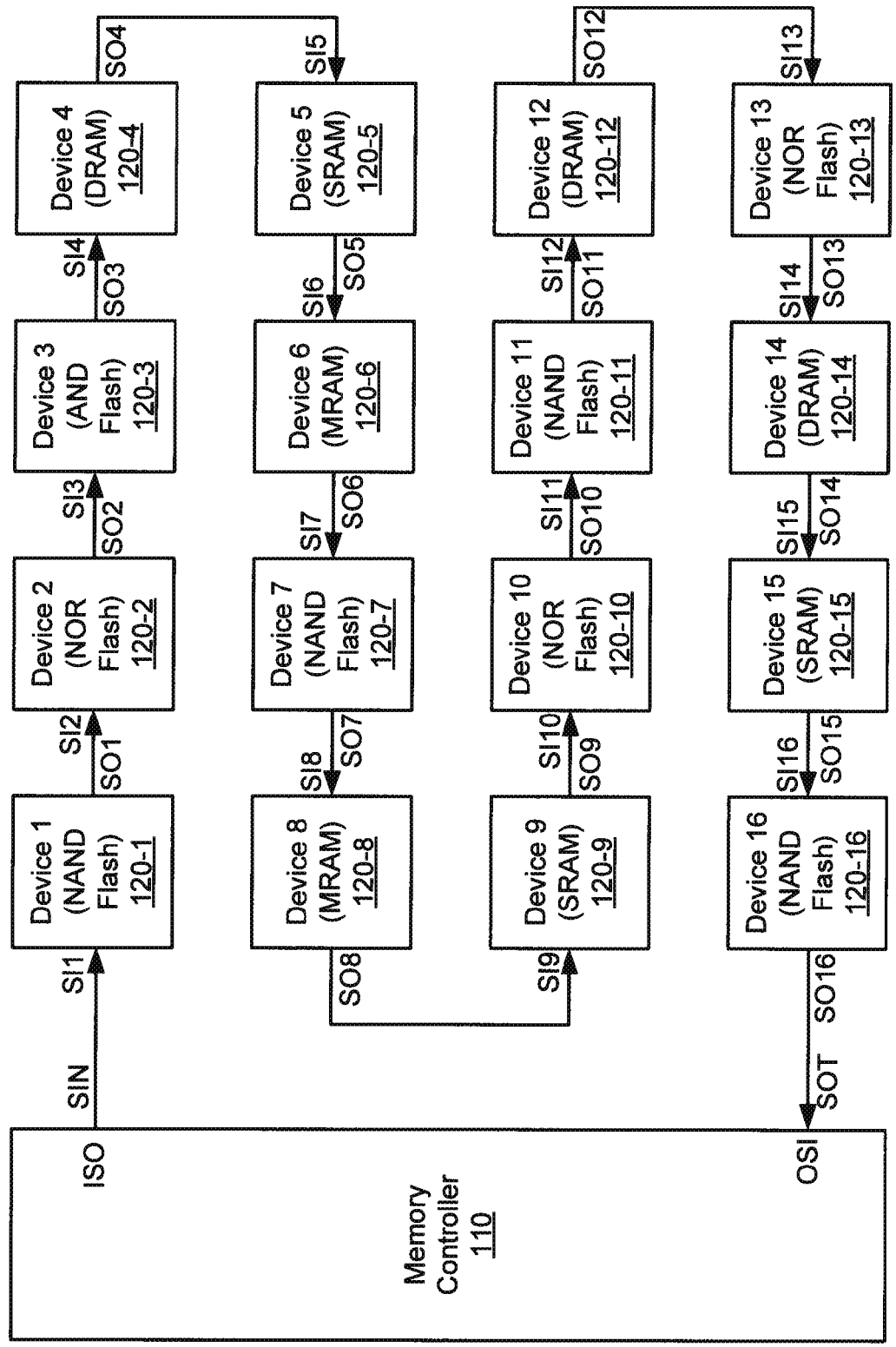
FIG. 26 is a block diagram illustrating the system of FIG. 2 wherein the device types are identified.

In the examples, as identified by the methods described above, the device types in the interconnection configuration are mixed. The identified types of devices are shown in FIG. 26. Re-compiled data regarding the device numbers (device addresses) and identified devices are shown in Table 3.

TABLE 3

| Device Number (Device Address) | Device Type of Identified Type |
|---|---|
| 1 | NAND Flash Device |
| 2 | NOR Flash Device |
| 3 | AND Flash Device |
| 4 | DRAM Device |
| 5 | SRAM Device |
| 6 | MRAM Device |
| 7 | NAND Flash Device |
| 8 | MRAM Device |
| 9 | SRAM Device |
| 10 | NOR Flash Device |
| 11 | NAND Flash Device |
| 12 | DRAM Device |
| 13 | NOR Flash Device |
| 14 | DRAM Device |
| 15 | SRAM Device |
| 16 | NAND Flash Device |

Upon completion of the device identification process, the data memory 139 stores the above data, the memory controller 110 becomes aware of the device types of the memory devices in the interconnection configuration. Referring to the

TABLE 2

| k | DTsi-k | Search Cycle (j-th) | Number of SNo16 | Number Identification by: (Ndv + 1) − SNo16 | Identified Device Type of Device (DV) |
|---|---|---|---|---|---|
| 1 | DTnd | 1st | SN(16) | 1 | DV1: NAND Flash Device |
|   |      | 2nd | SN(10) | 7 | DV7: NAND Flash Device |
|   |      | 3rd | SN(6)  | 11 | DV11: NAND Flash Device |
|   |      | 4th | SN(1)  | 16 | DV16: NAND Flash Device |
|   |      | 5th | SN(0)  | N/A* | N/A** |
| 2 | DTnr | 1st | SN(15) | 2 | DV2: NOR Flash Device |
|   |      | 2nd | SN(7)  | 10 | DV10: NOR Flash Device |
|   |      | 3rd | SN(4)  | 13 | DV13: NOR Flash Device |
|   |      | 4th | SN(0)  | N/A* | N/A** |
| 3 | DTdm | 1st | SN(13) | 4 | DV4: DRAM Device |
|   |      | 2nd | SN(5)  | 12 | DV12: DRAM Device |
|   |      | 3rd | SN(3)  | 14 | DV14: DRAM Device |
|   |      | 4th | SN(0)  | N/A* | N/A** |
| 4 | DTsm | 1st | SN(12) | 5 | DV5: SRAM Device |
|   |      | 2nd | SN(8)  | 9 | DV9: SRAM Device |
|   |      | 3rd | SN(2)  | 15 | DV15: SRAM Device |
|   |      | 4th | SN(0)  | N/A* | N/A** |
| 5 | DTmm | 1st | SN(11) | 6 | DV6: MRAM Device |
|   |      | 2nd | SN(9)  | 8 | DV8: MRAM Device |
|   |      | 3rd | SN(0)  | N/A* | N/A** |
| 6 | DTad | 1st | SN(14) | 3 | DV3: AND Flash Device |
|   |      | 2nd | SN(0)  | N/A* | N/A** |
| — | — | — | — | — | — |
| — | — | — | — | — | — |
| — | — | — | — | — | — |
| M | — | — | — | — | — | device addresses and their device types, the memory controller 110 can address intended (or designated) devices for data processing in a normal mode.

Figure 27:
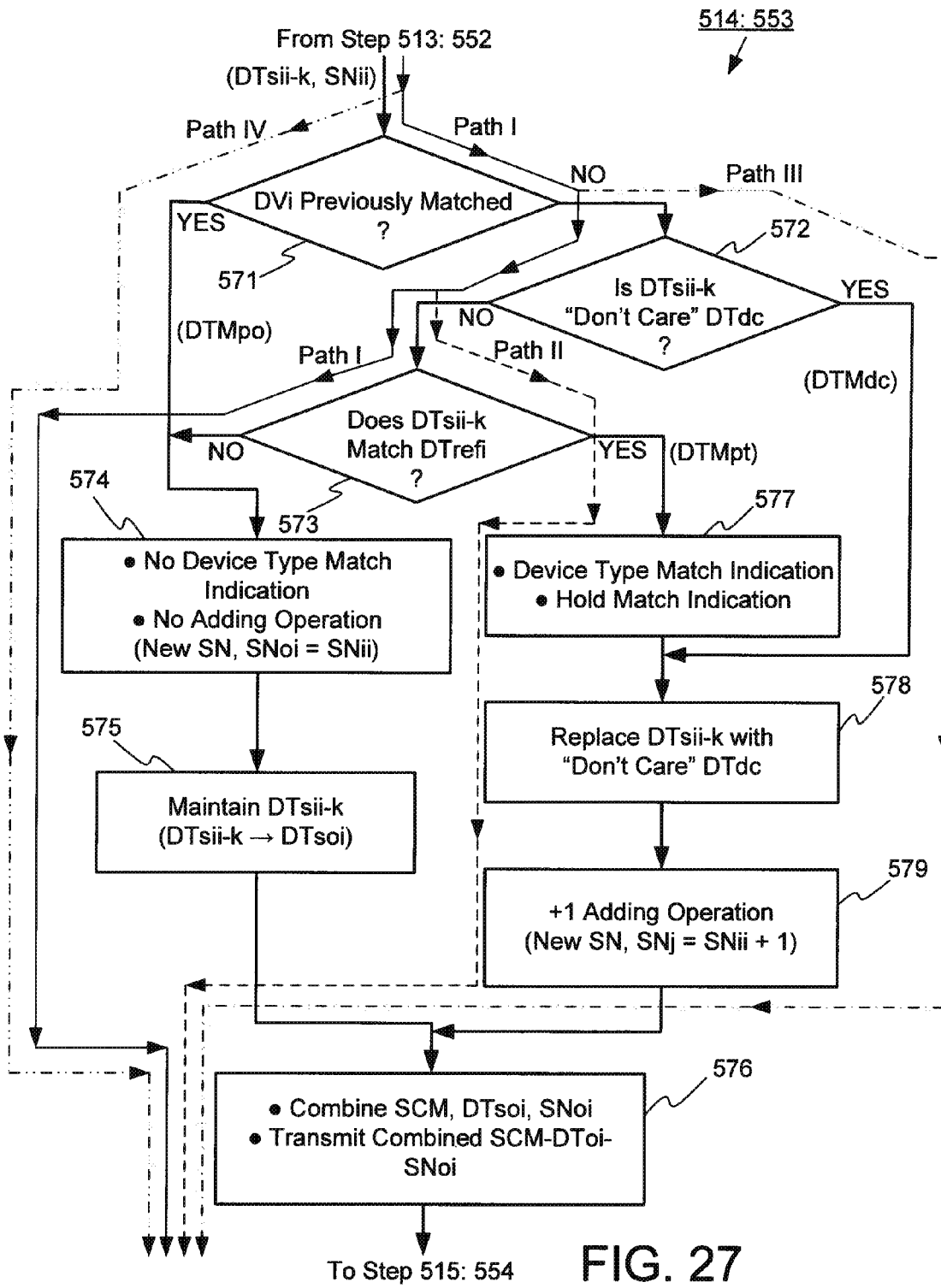
FIG. 27 is a flow chart illustrating another example of a method for performing DT match determination and modification shown in FIGS. 10 and 14.

FIG. 27 shows another example of a method for performing DT match determination and modification shown in FIGS. 10 and 13. The method shown in FIG. 27 is similar to that of FIG. 16. A difference is that the method of FIG. 27 has no step 580 and instead, the input search device type DTsii is always replaced with the "don't care" code DTdc at step 578 when the "don't care" DT match indication DTMdc is enabled (YES at step 572). In Path III, the input search device type DTsii is the DTdc and thus, combined SCM+DTsoi+SNoi at step 576 is the same as that of the method shown in FIG. 16. The DT modification provider 344 shown in FIG. 8 is required to be changed to achieve such a modification logic function. It is required to enable the DT modifying indication MFdt when an enabled present DT match indication DTMpt or an enabled "don't care" DT match indication DTMdc is input thereto, with the result that the selector 332 of the DT output provider 330 (of FIG. 7) selects the "don't care" code DTdc.

Figure 28:
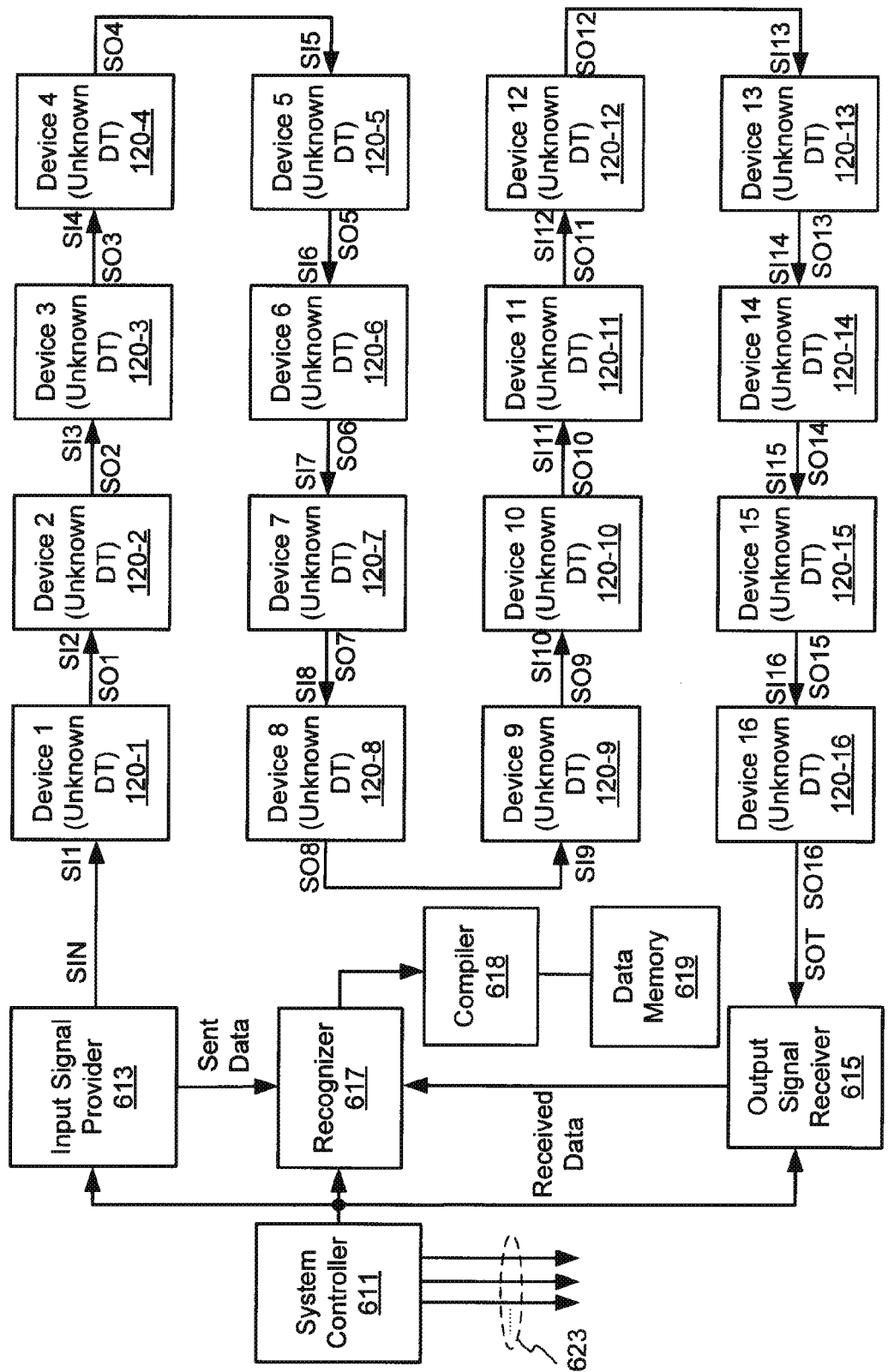
FIG. 28 is a block diagram illustrating another example of a system including a plurality of memory devices in an interconnection configuration to which embodiments of the present invention are applied.

FIG. 28 shows another example of a system including a plurality of memory devices in an interconnection configuration to which embodiments of the present invention are applied. Referring to FIG. 28, a single memory controller is not used and instead, each function of the memory controller is assigned to an individual part. A system controller 611 controls an input signal provider 613, an output signal receiver 615, a recognizer 617 and a compiler 618. A memory 619 stores data provided by the data compiler before and after compiled. The functions of each part are similar to the corresponding part of the memory controller 110 shown in FIG. 2. The system controller 611 provides a group of signals 623 containing a clock signal and others to the devices.

The above-described embodiments may operate with interfaces of a single data rate (SDR), a double data rate (DDR), or another clock rate.

In the above-mentioned example, the bit or data format of the SIN signal and the SOT signal containing various information and data for system operation is not specified. Either or both of the SIN signal and the SOT signal may be a signal having serial bits or parallel bits. The operations of serial bit- and parallel bit-based systems are similar to each other.

In the system shown in FIG. 3, the SIN signal from the memory controller 110 can be a signal having serial bits that represent the various information and data for system operation. Also, each of the input signal SI and the output signal SO of each device can be a signal having serial bits. Furthermore, the SOT signal from the last device to the memory controller 110 can be a signal having serial bits.

Figure 29:
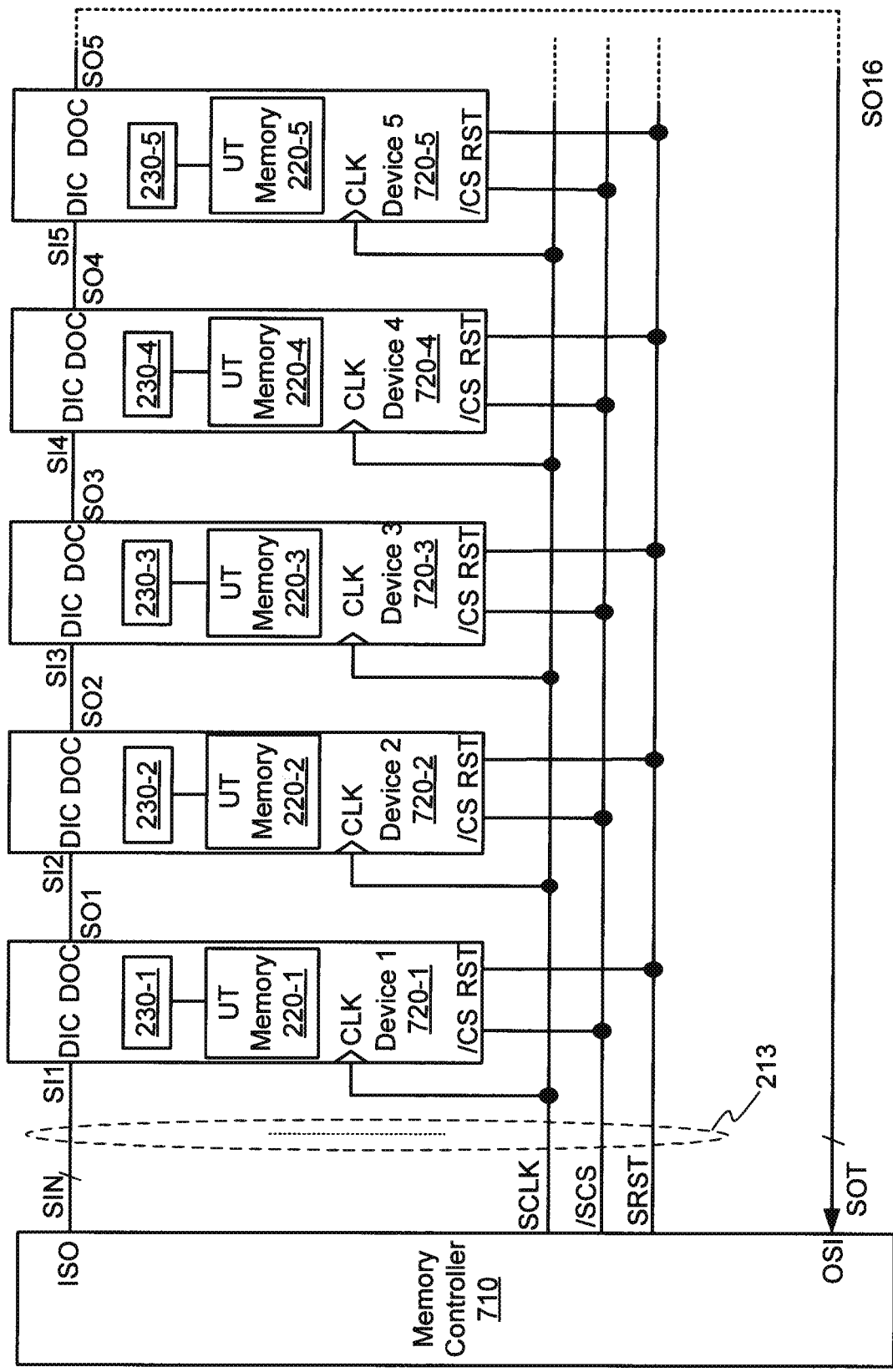
FIG. 29 is a block diagram illustrating another example of part of the interconnection configuration shown in FIG. 2.

FIG. 29 shows another example of part of the interconnection configuration shown in FIG. 2. Referring to FIG. 29, the SIN signal from a memory controller 710 is a signal having parallel bits that represent the various information and data for system operation. Also, the input signal SI and the output signal SO of each of devices 720-1-720-5 can be signals having parallel bits. Furthermore, the SOT signal from the last device of the interconnection configuration to the memory controller 710 can be signals having parallel bits. Details of the memory controller 710 with parallel bits are shown in FIG. 30.

Figure 30:
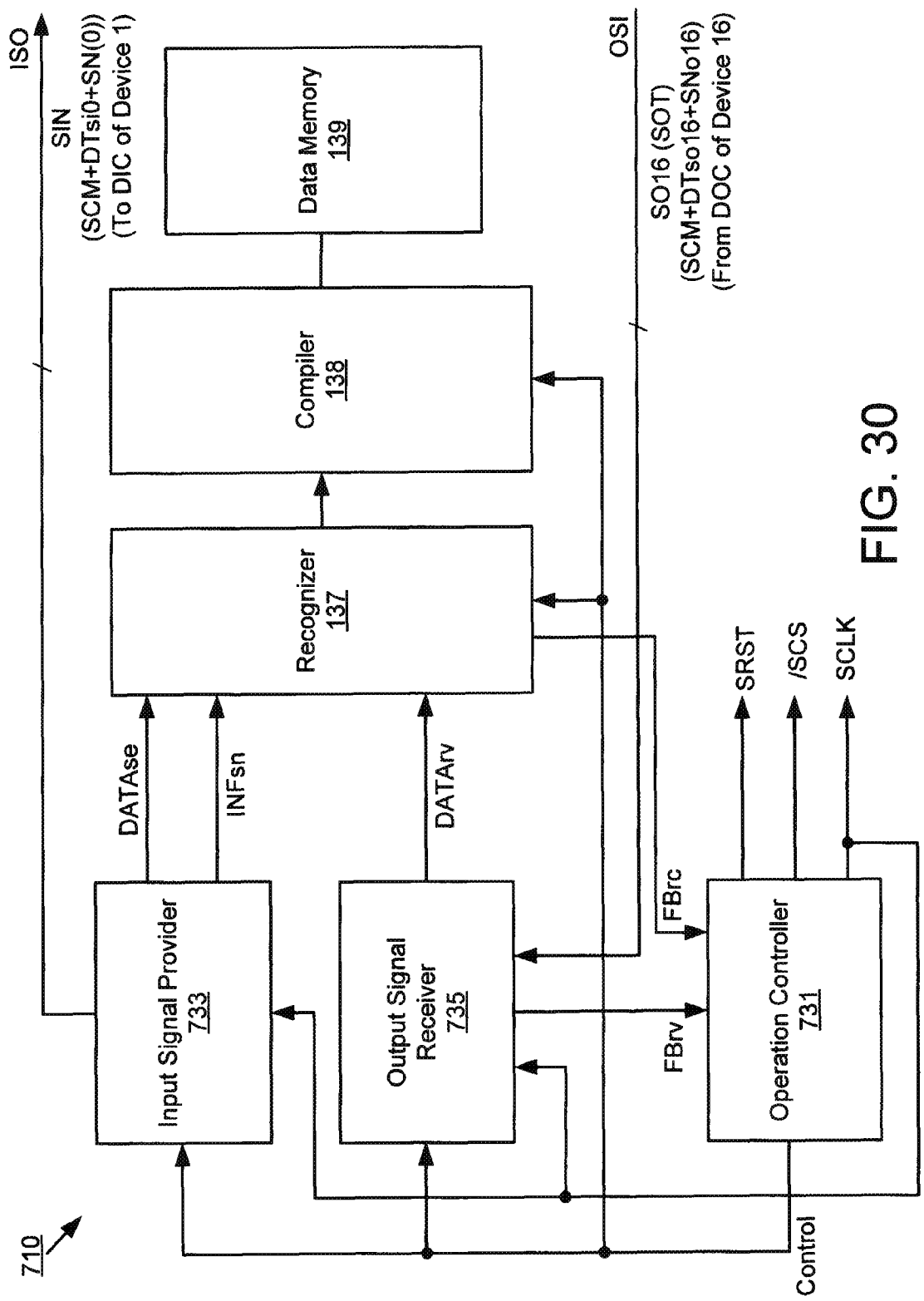
FIG. 30 is a block diagram illustrating another example of a memory controller shown in FIG. 2.

Referring to FIG. 30, an operation controller 731, an input signal provider 733 and an output signal receiver 735 included in the memory controller 710 perform parallel bit-based operations.

Again referring to FIG. 1, the host system 101 communicates with the memory controller 103, wherein the memory controller 101 issues an interconnection input signal including information on control to the series-connected devices of the interconnection configuration 105, the information being used for operations of the devices.

In the device address assignment operation, with the "don't care" device type DTdc, each of devices is assigned with a unique device address that is an absolute address. The process is similar to that of identification of the number of devices with the "don't care" device type DTdc as described above. The assigned device addresses are consecutive.

Figure 31:
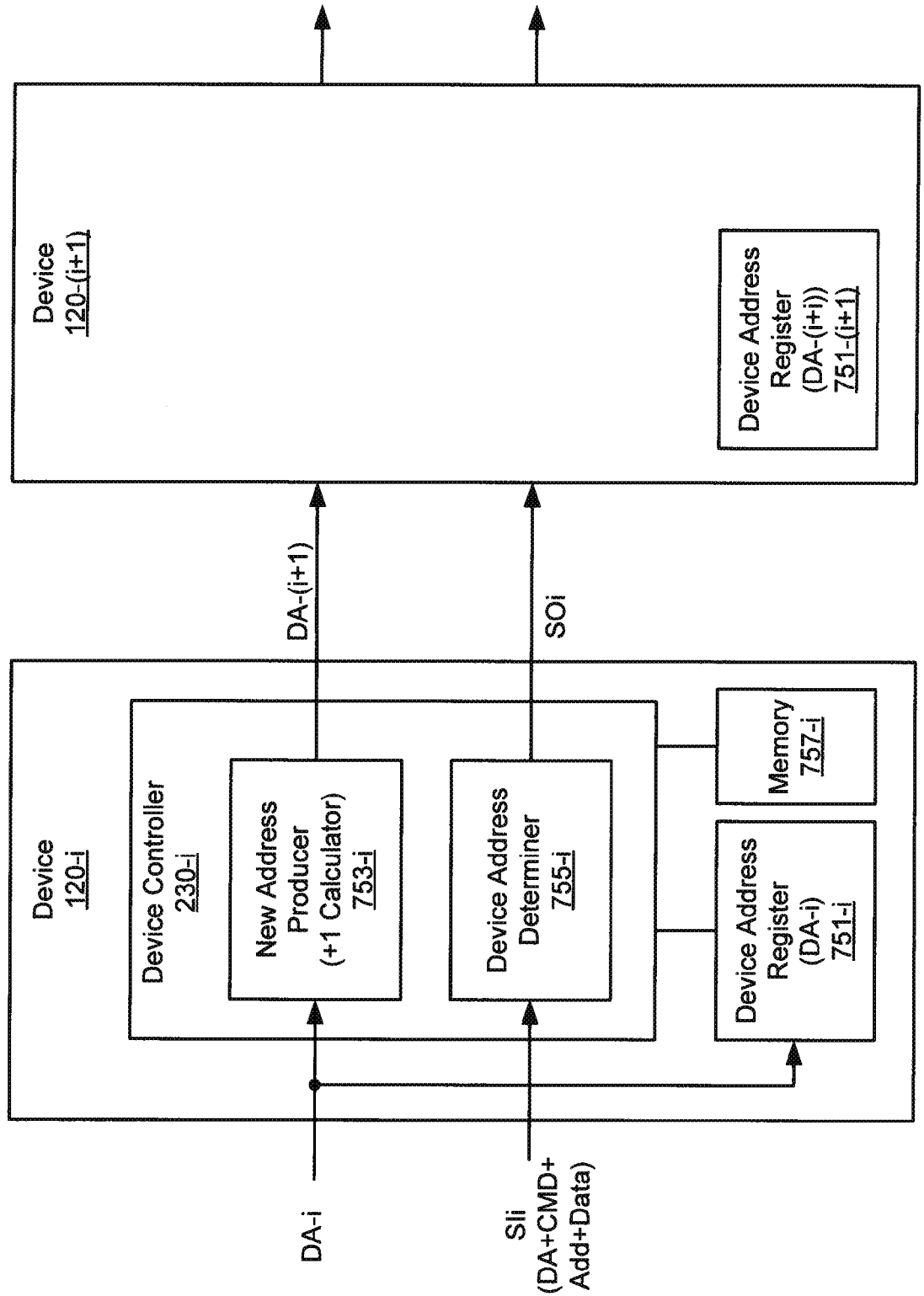
FIG. 31 is a block diagram illustrating an example of a memory device for performing a device address assignment.

FIG. 31 shows an example of a memory device for device address assignment. Referring to FIG. 31, in the device address assignment process, an incoming device address DA-i is assigned to a device 120-i and held in a device address register 751-i thereof. A device address producer 753-i produces a new device address DA-(i+1) in response to the incoming device address DA-i. The function of the device address producer 753-i is provided by the calculator 352 shown in FIG. 8. The newly produced (incremented) device address DA-(i+1) is transmitted to a next device 120-(i+1) that performs the same operations of device address registration and device address producing. The device addresses held in the device address registers of the devices are used for various operations (e.g., data write and data read). An example of the device address assignment to a plurality of memory devices of various types connected in-series using a "don't care code" is disclosed in U.S. patent application Ser. No. 11/624,929 entitled "Apparatus and Method for Producing Device Identifiers for Serially Interconnected Devices of Mixed Type", filed Jan. 19, 2007, the content of which is incorporated herein by reference in its entirety.

In a normal operation mode, a memory controller (e.g., a memory controller 110 shown in FIG. 2) issues an input signal including various information to control the memories (e.g., a command CMD). For example, when the system performs a data write operation, the memory controller sends an input signal including data to be written and information on device operation control that includes a write command (CMD), a device address (DA) designating a memory device in the interconnection configuration, and memory addresses Add (e.g., column and row addresses in a memory core array). The input signal is propagated through the devices of the interconnection configuration. In response to a propagated signal SIi, a device address determiner 755-i determines whether the device address DA of the signal SIi matches the unique device address held in the register 751-i. In a case of non-match between the two device addresses, the received information in the propagated signal SIi is transferred to the next device 120-(i+1). In a case of a match between the two device addresses, the data contained in the propagated signal is written to a memory (a memory core array) 757-i of the designated device 120-i in accordance with the memory addresses Add. The memory 757-i to where the data is written corresponds to a memory 220-i as shown in FIG. 5. In a case of data read operation when an input signal including a read command, upon a device address match determination, the data associated with the memory address Add contained in the propagated signal is read and the read data is transmitted to the next device 120-(i+1) over the propagated signal. The read data in the propagated signal is eventually received by the memory controller through the last device of the interconnection configuration.

In accordance with an embodiment of the present invention, there is provided a machine-readable medium storing commands and instructions which, when executed, cause a processor to perform any one of the methods described above.

Figure 32A:
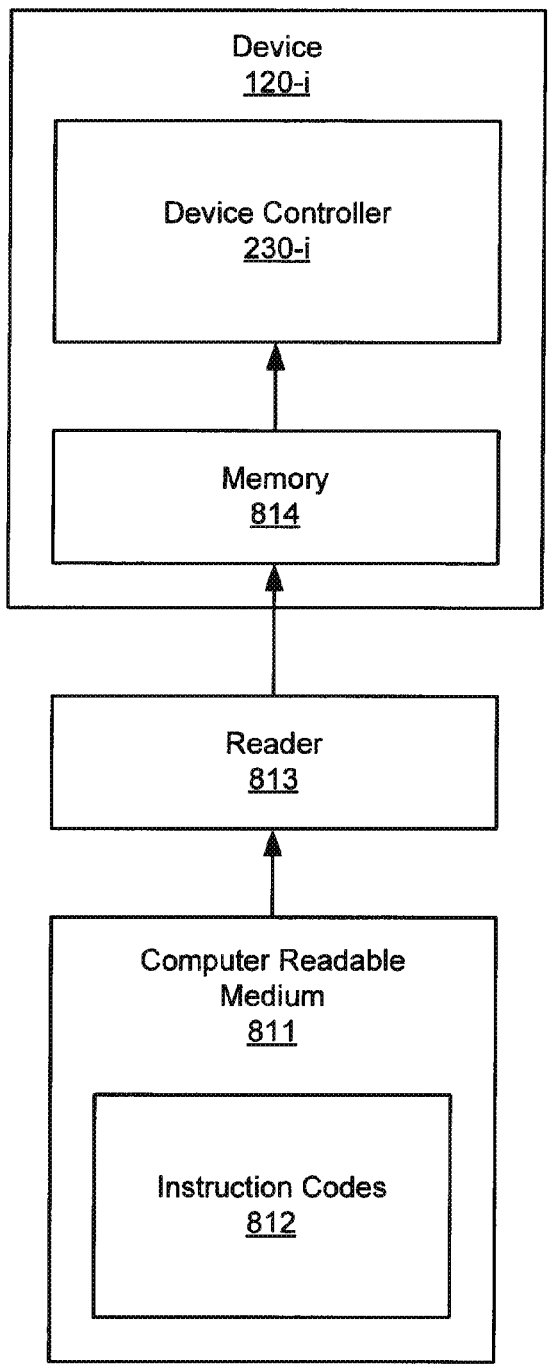
FIGS. 32A and 32B are block diagrams illustrating machine-readable mediums storing commands and instructions for use in a device and a memory controller, respectively, shown in FIG. 2.

FIG. 32A shows a machine-readable medium storing commands and instructions that can be used for the devices 120-1-120-16 of FIG. 2. Referring to FIGS. 2-5 and 32A, a computer-readable medium 811 (e.g., a non-volatile memory) containing instruction codes 812 is provided to a reader 813 which in turn reads the instruction codes 812. The read codes are provided to a memory 814 and stored therein. If the memory 814 is included in the device 120-i, its device controller 230-i can process the codes stored in the memory 814 and perform the functions defined by the instruction codes 812. In a case where the instruction codes 812 define the methods of the DT match determination and the SN and DT modifications described earlier, the device controller 230-i performs to execute the methods.

Figure 32B:
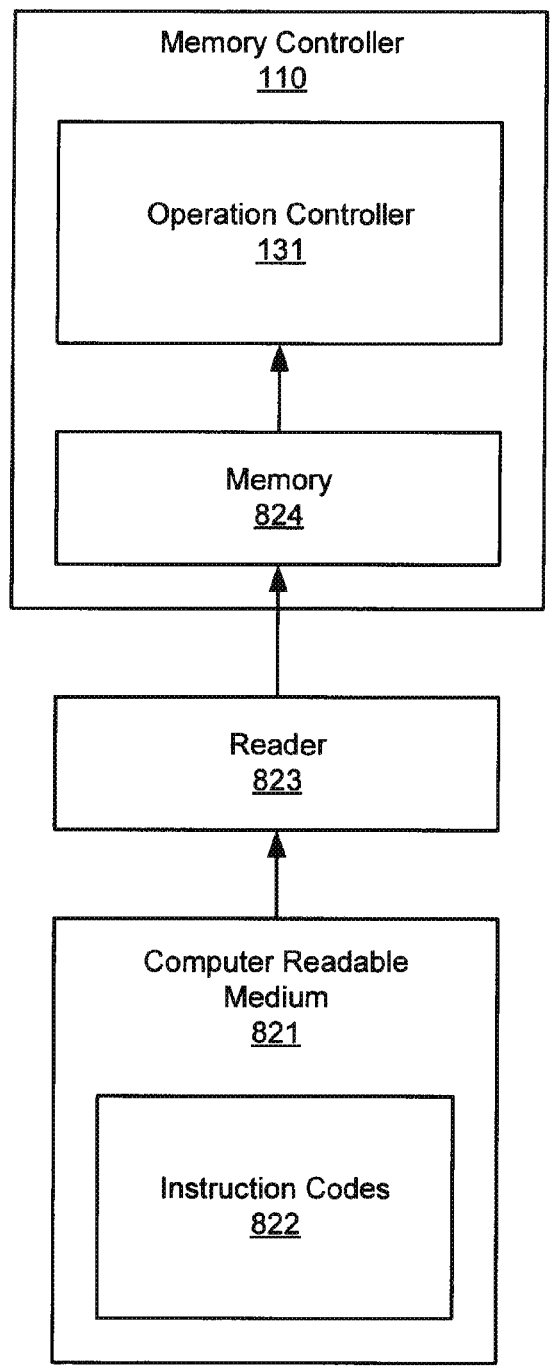

FIG. 32B shows a machine-readable medium storing commands and instructions that can be used for the memory controller 110 of FIG. 2. Referring to FIGS. 2-4 and 32B, a computer-readable medium 821 (e.g., a non-volatile memory) containing instruction codes 822 is provided to a reader 823. The reader 823 reads the instruction codes 822 and the read codes are provided to a memory 824 and stored therein. If the memory 824 is included in the memory controller 110, its operation controller 131 can process the codes stored in the memory 824 and perform the functions defined by the instruction codes 822. In a case where the instruction codes 822 contained in the computer-readable medium 821 defines the method of providing the search command (SCM), device types (DTs) and search numbers (SNs) through the input signal provider 133 and of receiving the propagated SCM, DTs and SNs through the output signal receiver 135 described earlier, the operation controller 131 performs to execute the methods. The instruction codes 822 contained in the computer readable medium 821 can be provided and executed by the memory controller 110 and the system controller 611 shown in FIGS. 2 and 28.

In the embodiments described above, the device elements are connected to each other as shown in the figures, for the sake of simplicity. In practical applications of the present invention to an apparatus, devices, elements, circuits, etc. may be connected directly to each other. As well, devices, elements, circuits etc. may be connected indirectly to each other through other devices, elements, circuits, etc., necessary for operation of the apparatus. Thus, in actual configuration, the circuit elements and devices are directly or indirectly coupled with, or connected to, each other.

The embodiments described above are directed to systems including memory devices as semiconductor devices. The technique described above can be applied to systems including other semiconductor devices, such as, for example, data processing devices, which are distinguishable in accordance with predetermined data or information on their characteristics or types. Such systems can be included by electronic equipment or products.

It will be apparent to those of ordinary skill in the art that the search number modifiers or producers, the controllers, the processors and the other device elements and the memory controllers may be provided by hardware or software.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for use in a system comprising a plurality of devices connected in-series in an interconnection configuration, each of the plurality of devices being associated with a device type, the method comprising:

providing a first signal including a first binary search number to a first device of the plurality of devices in the interconnection configuration, the first binary search number being represented by a pre-defined number of bits, the first signal being propagated through the plurality of devices, incrementing the first binary search number included in the propagated first signal by each of the plurality of devices, an incremented first binary search number by each of the plurality of the devices replacing the first binary search number of the propagated first signal;

receiving the propagated first signal from a last device of the plurality in the interconnection configuration, the received propagated first signal including the first binary search number incremented by each of the plurality of devices;

recognizing the number of the plurality of devices in the interconnection configuration based on the first binary search number included in the received propagated first signal; and in a case of the first binary search number included in the received propagated first signal being zero, providing a second signal including a search device type and a second binary search number to the first device of the plurality of devices in the interconnection configuration, the second signal being propagated through the plurality of devices, at least one of the plurality of devices determining whether the search device type matches the device type associated with the device to provide a device type match determination result;

modifying the second binary search number included in the propagated second signal in response to the device type match determination result, a modified second binary search number replacing the second binary search number of the propagated second signal;

receiving the propagated second signal from the last device of the plurality of the interconnection configuration;

obtaining the number of the plurality of devices in the interconnection configuration based on the pre-defined number of bits representing the first binary search number of the first signal, in response to the search number included in the received propagated second signal.

2. The method of claim 1, wherein the obtaining the number of the plurality of devices comprises:

verifying the modified second binary search number is different from the second binary search number included in the provided second signal.

3. The method of claim 1, wherein each of the plurality of devices includes a memory for data store.

4. The method of claim 3, wherein each of the plurality of devices has a device type corresponding to the type of the memory.

5. The method of claim 2, wherein the providing a first signal comprises:

providing the first signal including the pre-defined bits representing the first binary search number of zero.

6. The method of claim 5, wherein the providing a second signal comprises:
   providing the second signal including the search device type and the second binary search number representing zero.

7. The method of claim 6, wherein the obtaining the number of the plurality of devices comprises:
   calculating the number N of the plurality of devices in the interconnection configuration by $N=2^q$, q being the predetermined number of bits representing the first binary search number included in the first signal.

8. The method of claim 1, wherein the plurality of devices include non-volatile memory devices and volatile memory devices.

9. The method of claim 1, wherein the series-connected memory devices include random access memories.

10. The method of claim 9, wherein the random access memories include dynamic random access memory (DRAM), static random access memory (SRAM), magnetoresistive random access memory (MRAM) and other semiconductor memories.

11. The method of claim 1, wherein the series-connected memory devices include flash memories.

12. The method of claim 11, wherein the flash memories include NAND-type, NOR-type, AND-type memories.

* * * * *